United States Patent
Kim et al.

(10) Patent No.: US 9,942,107 B2
(45) Date of Patent: Apr. 10, 2018

(54) COMPUTER SYSTEM INCLUDING PLURAL COMPUTER NODES SYNCHRONIZED WITH EACH OTHER

(75) Inventors: Sungho Kim, Sagamihara (JP); Eiji Nishijima, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 576 days.

(21) Appl. No.: 13/881,044

(22) PCT Filed: Oct. 25, 2010

(86) PCT No.: PCT/JP2010/006290
§ 371 (c)(1),
(2), (4) Date: Jun. 14, 2013

(87) PCT Pub. No.: WO2012/056487
PCT Pub. Date: May 3, 2012

(65) Prior Publication Data
US 2013/0275626 A1   Oct. 17, 2013

(51) Int. Cl.
*G06F 15/16* (2006.01)
*H04L 12/24* (2006.01)
(Continued)

(52) U.S. Cl.
CPC ............ *H04L 41/50* (2013.01); *G06F 9/52* (2013.01); *G06F 11/1675* (2013.01);
(Continued)

(58) Field of Classification Search
USPC ......................................... 709/205, 248–253
See application file for complete search history.

(56) References Cited

U.S. PATENT DOCUMENTS 5,802,295 A * 9/1998 Fukui et al. ............... 709/216
6,308,201 B1 * 10/2001 Pivowar et al. .......... 709/214
(Continued)

FOREIGN PATENT DOCUMENTS

JP   2003-067214 A   3/2003
JP   2006-209565 A   8/2006
(Continued)

OTHER PUBLICATIONS

Harper, Richard E., and Jaynarayan H. Lala. "Fault-tolerant parallel processor." Journal of guidance, control, and dynamics 14, No. 3 (1991): 554-563.*

*Primary Examiner* — Cheikh Ndiaye
*Assistant Examiner* — Melaku Habtemariam
(74) *Attorney, Agent, or Firm* — Mattingly & Malur, PC

(57) ABSTRACT

A computer system includes a plurality of computer nodes, each including an external communications unit. An application unit executes processing in accordance with a processing request. A synchronization unit establishes synchronization of the processing between each computer node and other computer nodes. The processing is executed by each computer node, and an inter-node communications unit executes transmission/reception of information between each computer node and the other computer nodes. The synchronization unit transmits the processing request to the other computer nodes via the inter-node communications unit, the processing request being received by the external communications unit. Also, the synchronization unit receives processing requests from the other computer nodes as well via the inter-node communications unit. Based on the number of the computer nodes that have received the same processing request via the external communications units, the synchronization unit selects a processing request that should be executed by the application unit.

9 Claims, 50 Drawing Sheets

(51) Int. Cl.
    *G06F 9/52*      (2006.01)
    *G06F 11/16*     (2006.01)
    *G06F 11/18*     (2006.01)

(52) U.S. Cl.
    CPC ........ *G06F 11/1687* (2013.01); *G06F 11/182* (2013.01); *G06F 11/184* (2013.01)

(56) References Cited

U.S. PATENT DOCUMENTS

| | | | |
|---|---|---|---|
| 6,553,037 B1* | 4/2003 | Pivowar et al. | 370/463 |
| 2006/0031587 A1* | 2/2006 | Paterson et al. | 709/248 |
| 2007/0097880 A1* | 5/2007 | Rajsic | H04L 41/12 370/254 |
| 2008/0071853 A1* | 3/2008 | Mosier | H04L 67/1095 709/201 |
| 2008/0168183 A1* | 7/2008 | Marcy et al. | 709/248 |
| 2008/0189440 A1* | 8/2008 | Goyal et al. | 709/248 |
| 2008/0310444 A1* | 12/2008 | Dekel | H04L 12/1877 370/432 |

FOREIGN PATENT DOCUMENTS

| | | | |
|---|---|---|---|
| JP | 2009-217503 A | 9/2009 | |
| JP | 2010-113495 A | 5/2010 | |
| JP | 2010-198442 A | 9/2010 | |

\* cited by examiner

FIG. 2

EXTERNALLY-INPUTTED PACKET'S FORMAT 500

| 501 | 502 | 503 | 504 | 505 | 506 | 508 CONTENTS | 509 CONTENTS |
|---|---|---|---|---|---|---|---|
| TRANSMISSION -SOURCE INF | SEQUENCE NUMBER | TRANSMISSION TIME STAMP | ORDERED -PROCESSING NECESSITY /UNNECESSITY FLAG | ORDERED -PROCESSING BLOCK NUMBER | ORDERED -PROCESSING START NUMBER | APPLICATION IDENTIFIER | PARAMETER |
| 2-C | 2C-1 | HHMMSS (  :081203) | 1 | 10 | 2C-1 | AP1 | P1 |

EXTERNALLY-INPUTTED-PACKET MNG TABLE 550

| 551 NUMBER | 501 TRANSMISSION -SOURCE INF | 502 SEQUENCE NUMBER | 503 TRANSMISSION TIME STAMP | 504 ORDERED -PROCESSING NECESSITY /UNNECESSITY FLAG | 505 ORDERED -PROCESSING BLOCK NUMBER | 506 ORDERED -PROCESSING START NUMBER | 507 CONTENTS | |
|---|---|---|---|---|---|---|---|---|
| | | | | | | | 508 APPLICATION IDENTIFIER | 509 PARAMETER |
| 1 | 2-C | 2C-1 | 081203 | 1 | 10 | 2C-1 | AP1 | P1 |
| ~ | ~ | ~ | ~ | ~ | ~ | ~ | ~ | ~ |
| N | 2-A | 2A-1 | 091005 | 0 | 0 | 0 | AP1 | P1 |

FIG. 4

COMPUTER-NODE PROCESS STATE TABLE 700

| PROCESS-STATE IDENTIFIER | ADDITIONAL INF | PENALTY | PROCESS STATE |
|---|---|---|---|
| REJOIN-WAIT | — | 0 | REJOIN-WAIT |
| REJOIN-REQ | — | 0 | REJOIN-REQ |
| REJOIN-ACK | — | 0 | REJOIN-ACK |
| JOINED | — | 0 | JOINED |
| INPUT | INPUT SYNC STEP / Window Size | — | — |
| OUTPUT | OUTPUT SYNC STEP | 0 | BEGIN |
|  | OUTPUT | 0 | END |
|  | LEADER | 0 | BEGIN |
|  |  | 0 | END |
|  | VOTER | 0 | LEADER |
|  |  |  | MONITOR |

FIG. 7

COMPUTER-NODE-CONFIGURATION MNG TABLE 317

| COMPUTER-NODE IDENTIFIER | I/O-DTMN -PROCESSING COUNTER 602 | COMPUTER -NODE PROCESS STATE 603 |
|---|---|---|
| 100A | C306 | CONTENTS OF COMPUTER-NODE -100A PROCESS STATE TABLE |
| 100B | C306 | CONTENTS OF COMPUTER-NODE -100B PROCESS STATE TABLE |
| 100C | C306 | CONTENTS OF COMPUTER-NODE -100C PROCESS STATE TABLE |

317A — INPUT SYNC-TIME COMPUTER NODES' TOTAL NUMBER 601: 3

FIG. 8

DETERMINED-INPUT MNG TABLE 800

| TRANSMISSION -SOURCE INF | DETERMINED INPUTS' TOTAL NUMBER 501 | | | ORDERED -PROCESSING NECESSITY /UNNECESSITY FLAG 504 | ORDERED -PROCESSING BLOCK NUMBER | ORDERED -PROCESSING START NUMBER 506 | CONTENTS 507 | |
|---|---|---|---|---|---|---|---|---|
| | SEQUENCE NUMBER 502 | TRANSMISSION TIME STAMP 503 | | | | | APPLICATION IDENTIFIER | PARAMETER |
| 2-C | 2C-1 | 081203 | | 1 | 10 | 2C-1 | AP1 | P1 |
| 2-A | 2A-2 | 081215 | | 0 | 0 | 0 | AP1 | P1 |
| 2-B | 2B-1 | 081214 | | 0 | 0 | 0 | AP1 | P1 |

FIG. 9

PREDETERMINED-INPUT MNG TABLE 810

| TRANSMISSION-SOURCE INF 501 | PREDETERMINED INPUTS TOTAL NUMBER | | ORDERED-PROCESSING NECESSITY/UNNECESSITY FLAG 504 | ORDERED-PROCESSING BLOCK NUMBER 505 | ORDERED-PROCESSING START NUMBER 3 | CONTENTS 507 | |
|---|---|---|---|---|---|---|---|
| | SEQUENCE NUMBER 502 | TRANSMISSION TIME STAMP 503 | | | 506 | APPLICATION IDENTIFIER | PARAMETER |
| 2-B | 2B-3 | 085234 | 0 | 0 | 0 | AP1 | P1 |

811

DETERMINED-OUTPUT MNG TABLE 321

321A — OUTPUT SYNC-TIME COMPUTER NODES' TOTAL NUMBER

3

| RANK | COMPUTER-NODE IDENTIFIER | I/O-DTMN -PROCESSING COUNTER | COMPUTER-NODE PROCESS STATE | COMPUTER-NODE PROCESS RESULT |
|---|---|---|---|---|
| 1 | 100C | C306 | CONTENTS OF COMPUTER-NODE -100C PROCESS STATE TABLE | X |
| 2 | 100B | C306 | CONTENTS OF COMPUTER-NODE -100B PROCESS STATE TABLE | X |
| 3 | 100A | C306 | CONTENTS OF COMPUTER-NODE -100A PROCESS STATE TABLE | X |

FIG. 26

(a)
CONTENTS OF INTER-NODE COM PACKET OF REJOIN-REQ

| COMPUTER -NODE IDENTIFIER | I/O-DTMN -PROCESSING COUNTER | COMPUTER -NODE PROCESS STATE | | | | DETAILED INF | |
|---|---|---|---|---|---|---|---|
| 100A | 0 | REJOIN-REQ | 0 | 0 | REJOIN-REQ | — | |

(b)
CONTENTS OF INTER-NODE COM PACKET OF REJOIN-ACK

| COMPUTER -NODE IDENTIFIER | I/O-DTMN -PROCESSING COUNTER | COMPUTER -NODE PROCESS STATE | | | | DETAILED INF | |
|---|---|---|---|---|---|---|---|
| 100B | C012 | REJOIN-ACK | 0 | 0 | REJOIN-ACK | 800 | 301 |

(c)
CONTENTS OF INTER-NODE COM PACKET OF JOINED

| COMPUTER -NODE IDENTIFIER | I/O-DTMN -PROCESSING COUNTER | COMPUTER -NODE PROCESS STATE | | | | DETAILED INF |
|---|---|---|---|---|---|---|
| 100A | C012 | JOINED | 0 | 0 | JOINED | — |

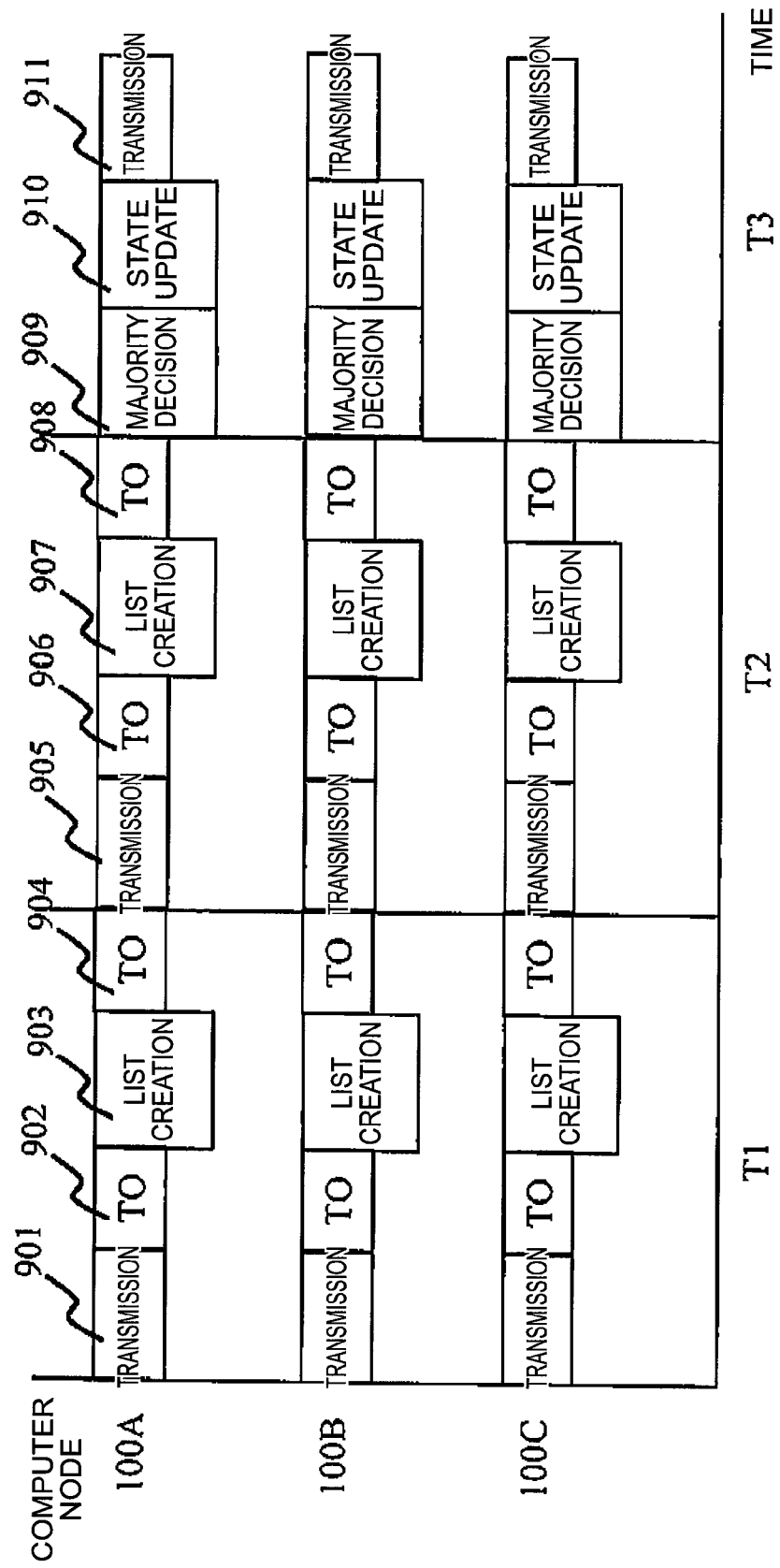

FIG. 28

STATES OF EXTERNALLY-INPUTTED PACKET STORAGE UNIT, PROCESS-STATE STORAGE UNIT, AND I/O-DTMN-PROCESSING COUNTER OF EACH COMPUTER NODE FOR EACH TIME T

| | COMPUTER NODE 100A | | | | COMPUTER NODE 100B | | | | COMPUTER NODE 100C | | | |
|---|---|---|---|---|---|---|---|---|---|---|---|---|
| | SEQ | WS | ST | CNT | SEQ | WS | ST | CNT | SEQ | WS | ST | CNT |
| T1 | 2A-1<br>2B-1<br>0 | 2 | B | C010 | 0<br>0<br>0 | 2 | B | C010 | 2C-1<br>0<br>0 | 2 | B | C010 |
| T2 | 2A-1<br>2B-1<br>2C-1 | 3 | B | C010 | 2B-1<br>0<br>0 | 3 | B | C010 | 2C-1<br>2B-1<br>0 | 3 | B | C010 |
| T3 | 2A-1<br>0<br>0 | 3 | E | C011 | 0<br>0<br>0 | 3 | E | C011 | 0<br>0<br>0 | 3 | E | C011 |

SEQ: SEQUENCE NUMBER OF EXTERNALLY-INPUTTED PACKET 500
WS: INPUT SYNC STEP OF PROCESS STATE TABLE 700
ST: PROCESS STATE OF PROCESS STATE TABLE 700
B: BEGIN STATE OF PROCESS STATE TABLE 700
E: END STATE OF PROCESS STATE TABLE 700
CNT: I/O-DTMN-PROCESSING COUNTER

FIG. 29

CONTENTS OF INTER-NODE COM PACKET OF EACH COMPUTER NODE FOR ON-EACH-TIME-BASIS TRANSMISSION

| TIME | COMPUTER-NODE IDENTIFIER | I/O-DTMN-PROCESSING COUNTER | 701 | COMPUTER-NODE PROCESS STATE 702 | 703 | 704 | COMPUTER-NODE PROCESS STATE'S INDIVIDUAL DETAILED INF — EXTERNALLY-INPUTTED PACKET × INPUT-SYNC-STEP-EQUIVALENT AMOUNT | | | |
|---|---|---|---|---|---|---|---|---|---|---|
| T1 | 100A | C010 | INPUT | 2 | 0 | BEGIN | 2A-1 | 2B-1 | 0 | 0 |
| | 100B | C010 | INPUT | 2 | 0 | BEGIN | 0 | 0 | 0 | 0 |
| | 100C | C010 | INPUT | 2 | 0 | BEGIN | 2C-1 | 0 | 0 | 0 |
| T2 | 100A | C010 | INPUT | 3 | 0 | BEGIN | 2A-1 | 2B-1 | 2C-1 | 0 |
| | 100B | C010 | INPUT | 3 | 0 | BEGIN | 2B-1 | 0 | 0 | 0 |
| | 100C | C010 | INPUT | 3 | 0 | BEGIN | 2C-1 | 2B-1 | 0 | 0 |
| T3 | 100A | C010 | INPUT | 3 | 0 | END | 2B-1 | 2C-1 | 0 | 0 |
| | 100B | C010 | INPUT | 3 | 0 | END | 2B-1 | 2C-1 | 0 | 0 |
| | 100C | C010 | INPUT | 3 | 0 | END | 2B-1 | 2C-1 | 0 | 0 |

FIG. 30

CONTENTS OF INTER-NODE COM PACKET OF EACH
COMPUTER NODE FOR ON-EACH-TIME-BASIS LIST CREATION

| TIME | COMPUTER-NODE IDENTIFIER | I/O-DTMN-PROCESSING COUNTER | COMPUTER-NODE PROCESS STATE | | | COMPUTER-NODE PROCESS STATE'S INDIVIDUAL DETAILED INF |
|---|---|---|---|---|---|---|
| | | | 701 | 702 | 703 | 704 | EXTERNALLY-INPUTTED PACKET × INPUT-SYNC-STEP EQUIVALENT AMOUNT |
| T1 | 100A | C010 | INPUT | 2 | 0 | BEGIN | 2A-1, 2B-1, 2C-1 |
| | 100B | C010 | INPUT | 2 | 0 | BEGIN | 0, 0, 0 |
| | 100C | C010 | INPUT | 2 | 0 | BEGIN | 2C-1, 0, 0 |
| T2 | 100A | C010 | INPUT | 3 | 0 | BEGIN | 2A-1, 2B-1, 2C-1 |
| | 100B | C010 | INPUT | 3 | 0 | BEGIN | 2B-1, 0, 0 |
| | 100C | C010 | INPUT | 3 | 0 | BEGIN | 2C-1, 2B-1, 0 |

FIG. 31

CHANGE IN ON-EACH-TIME-BASIS COMPUTER-NODE-CONFIGURATION MNG TABLE

| TIME | INPUT SYNC-TIME COMPUTER NODES' TOTAL NUMBER | | | 3 | | | |
|---|---|---|---|---|---|---|---|
| | COMPUTER -NODE IDENTIFIER | I/O-DTMN -PROCESSING COUNTER | PROCESS -STATE ID ENTIFIER | ADDITIONAL INF | | COMPUTER -NODE PROCESS STATE | |
| | | | | | Penalty | PROCESS STATE | |
| T1 | 100A | C010 | INPUT | 2 | 0 | E |
| | 100B | C010 | INPUT | 2 | 0 | E |
| | 100C | C010 | INPUT | 2 | 0 | E |
| T2 | 100A | C010 | INPUT | 3 | 0 | E |
| | 100B | C010 | INPUT | 3 | 0 | E |
| | 100C | C010 | INPUT | 3 | 0 | E |
| T3 | 100A | C011 | INPUT | 3 | 0 | E |
| | 100B | C011 | INPUT | 3 | 0 | E |
| | 100C | C011 | INPUT | 3 | 0 | E |

DETERMINED-INPUT MNG TABLE OF COMPUTER NODE 100A, 100B, 100C

| TRANSMISSION-SOURCE INF | DETERMINED INPUTS' TOTAL NUMBER | | | | | 2 | |
|---|---|---|---|---|---|---|---|
| | SEQUENCE NUMBER | TRANSMISSION TIME STAMP | ORDERED-PROCESSING NECESSITY/UNNECESSITY FLAG | ORDERED-PROCESSING BLOCK NUMBER | ORDERED-PROCESSING START NUMBER | CONTENTS | |
| | | | | | | APPLICATION IDENTIFIER | PARAMETER |
| 2-B | 2B-1 | 081214 | 0 | 0 | 0 | AP1 | P1 |
| 2-C | 2C-1 | 081215 | 0 | 0 | 0 | AP1 | P1 |

FIG. 33

PREDETERMINED-INPUT MNG TABLE OF COMPUTER NODE 100B

| TRANSMISSION-SOURCE INF | SEQUENCE NUMBER | TRANSMISSION TIME STAMP | ORDERED-PROCESSING NECESSITY/UNNECESSITY FLAG | ORDERED-PROCESSING BLOCK NUMBER | ORDERED-PROCESSING START NUMBER | CONTENTS | | PREDETERMINED INPUTS' TOTAL NUMBER |
|---|---|---|---|---|---|---|---|---|
| | | | | | | APPLICATION IDENTIFIER | PARAMETER | |
| 2-B | 2B-1 | 081214 | 0 | 0 | 0 | AP1 | P1 | 1 |

FIG. 35

| TIME | COMPUTER NODE 100A | | | COMPUTER NODE 100B | | | | COMPUTER NODE 100C | | | |
|---|---|---|---|---|---|---|---|---|---|---|---|
| | SEQ | WS | ST | CNT | SEQ | WS | ST | CNT | SEQ | WS | ST | CNT |
| T1 | 2A-1 / 2B-1 / 0 | 2 | B | C010 | 2C-1 / 0 / 0 | 2 | B | C010 | 0 / 0 / 0 | 2 | B | C010 |
| T2 | 2A-1 / 2B-1 / 0 | 3 | B | C010 | 2C-1 / 0 / 0 | 3 | B | C010 | 2A-1 / 0 / 0 | 3 | B | C010 |
| T3 | 2B-1 / 0 / 0 | 3 | E | C011 | 2C-1 / 0 / 0 | 3 | E | C011 | 0 / 0 / 0 | 3 | E | C011 |

SEQ: SEQUENCE NUMBER OF EXTERNALLY-INPUTTED PACKET 500
WS: INPUT SYNC STEP OF PROCESS STATE TABLE 700
ST: PROCESS STATE OF PROCESS STATE TABLE 700
B: BEGIN STATE OF PROCESS STATE TABLE 700
E: END STATE OF PROCESS STATE TABLE 700
CNT: I/O-DTMN-PROCESSING COUNTER

FIG. 36

CONTENTS OF INTER-NODE COM PACKET OF EACH COMPUTER NODE
FOR ON-EACH-TIME-BASIS TRANSMISSION

| TIME | COMPUTER-NODE IDENTIFIER | I/O-DTMN-PROCESSING COUNTER | COMPUTER-NODE PROCESS STATE | | | | COMPUTER-NODE PROCESS STATE'S INDIVIDUAL DETAILED INF | |
|---|---|---|---|---|---|---|---|---|
| | | | 701 | 702 | 703 | 704 | EXTERNALLY-INPUTTED PACKET × INPUT-SYNC-STEP-EQUIVALENT AMOUNT | |
| T1 | 100A | C010 | INPUT | 2 | 0 | BEGIN | 2A-1 | 2B-1 |
| | 100B | C010 | INPUT | 2 | 0 | BEGIN | 2C-1 | 0 |
| T1' | 100C | C010 | INPUT | 2 | 0 | BEGIN | 2A-1 | 0 |
| T2 | 100A | C010 | INPUT | 3 | 0 | BEGIN | 2A-1 | 2B-1 |
| | 100B | C010 | INPUT | 3 | 0 | BEGIN | 2C-1 | 0 |
| | 100C | C010 | INPUT | 3 | 1 | BEGIN | 2A-1 | 0 |
| T3 | 100A | C010 | INPUT | 3 | 0 | END | 2A-1 | 0 |
| | 100B | C010 | INPUT | 3 | 0 | END | 2A-1 | 0 |
| | 100C | C010 | INPUT | 3 | 1 | END | 2A-1 | 0 |

FIG. 37

CONTENTS OF INTER-NODE COM PACKET OF EACH COMPUTER NODE FOR ON-EACH-TIME-BASIS LIST CREATION

| TIME | COMPUTER-NODE IDENTIFIER | I/O-DTMN-PROCESSING COUNTER | COMPUTER-NODE PROCESS STATE | | | | COMPUTER-NODE PROCESS STATE'S INDIVIDUAL DETAILED INF |
|---|---|---|---|---|---|---|---|
| | | | 701 | 702 | 703 | 704 | EXTERNALLY-INPUTTED PACKET × INPUT-SYNC-STEP-EQUIVALENT AMOUNT 1065 |
| T1 | 100A | C010 | INPUT | 2 | 0 | BEGIN | 2A-1, 2B-1, 0 |
| | 100B | C010 | INPUT | 2 | 0 | BEGIN | 2C-1, 0, 0 |
| T2 | 100A | C010 | INPUT | 3 | 0 | BEGIN | 2A-1, 2B-1, 0 |
| | 100B | C010 | INPUT | 3 | 0 | BEGIN | 2C-1, 0, 0 |
| | 100C | C010 | INPUT | 3 | 1 | BEGIN | 2A-1, 0, 0 |

FIG. 38

CHANGE IN ON-EACH-TIME-BASIS COMPUTER-NODE-CONFIGURATION MNG TABLE OF COMPUTER NODE 100A, 100B

| TIME | COMPUTER-NODE IDENTIFIER | I/O-DTMN-PROCESSING COUNTER | COMPUTER-NODE PROCESS STATE ||||
|---|---|---|---|---|---|---|
| | | | PROCESS-STATE IDENTIFIER | ADDITIONAL INF | Penalty | PROCESS STATE |
| T1 | 100A | C010 | INPUT | 2 | 0 | E |
| | 100B | C010 | INPUT | 2 | 0 | E |
| T2 | 100A | C010 | INPUT | 3 | 0 | E |
| | 100B | C010 | INPUT | 3 | 0 | E |
| | 100C | C010 | INPUT | 3 | 1 | E |
| T3 | 100A | C011 | INPUT | 3 | 0 | E |
| | 100B | C011 | INPUT | 3 | 0 | E |
| | 100C | C011 | INPUT | 3 | 1 | E |

FIG. 39

CHANGE IN ON-EACH-TIME-BASIS COMPUTER-NODE-
CONFIGURATION MNG TABLE OF COMPUTER NODE 100C

| TIME | COMPUTER-NODE IDENTIFIER | I/O-DTMN-PROCESSING COUNTER | COMPUTER-NODE PROCESS STATE ||||
| --- | --- | --- | --- | --- | --- | --- |
| | | | PROCESS-STATE IDENTIFIER | ADDITIONAL INF | Penalty | PROCESS STATE |
| T1' | 100C | C010 | INPUT | 2 | 0 | E |
| T2 | 100A | C010 | INPUT | 3 | 0 | E |
| | 100B | C010 | INPUT | 3 | 0 | E |
| | 100C | C010 | INPUT | 3 | 1 | E |
| T3 | 100A | C011 | INPUT | 3 | 0 | E |
| | 100B | C011 | INPUT | 3 | 0 | E |
| | 100C | C011 | INPUT | 3 | 1 | E |

FIG. 40

DETERMINED-INPUT MNG TABLE OF COMPUTER NODE 100A, 100B, 100C

| DETERMINED INPUTS' TOTAL NUMBER | | | | | | 1 | |
|---|---|---|---|---|---|---|---|
| TRANSMISSION -SOURCE INF | SEQUENCE NUMBER | TRANSMISSION TIME STAMP | ORDERED- PROCESSING NECESSITY/ UNNECESSITY FLAG | ORDERED- PROCESSING BLOCK NUMBER | ORDERED- PROCESSING START NUMBER | CONTENTS | |
| | | | | | | APPLICATION IDENTIFIER | PARAMETER |
| 2-A | 2A-1 | 081214 | 0 | 0 | 0 | AP1 | P1 |

FIG. 41

PREDETERMINED-INPUT MNG TABLE OF COMPUTER NODE 100B

| PREDETERMINED INPUTS' TOTAL NUMBER | | | | | | | 1 | |
|---|---|---|---|---|---|---|---|---|
| TRANSMISSION -SOURCE INF | SEQUENCE NUMBER | TRANSMISSION TIME STAMP | ORDERED -PROCESSING NECESSITY/ UNNECESSITY FLAG | ORDERED- PROCESSING BLOCK NUMBER | ORDERED- PROCESSING START NUMBER | CONTENTS | | |
| | | | | | | APPLICATION IDENTIFIER | PARAMETER | |
| 2-A | 2A-1 | 081214 | 0 | 0 | 0 | AP1 | P1 | |

FIG. 43

CONTENTS OF INTER-NODE COM PACKET OF EACH COMPUTER NODE FOR ON-EACH-TIME-BASIS TRANSMISSION

| TIME | COMPUTER -NODE IDENTIFIER 601 | I/O-DTMN- PROCESSING COUNTER 602 | COMPUTER-NODE PROCESS STATE 603 | | | | COMPUTER-NODE PROCESS STATE'S INDIVIDUAL DETAILED INF 604 |
|---|---|---|---|---|---|---|---|
| | | | | | | | EXECUTION RESULT |
| T1 | 100A | C011 | OUTPUT | OUTPUT | 0 | BEGIN | x |
| | 100B | C011 | OUTPUT | OUTPUT | 0 | BEGIN | x |
| T1' | 100C | C011 | OUTPUT | OUTPUT | 0 | BEGIN | x |

| TIME | COMPUTER-NODE IDENTIFIER | I/O-DTMN-PROCESSING COUNTER | COMPUTER-NODE PROCESS STATE | | | COMPUTER-NODE PROCESS STATE'S INDIVIDUAL DETAILED INF | | |
|---|---|---|---|---|---|---|---|---|
| | | | OUTPUT | LEADER | | NODE IDENTIFIER | RANK | RESULT |
| T2 | 100A | C011 | OUTPUT | LEADER | 0 | BEGIN | 100A | 2 | x |
| | | | | | | | 100B | 1 | x |
| | | | | | | | 100C | — | - |
| | 100B | C011 | OUTPUT | LEADER | 0 | BEGIN | 100A | 2 | x |
| | | | | | | | 100B | 1 | x |
| | | | | | | | 100C | — | - |
| | 100C | C011 | OUTPUT | LEADER | 1 | BEGIN | 100A | 2 | x |
| | | | | | | | 100B | 1 | x |
| | | | | | | | 100C | 3 | x |

FIG. 45

| TIME | COMPUTER-NODE IDENTIFIER | I/O-DTMN-PROCESSING COUNTER | COMPUTER-NODE PROCESS STATE | | | COMPUTER-NODE PROCESS STATE'S INDIVIDUAL DETAILED INF |
|---|---|---|---|---|---|---|
| T3 | 100A | C012 | OUTPUT | VOTER | 0 MONITOR | – |
|  | 100B | C012 | OUTPUT | VOTER | 0 LEADER | – |
|  | 100C | C012 | OUTPUT | VOTER | 0 MONITOR | – |

FIG. 46

CONTENTS OF INTER-NODE COM PACKET OF
COMPUTER NODE 100A, 100B FOR TIME-T1 LIST CREATION

| TIME | COMPUTER-NODE IDENTIFIER | I/O-DTMN-PROCESSING COUNTER | COMPUTER-NODE PROCESS STATE | | | | COMPUTER-NODE PROCESS STATE'S INDIVIDUAL DETAILED INF |
|---|---|---|---|---|---|---|---|
| | | | | | | | EXECUTION RESULT |
| T1 | 100A | C011 | OUTPUT | OUTPUT | 0 | BEGIN | x |
| | 100B | C011 | OUTPUT | OUTPUT | 0 | BEGIN | x |

FIG. 47

CONTENTS OF INTER-NODE COM PACKET OF
COMPUTER NODE 100A, 100B, 100C FOR TIME-T2 LIST CREATION

| TIME | COMPUTER-NODE IDENTIFIER | I/O-DTMN-PROCESSING COUNTER | COMPUTER-NODE PROCESS STATE | | | COMPUTER-NODE PROCESS STATE'S INDIVIDUAL DETAILED INF | | |
|---|---|---|---|---|---|---|---|---|
| | | | | | | NODE IDENTIFIER | RANK | RESULT |
| T2 | 100A | C011 | OUTPUT | LEADER | 0 | BEGIN | 100A | 2 | x |
| | | | | | | | 100B | 1 | x |
| | | | | | | | 100C | 3 | x |
| | 100B | C011 | OUTPUT | LEADER | 0 | BEGIN | 100A | 2 | x |
| | | | | | | | 100B | 1 | x |
| | | | | | | | 100C | 3 | x |
| | 100C | C011 | OUTPUT | LEADER | 1 | BEGIN | 100A | 2 | x |
| | | | | | | | 100B | 1 | x |
| | | | | | | | 100C | 3 | x |

FIG. 48

CHANGE IN ON-EACH-TIME-BASIS
COMPUTER-NODE-CONFIGURATION MNG TABLE 3

INPUT SYNC-TIME COMPUTER NODES' TOTAL NUMBER: 317A

| TIME | COMPUTER-NODE IDENTIFIER | I/O-DTMN-PROCESSING COUNTER | COMPUTER-NODE PROCESS STATE ||||
|---|---|---|---|---|---|---|
| | | | PROCESS-STATE IDENTIFIER | ADDITIONAL INF | Penalty | PROCESS STATE |
| T1 | 100A | C011 | OUTPUT | OUTPUT | 0 | E |
| | 100B | C011 | OUTPUT | OUTPUT | 0 | E |
| | 100C | C011 | OUTPUT | OUTPUT | 0 | E |
| T2 | 100A | C011 | OUTPUT | LEADER | 0 | E |
| | 100B | C011 | OUTPUT | LEADER | 1 | E |
| | 100C | C011 | OUTPUT | LEADER | 0 | E |
| T3 | 100A | C012 | OUTPUT | VOTER | 0 | MONITOR |
| | 100B | C012 | OUTPUT | VOTER | 0 | LEADER |
| | 100C | C012 | OUTPUT | VOTER | 1 | MONITOR |

1180 — T1 row
1181 — T2 row
1182 — T3 row

FIG. 49

DETERMINED-INPUT MNG TABLE OF COMPUTER NODE 100A, 100B, 100C

| OUTPUT SYNC-TIME COMPUTER NODES' TOTAL NUMBER | | | 3 | | | |
|---|---|---|---|---|---|---|
| RANK | COMPUTER-NODE IDENTIFIER | I/O-DTMN-PROCESSING COUNTER | COMPUTER-NODE PROCESS STATE | | | EXECUTION RESULT |
| | | | PROCESS-STATE IDENTIFIER | ADDITIONAL INF | Penalty | PROCESS STATE | |
| 1 | 100B | C012 | OUTPUT | VOTER | 0 | MONITOR | X |
| 2 | 100A | C012 | OUTPUT | VOTER | 0 | LEADER | X |
| 3 | 100C | C012 | OUTPUT | VOTER | 1 | MONITOR | X |

COMPUTER SYSTEM INCLUDING PLURAL COMPUTER NODES SYNCHRONIZED WITH EACH OTHER

TECHNICAL FIELD

The present invention relates to technologies for establishing the synchronization among a plurality of computers in a parallel redundancy computing system where these computers are connected to each other via a network.

BACKGROUND ART

There exists the following type of technologies: Namely, a plurality of computers are connected to each other via a network. At this time, each of these computers executes one and the same task application, thereby constructing a high-reliability and high-availability system. In particular, in order to ensure the task's continuity at the time of a failure, the fault-tolerant computer (which, hereinafter, will be referred to as "FTC") technology has been in widespread use. Here, the FTC technology is a synchronization scheme for operating a large number of computers in a manner of being synchronized with each other. Moreover, in the above-described FTC technology, the synchronization scheme for implementing the lockstep scheme at CPU's bus-clock level has been in widespread use (refer to PATENT LITERATURE 1). In recent years, however, in accompaniment with growing complexity of the CPU's configuration, attention has been focused on the synchronization scheme at software level (refer to PATENT LITERATURE 2).

CITATION LIST

Patent Literature

PATENT LITERATURE 1: JP-A-2006-209565
PATENT LITERATURE 2: JP-A-2009-217503

SUMMARY OF INVENTION

Technical Problem

In the conventional software-level synchronization scheme, the synchronization is established by setting up the synchronization check point inside an application. As a result, there has existed a problem that an overhead is caused to occur in the synchronization processing. Also, in an output processing of the fault-tolerant computer, a device, which is referred to as "a voter", is necessary in a separate and additional manner. Here, this voter device determines the output value from the FTC by making a majority-decision judgment using outputs from the plurality of respective FTC-configuring computers. Maintaining the high reliability and high availability, however, requires that the voter device be also in parallel redundancy formation.

In view of this situation, there are provided technologies for allowing the synchronization at software level to be implemented among a plurality of computers without using such a device as the voter device in a separate and additional manner. Also, a low-overhead synchronization method is provided.

Solution to Problem

There is provided a computer system including a plurality of computer nodes, each of the computer nodes including an external communications unit for receiving a processing request, an application unit for executing the processing in accordance with the processing request, a synchronization unit for controlling synchronization of the processing between each computer node and the other computer nodes, the processing being executed by the application unit of each computer node, and an inter-node communications unit for executing transmission/reception of information between each computer node and the other computer nodes. The synchronization unit of each computer node attaches the computer node's identification information to the processing request as transmission-source computer node's identification information, the synchronization unit of each computer node then transmitting the processing request to the other computer nodes via the inter-node communications unit, processing request's identification information being attached to the processing request received by the external communications unit. Also, the synchronization unit of each computer node receives processing requests from the other computer nodes as well via the inter-node communications unit, the other computer nodes' identification information being attached to the processing requests. Moreover, in accordance with a first predetermined judgment criterion, the synchronization unit of each computer node selects a processing request that should be executed by the application unit, the first predetermined judgment criterion being based on the number of the computer nodes that have received a processing request via the external communications units, the same processing request's identification information being attached to the processing request, the selection of the processing request being made from among the processing requests received by the inter-node communications unit from the other computer nodes, and the processing request received by the external communications unit. Finally, the application unit executes the processing request selected.

Advantageous Effects of Invention

It becomes possible to implement a fault-tolerant computer which allows the execution of a low-overhead synchronization processing. Also, it becomes possible to construct a fault-tolerant computer which requires none of the voter, i.e., a special device for the majority-decision judgment, and whose system configuration is simple.

BRIEF DESCRIPTION OF DRAWINGS

FIG. 2 This is a diagram for illustrating an example of the configuration of an externally-inputted packet.

FIG. 3 This is a diagram for illustrating an example of the configuration of an externally-inputted-packet management table.

FIG. 4 This is a diagram for illustrating an example of the configuration of a computer-node process state table.

FIG. 7 This is a diagram for illustrating an example of the configuration of a computer-node-configuration management table.

FIG. 8 This is a diagram for illustrating an example of the configuration of a determined-input management table.

FIG. 9 This is a diagram for illustrating an example of the configuration of a pre-determined-input management table.

FIG. 26 This is a diagram for illustrating an example of the inter-node communications packet used in the re-synchronization detection processing and re-synchronization processing.

FIG. 27 This is a diagram for illustrating an example of the processing sequence of each computer node in a case A.

FIG. 28 This is a diagram for exemplifying on each time basis the contents of the externally-inputted-packet management table, computer-node process state table, and input/output-determination-processing counter of each computer node in the case A.

FIG. 29 This is a diagram for exemplifying on each time basis the contents of the inter-node communications packet of each computer node for the transmission in the case A.

FIG. 30 This is a diagram for exemplifying on each time basis the contents of the inter-node communications packet of each computer node for the list creation in the case A.

FIG. 31 This is a diagram for exemplifying on each time basis the contents of the computer-node-configuration management table of an arbitrary computer node in the case A.

FIG. 32 This is a diagram for illustrating an example of the contents of the determined-input management table of each computer node in the case A.

FIG. 33 This is a diagram for illustrating an example of the contents of the pre-determined-input management table of a computer node 100B in the case A.

FIG. 35 This is a diagram for exemplifying on each time basis the contents of the externally-inputted-packet management table, computer-node process state table, and input/output-determination-processing counter of each computer node in the case B.

FIG. 36 This is a diagram for exemplifying on each time basis the contents of the inter-node communications packet of each computer node for the transmission in the case B.

FIG. 37 This is a diagram for exemplifying on each time basis the contents of the inter-node communications packet of each computer node for the list creation in the case B.

FIG. 38 This is a diagram for exemplifying on each time basis the contents of the computer-node-configuration management table of computer nodes 100A and 100B in the case B.

FIG. 39 This is a diagram for exemplifying on each time basis the contents of the computer-node-configuration management table of a computer node 100C in the case B.

FIG. 40 This is a diagram for illustrating an example of the contents of the determined-input management table of each computer node in the case B.

FIG. 41 This is a diagram for illustrating an example of the contents of the pre-determined-input management table of the computer node 100B in the case B.

FIG. 43 This is a diagram for illustrating an example of the contents of the inter-node communications packet of each computer node for the transmissions during times T1 and T1' in the case C.

FIG. 44 This is a diagram for illustrating an example of the contents of the inter-node communications packet of each computer node for the transmission during a time T2 in the case C.

FIG. 45 This is a diagram for illustrating an example of the contents of the inter-node communications packet of each computer node for the transmission during a time T3 in the case C.

FIG. 46 This is a diagram for illustrating an example of the contents of the inter-node communications packets of computer nodes 100A and 100B for the list creation during the time T1 in the case C.

FIG. 47 This is a diagram for illustrating an example of the contents of the inter-node communications packet of each computer node for the list creation during the time T2 in the case C.

FIG. 48 This is a diagram for exemplifying on each time basis the contents of the computer-node-configuration management table of an arbitrary computer node in the case C.

FIG. 49 This is a diagram for illustrating an example of the contents of the determined-output management table of each computer node in the case C.

DESCRIPTION OF EMBODIMENTS

Figure 1:
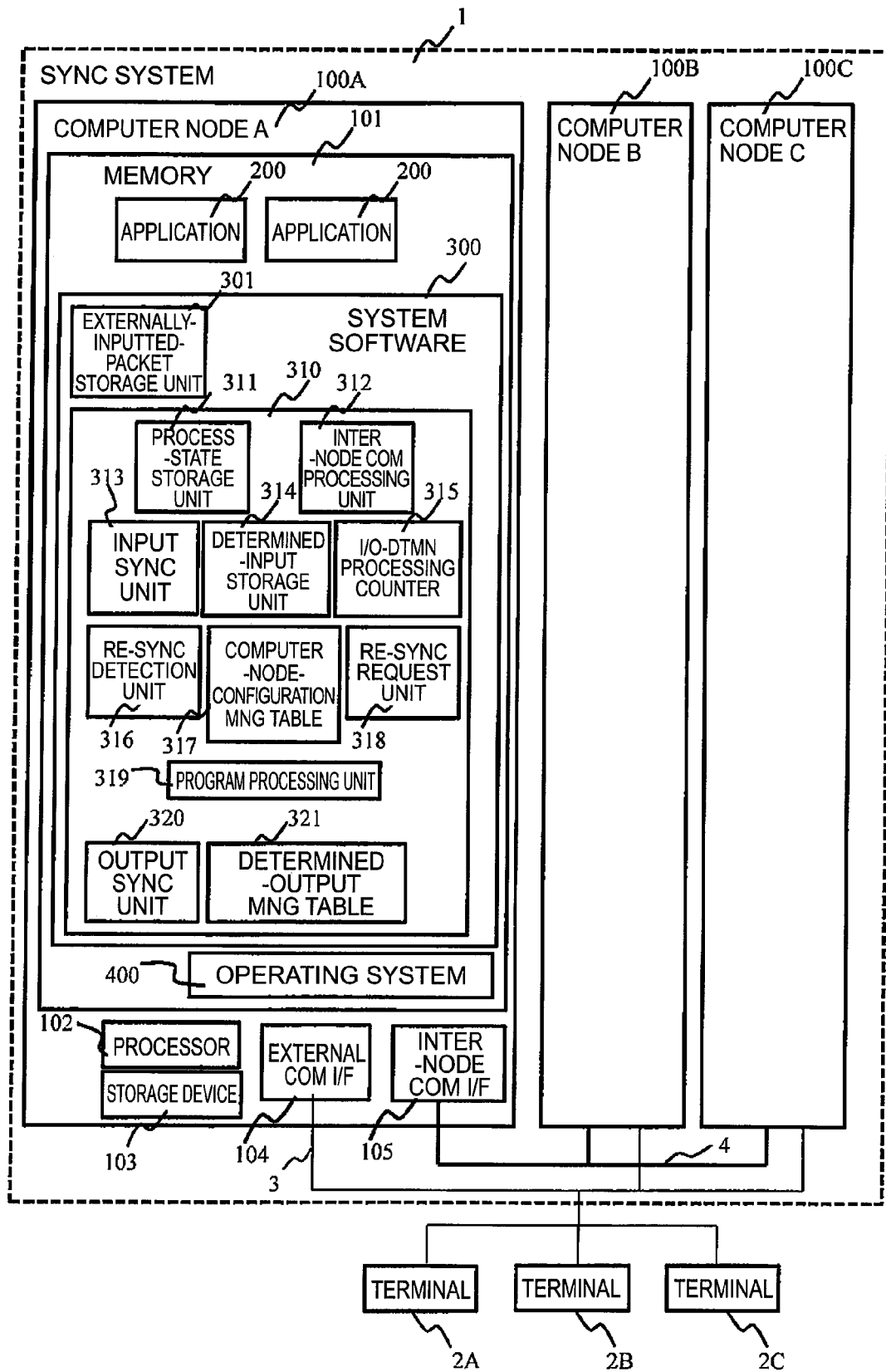
FIG. 1 This is a diagram for illustrating an example of the entire configuration of a majority-decision synchronization system.

Hereinafter, the explanation will be given below concerning embodiments of the present invention. The explanation will be given in such a manner as to be separated into the first embodiment and the second embodiment. In the first embodiment, after details of the embodiment are explained, three concrete cases will be assumed further, then explaining the embodiment on each case basis. In the second embodiment, based on the contents explained in the first embodiment, the explanation will be given regarding the processing in a case where a new computer node is added to the majority-decision synchronization (SYNC) system. Incidentally, the same reference numerals will be allocated to the same elements in the accompanying drawings.

The present invention is not limited to the embodiments. Namely, every application example that coincides with the idea and spirit of the present invention is included within the present invention.

Embodiment 1

<Entire Configuration (FIG. 1)>

FIG. 1 is a diagram for illustrating an example of the entire configuration of a majority-decision synchronization system. The majority-decision synchronization system is configured from a single synchronization system 1 (which is also referred to as "fault-tolerant computer"), a plurality of terminals 2, and an external network 3. The synchronization system 1 itself is configured from plural units of computer nodes 100 and an internal network 4.

The synchronization system 1 receives a plurality of externally-inputted packets 500 from the terminals 2 via the external network 3. Of the externally-inputted packets 500 transmitted from the terminals 2, a plurality of externally-inputted packets 500 that possess a cause-and-effect relationship arrive at the synchronization system 1 in such a manner that their transmission order is observed. The reason why their transmission order is observed is as follows: Namely, with respect to this type of externally-inputted packets 500, the synchronization system 1 receives a single externally-inputted packet 500 from a terminal 2. After that, the terminal 2 receives a response to this single externally-inputted packet 500 from the synchronization system 1. Only after that, an externally-inputted packet 500 next thereto is transmitted from the terminal 2 to the synchronization system 1. With respect to the externally-inputted packets 500 other than this type of externally-inputted packets 500, the transmission order in the terminal 2 and the reception order in the synchronization system 1 are not necessarily same with each other. Accordingly, order-indicating information (i.e., time stamp or sequence number) is attached to the externally-inputted packets 500 that are needed to be processed in the above-described transmission-order-observed manner.

Incidentally, the externally-inputted packets 500 are transmitted from the terminals 2 to the synchronization system 1 in accordance with the multi-cast scheme. The responses thereto (such as the processing results) are also returned from the synchronization system 1 to the terminals 2 in accordance with the multi-cast scheme. Also, it is assumed that an application executed in the synchronization system 1 is not equipped with its internal state (such as open state's file or network connection).

Each computer node 100 includes the following pieces of hardware: A memory 101, a processor 102, a secondary storage device 103, an external communications (COM) interface (I/F) 104, and an inter-node communications I/F 105. These pieces of hardware are connected to each other via communications paths such as internal buses. Software programs for controlling each computer node 100 are configured from applications 200, infrastructure software 300, and an operating system 400. Moreover, the infrastructure software 300 is basically separated into an externally-inputted-packet storage unit 301 and an input/output synchronization unit 310. The input/output synchronization unit 310 is configured from a process-state storage unit 311, an inter-node communications processing unit 312, an input synchronization unit 313, a determined-input storage unit 314, an input/output-determination-processing counter 315, a re-synchronization detection unit 316, a computer-node-configuration management table 317, a re-synchronization request unit 318, a program processing unit 319, an output synchronization unit 320, and a determined-output management table 321. Each of the plurality of the computer nodes 100 included in the synchronization system 1 possesses basically the same hardware/software configurations. The example illustrated in FIG. 1 includes the three units of terminals 2A, 2B, and 2C, and the three units of computer nodes 100A, 100B, and 100C. The number of these components, however, is not particularly limited. Also, the number of the applications 200, and the number of their types are not particularly limited, either.

The terminals 2 and the computer nodes 100 are connected to each other via the external network 3. On the side of the computer nodes 100, the external network 3 is connected to the external communications I/F 104. The computer nodes 100A, 100B, and 100C included in the synchronization system 1 are connected to each other via the internal network 4 that is connected to the inter-node communications I/F 105.

Each terminal 2 transmits a request to the synchronization system 1 via the external network 3. Moreover, the synchronization system 1 processes this request, then returning the processed result to each terminal 2. Each computer node 100 included in the synchronization system 1 receives this request from each terminal 2 via the external network 3 and the external communications I/F 104. Furthermore, each computer node 100 transmits the request to the other computer nodes 100 as well via the internal network 4 and the inter-node communications I/F 105. In addition, each computer node 100 processes the request by performing a cooperated operation with the other computer nodes 100, then returning the processed result to each terminal 2.

The secondary storage device 103 included in each computer node 100 stores therein the applications 200, the system software 300, and the operating system 400. The processor 102 reads the applications 200, the system software 300, and the operating system 400 from the secondary storage device 103 into the memory 101. Moreover, within the memory 101, the processor 102 expands and executes the applications 200, the system software 300, and the operating system 400. Simultaneously, the processor 102 processes an interrupt performed from the external communications I/F 104 or the inter-node communications I/F 105. Hereinafter, the operations that will be explained as processings executed by the applications 200, the system software 300 (including its configuration components), and the operating system 400 are actually performed by the processor 102's executing these pieces of software. The external communications I/F 104 performs the transmission/reception of packets with each terminal 2 via the external network 3. The inter-node communications I/F 105 performs the transmission/reception of packets among the computer nodes 100 via the internal network 4.

The operating system 400 expanded into the memory 101 controls operations of the applications 200 and the system software 300. The externally-inputted-packet storage unit 301 and the input/output synchronization unit 310 of the infrastructure software 300 operate as mutually different tasks. The applications 200 are executed from the program processing unit 319, depending on the requirements.

The externally-inputted-packet storage unit 301, which possesses an externally-inputted-packet management table 550, stores the externally-inputted packet 500 received by the external communications I/F 104 into the externallyinputted-packet management table 550. The details of the externally-inputted packet 500 will be described later in association with FIG. 2. The details of the externally-inputted-packet management table 550 will be described later in association with FIG. 3.

The process-state storage unit 311, which possesses a computer-node process state table 700, records the process state of each computer node 100 into the computer-node process state table 700. The details of the computer-node process state table 700 will be described later in association with FIG. 4.

The inter-node communications processing unit 312, which controls communications processings among the computer nodes 100, performs the transmission/reception of an inter-node communications packet 600. The details of the inter-node communications packet 600 will be described later in association with FIG. 10.

The input synchronization unit 313 executes a processing target's inputted-packet selection-start processing S113 and a processing target's inputted-packet selection processing S114. The details of the processing target's inputted-packet selection-start processing S113 will be described later in association with FIG. 12. The details of the processing target's inputted-packet selection processing S114 will be described later in association with FIG. 13 to FIG. 16.

The determined-input storage unit 314, which possesses a determined-input management table 800 and a pre-determined-input management table 810, stores information about the externally-inputted packets 500 that are determined by the input synchronization unit 313, and are processed by the input/output synchronization unit 310. The details of the determined-input management table 800 will be described later in association with FIG. 7. The details of the pre-determined-input management table 810 will be described later in association with FIG. 8.

The input/output-determination-processing counter 315 stores the counter value at a processing stage of a processing executed by each computer node 100. Moreover, the comparison of the input/output-determination-processing counter 315 is made between each computer node 100 and the other computer nodes 100. This comparison makes it possible to identify a period shift in the processing executed by each computer node 100.

The re-synchronization detection unit 316 performs an acceptance processing by detecting the following types of computer nodes 100: A computer node 100 that is going to newly participate in the synchronization system 1 where the plural units of computer nodes 100 are performing a cooperated operation with each other, or a computer node 100 that has been excluded once from the cooperated-operation-performing synchronization system 1, but is now trying to re-participate therein. The re-synchronization detection unit 316 executes a re-synchronization detection processing S111. The details of the re-synchronization detection processing S111 will be described later in association with FIG. 25.

The computer-node-configuration management table 317 executes the processing target's inputted-packet selection processing S114. The computer-node-configuration management table 317 is a table for storing information about a computer node 100 that makes a contribution to the determination of an externally-inputted packet 500 which becomes the processing target of a selected inputted-packet processing S115. The details of the computer-node-configuration management table 317 will be described later in association with FIG. 6.

The re-synchronization request unit 318 executes a re-synchronization request that is executed by the following types of computer nodes 100: A computer node 100 that is going to newly participate in the synchronization system 1 where the plural units of computer nodes 100 are performing a cooperated operation with each other, or a computer node 100 that has been excluded once from the cooperated-operation-performing synchronization system 1, but is now trying to re-participate therein. The re-synchronization request unit 318 executes a re-synchronization processing S118. The details of the re-synchronization processing S118 will be described later in association with FIG. 25.

The program processing unit 319 is a unit for selecting and starting up an application 200 in response to a processing request made from each terminal 2. The program processing unit 319 executes the selected inputted-packet processing S115. The details of the selected inputted-packet processing S115 will be described later in association with FIG. 17.

The output synchronization unit 320 makes a majority-decision judgment using execution results acquired by the applications 200 of each computer node 100. Furthermore, the output synchronization unit 320 performs the role-allocation of a leader and a monitor to each computer node 100, then performing an execution-result transmission processing to each terminal 2. The output synchronization unit 320 executes an execution-result determination processing S116. The details of the execution-result determination processing S116 will be described later in association with FIGS. 18 to 24.

The determined-output management table 321 is a table for storing information (INF) about a computer node 100 that has made a contribution to the execution-result determination processing S116. The details of the determined-output management (MNG) table 321 will be described later in association with FIG. 9.

<Externally-Inputted Packet (FIG. 2)>

FIG. 2 is a diagram for illustrating an example of the configuration of the externally-inputted packet 500. Each terminal 2 transmits the externally-inputted packets 500 to the synchronization system 1, thereby notifying the system 1 of a request instruction.

Transmission-source information 501 is information for identifying a transmission-source terminal 2. Sequence number 502 is information for uniquely identifying each of the plurality of externally-inputted packets 500 sent from the transmission-source terminal 2. The value of the sequence number 502 is set at a value that includes the identifier of the transmission-source terminal 2. This setting makes it possible to prevent the value of the sequence number 502 from being overlapped among the terminals 2. Transmission time stamp 503 is a point-in-time at which the transmission-source terminal 2 has sent each externally-inputted packet 500. Ordered-processing necessity/unnecessity flag 504 is information for identifying whether or not a series of ordering property exists among the plurality of externally-inputted packets 500 transmitted from the transmission-source terminal 2. Ordered-processing block number 505 indicates the number of the plurality of externally-inputted packets 500 where the series of ordering property exists. Ordered-processing start number 506 is the sequence number 502 of an externally-inputted packet 500 that positions at the front-end of the plurality of externally-inputted packets 500 where the series of ordering property exists. Contents 507 are configured from application identifier 508 and parameter 509, i.e., information related with execution of the applications 200. The application identifier 508 is information for specifying an application 200 that is to be executed within each computer node 100. The parameter 509 is parameter information that is to be passed over to the application 200.

<Externally-Inputted-Packet Management Table (FIG. 3)>

FIG. 3 is a diagram for illustrating an example of the configuration of the externally-inputted-packet management table 550. The externally-inputted-packet management table 550 is a table which is stored within the externally-inputted-packet storage unit 301, and which stores therein the externally-inputted packets 500 received by each computer node 100. The number of the externally-inputted packets 500 to be stored into the externally-inputted-packet management table 550 is not particularly limited.

Number 551 is a management number for uniquely identifying the externally-inputted packet 500 stored into the externally-inputted-packet management table 550. The received externally-inputted packet 500 is stored into the management table 550 without being modified. Accordingly, the columns (i.e., elements) other than the number 551 are basically the same as the elements of the externally-inputted packet 500.

<Computer-Node Process State Table (FIG. 4)>

FIG. 4 is a diagram for illustrating an example of the configuration of the computer-node process state table 700. The computer-node process state table 700 is stored into the process-state storage unit 311, and stores therein information about the process state of each computer node 100. The computer-node process state table 700 is configured from the columns of process-state identifier 701, additional information 702, Penalty 703, and process state 704.

The process-state identifier 701 and the process state 704 are the columns that store effective values always. The additional information 702 and the Penalty 703, however, store either effective values or ineffective values, depending on a value stored into the process-state identifier 701.

The process-state identifier 701 is the value for identifying the process state of each computer node 100. The identifiers mentionable as the process-state identifier 701 are as follows: "REJOIN-WAIT", "REJOIN-REQ", "REJOIN-ACK", "JOINED", "INPUT", and "OUTPUT".

"REJOIN-WAIT" indicates a state where each computer node 100 waits for a re-synchronization request from the other computer nodes 100. At the time of this state, "REJOIN-WAIT" is set into the process state 704 as well. The additional information 702 and the Penalty 703, however, do not store effective values (: row 705).

"REJOIN-REQ" indicates a state where the computer node 100 is performing a re-synchronization request. At the time of this state, "REJOIN-REQ" is set into the process state 704 as well. The additional information 702 and the Penalty 703, however, do not store effective values (: row 706).

"REJOIN-ACK" indicates a state where the computer node 100 has received the re-synchronization request from the other computer nodes 100. At the time of this state, "REJOIN-ACK" is set into the process state 704 as well. The additional information 702 and the Penalty 703, however, do not store effective values (: row 707).

"JOINED" indicates the following state: Namely, in response to the re-synchronization request that the computer node 100 has performed, the computer node 100 acquires the responses from the other computer nodes 100. Moreover, the computer node 100 reflects the acquired information on the computer node 100 itself. At the time of this state, "JOINED" is set into the process state 704 as well. The additional information 702 and the Penalty 703, however, do not store effective values (: row 708).

"INPUT" indicates a state where the computer node 100 is performing an "input synchronization" processing. The "input synchronization" processing is a processing that is performed in order that the externally-inputted packets 500 stored in the externally-inputted-packet management table 550 of the computer node 100 are processed by the applications 200 of the computer node 100. Concretely speaking, the "input synchronization" processing is the processing wherein externally-inputted packets 500 of the processing targets and a computer node 100 for executing the applications 200 are determined by making the majority-decision judgment among the respective computer nodes 100. At the time of this state, the additional information 702 and the Penalty 703 become effective values. Namely, information determined at an input synchronization step 710 is stored into the additional information 702. The input synchronization step 710 is the number of the externally-inputted packets 500 that are acquired from the externally-inputted-packet management table 550. The Penalty 703 can assume, for example, either "0" as the initial value, or "1" as a value other than the initial value. The case where the Penalty 703 assumes "1" indicates that the computer node 100 has not participated temporarily in the "input synchronization" processing performed between the computer node 100 and the other computer nodes 100. At this time, "BEGIN" or "END" is stored into the process state 704. "BEGIN" indicates a state where the computer node 100 is executing the "input synchronization" processing. "END" indicates a state where the computer node 100 has completed the "input synchronization" processing (: row 709).

"OUTPUT" indicates a state where the computer node 100 is performing an "output synchronization" processing. The "output synchronization" processing is the following processing: Namely, in the "output synchronization" processing, the processing results acquired by the applications 200 are confirmed by making the majority-decision judgment between the computer node 100 and the other computer nodes 100 with the use of the processing results acquired by the applications 200. Moreover, a "leader" computer node 100 and a "monitor" computer node 100 are decided, and the processing results are outputted to the terminal 2. Here, the "leader" computer node 100 plays a role of outputting the processing results to the terminal 2. Meanwhile, the "monitor" computer node 100 plays a role of supervising the state of the "leader" computer node 100 after having outputted the processing results. At the time of this state, the additional information 702 becomes an effective value. Namely, the additional information 702 stores whatever value of "OUTPUT", "LEADER", and "VOTER".

If the additional information 702 is "OUTPUT", "OUTPUT" indicates that the computer node 100 is at a stage of performing the following sharing processing: Namely, the computer node 100 shares the applications 200's processing results between the computer node 100 and the other computer nodes 100. While the sharing processing is under execution, "BEGIN" is stored into the process state 704. When the sharing processing is completed, "END" is stored into the process state 704. Also, the Penalty 703 becomes an effective column where the Penalty 703 assumes, for example, either "0" as the initial value, or "1" as a value other than the initial value. The case where the Penalty 703 assumes "1" indicates that the computer node 100 has not participated temporarily in the output synchronization processing.

If the additional information 702 is "LEADER", "LEADER" indicates that the computer node 100 is in a state of executing the role-decision processing and the sharing processing. Here, the role-decision processing decides the "leader" role's computer node 100 and the "monitor" role's computer node 100. Also, the sharing processing shares the processing results between the computer node 100 and the other computer nodes 100. While the role-decision processing and the sharing processing are under execution, "BEGIN" is stored into the process state 704. When both of the processings are completed, "END" is stored into the process state 704.

If the additional information 702 is "VOTER", "VOTER" indicates that the computer node 100 is in a state of performing the following processing: Namely, the computer node 100 outputs the applications 200's processing results as the "leader" role's or "monitor" role's computer node 100. When the computer node 100 performs the output processing as the "leader" role, "LEADER" is stored into the process state 704. When the computer node 100 performs the output processing as the "monitor" role, "MONITOR" is stored into the process state 704 (: row 711).

<Computer-Node Process-State Transition Table (FIG. 5)>

Figure 5:
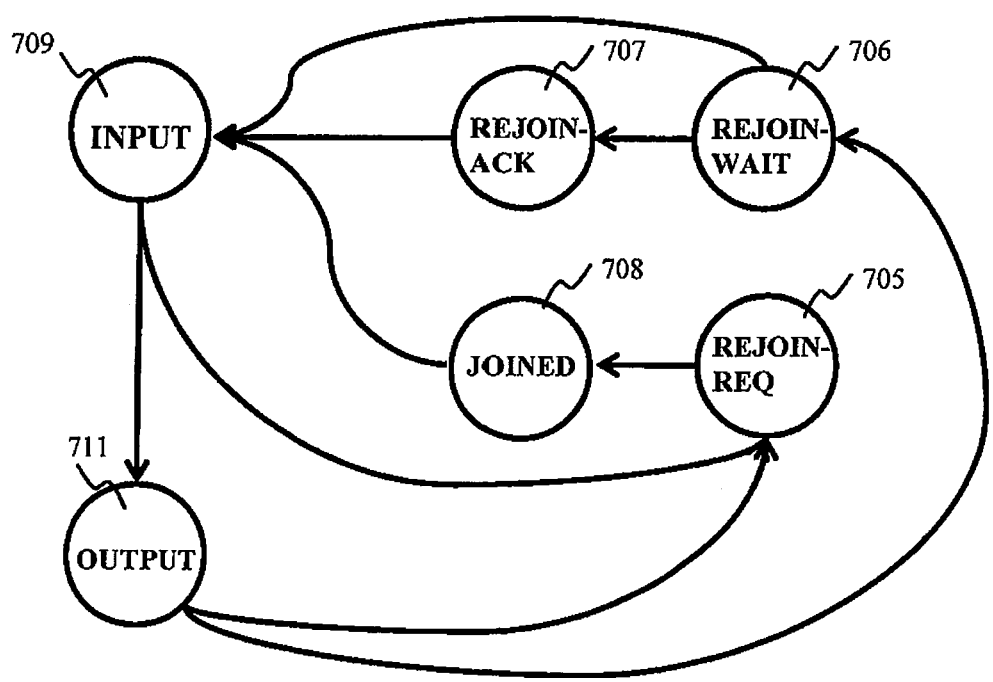
FIG. 5 This is a diagram for illustrating an example of the transition of the process state of a computer node.

FIG. 5 is a diagram for illustrating an example of the transition of the process state of each computer node 100. REJOIN-WAIT 706, REJOIN-REQ 705, REJOIN-ACK 707, JOINED 708, INPUT 709, and OUTPUT 711 illustrated in FIG. 5 coincide with the identifiers set in the process-state identifier 701 of the computer-node process state table 700.

The computer node 100 in the REJOIN-WAIT-706 process state transitions to the INPUT-709 process state after transitioning to the REJOIN-ACK-707 process state. Otherwise, the computer node 100 in the REJOIN-WAIT-706 process state transitions to the INPUT-709 process state directly. The computer node 100 in the REJOIN-REQ-705 process state transitions to the INPUT-709 process state after transitioning to the JOINED-708 process state. The computer node 100 in the INPUT-709 process state transitions to the OUTPUT-711 process state or the REJOIN-REQ-705 process state. The computer node 100 in the OUTPUT-711 process state transitions to the REJOIN-WAIT-706 process state or the REJOIN-REQ-705 process state.

<Inter-Node Communications Packet (FIG. 6)>

Figure 6:
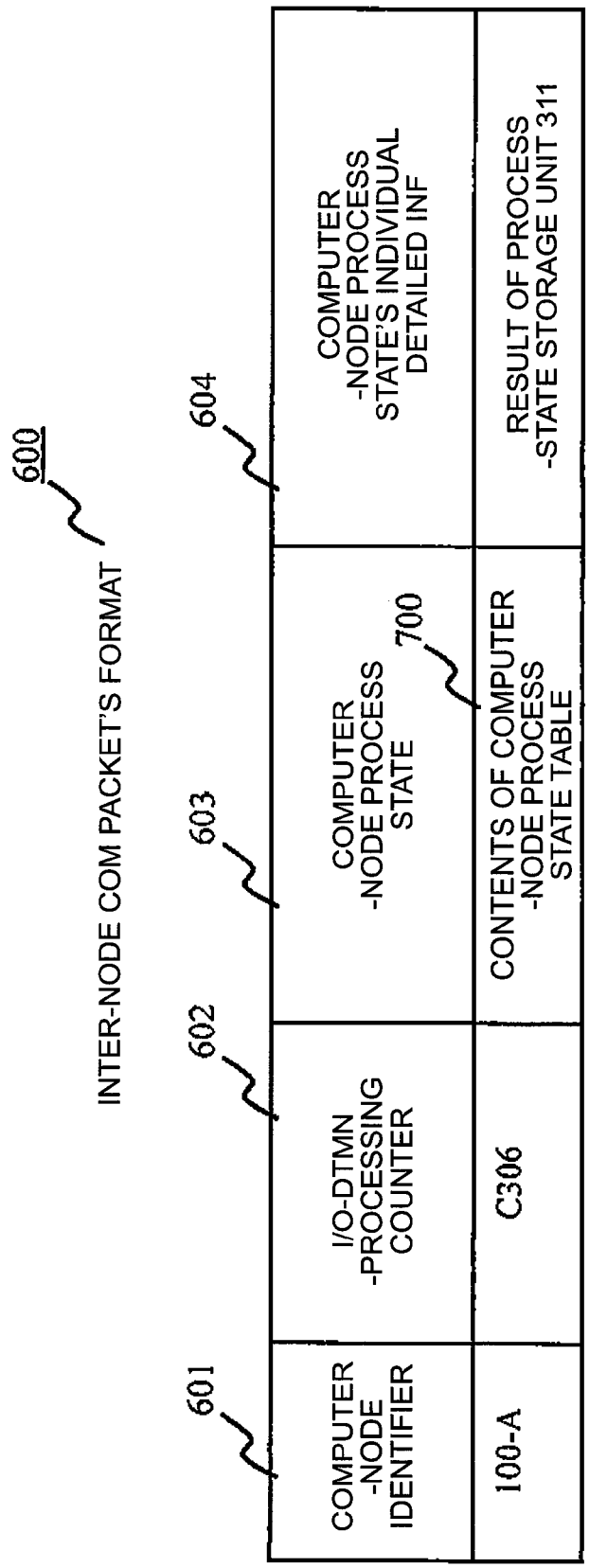
FIG. 6 This is a diagram for illustrating an example of the configuration of an inter-node communications packet.

FIG. 6 is a diagram for illustrating an example of the configuration of the inter-node communications packet 600. The inter-node communications packet 600 is a communications packet that is used when information communications are performed among the computer nodes 100. The inter-node communications packet 600 is configured from computer-node identifier 601, input/output (I/O)-determination (DTMN)-processing counter 602, computer-node process state 603, and computer-node process state's individual detailed information 604.

The computer-node identifier 601, which is information for uniquely identifying the computer node 100 within the synchronization system 1, sets therein the identifier of the computer node 100 that has created the inter-node communications packet 600. The input/output-determination-processing counter 602 is a value of the input/output-determination-processing counter 315 of the computer node 100 that has created the inter-node communications packet 600. The computer-node process state 603, which possesses basically the same configuration as that of the computer-node process state table 700, stores therein the process state of the computer node 100 that has created the inter-node communications packet 600. The computer-node process state's individual detailed information 604, which does not possesses a specific configuration, sets therein information that addresses usages when the inter-node communications packet 600 is transmitted from time to time.

<Computer-Node-Configuration Management Table (FIG. 7)>

FIG. 7 is a diagram for illustrating an example of the configuration of the computer-node-configuration management table 317. The computer-node-configuration management table 317 is a table for storing information about a computer node 100 that has made a contribution to the input synchronization processing. The computer-node-configuration management table 317 is configured from the columns of input synchronization-time computer nodes' total number 317A, the computer-node identifier 601, the input/output-determination-processing counter 602, and the computer-node process state 603.

The columns of the computer-node identifier 601, the input/output-determination-processing counter 602, and the computer-node process state 603 store therein basically the same information as the same-name columns within the inter-node communications packet 600. The computer-node-configuration management table 317 is capable of storing the information by the amount of a plurality of computer nodes. The total number of the plurality of computer nodes whose information are recorded into the computer-node-configuration management table 317 is stored into the input synchronization-time computer nodes' total number 317A.

<Determined-Input Management Table (FIG. 8)>

FIG. 8 is a diagram for illustrating an example of the configuration of the determined-input management table 800. The determined-input management table 800 stores therein information about the externally-inputted packets 500 that are determined as the processing targets of the applications 200 as a result of the input synchronization processing. The determined-input management table 800 is configured from the columns of determined inputs' total number 801, and basically the same configuration as that of the externally-inputted packet 500, i.e., the transmission-source information-501 column, sequence number-502 column, transmission time stamp-503 column, ordered-processing necessity/unnecessity flag-504 column, ordered-processing block number-505 column, ordered-processing start number-506 column, application identifier-508 column, and parameter-509 column within contents 507. The information about the externally-inputted packets 500 can be stored in plural number, and this storage number is stored into the determined inputs' total number 801.

<Pre-Determined-Input Management Table (FIG. 9)>

FIG. 9 is a diagram for illustrating an example of the configuration of the pre-determined-input management table 810. In the input synchronization processing, if a plurality of computer nodes 100 which have acquired a certain externally-inputted packet 500 occupy the majority group within the synchronization system 1, a computer node 100, which has eventually belonged to the minority group that has not acquired this externally-inputted packet 500, is caused to share this externally-inputted packet 500. In this way, the applications 200 of the computer node 100 are also caused to execute a processing based on this externally-inputted packet 500. At this time, there exists a possibility that, after the applications 200 have executed the processing, the computer node 100 belonging to the minority group will acquire the externally-inputted packet 500 by itself via the external network 3. Accordingly, in order to avoid the resultant duplexed processing of the externally-inputted packet 500, the externally-inputted packet 500 that is wished to be excluded from the processing targets is recorded into the pre-determined-input management table 810.

The pre-determined-input management table 810 is configured from the columns of pre-determined inputs' total number 811, and basically the same configuration as that of the externally-inputted packet 500, i.e., the transmission-source information-501 column, sequence number-502 column, transmission time stamp-503 column, ordered-processing necessity/unnecessity flag-504 column, ordered-processing block number-505 column, ordered-processing start number-506 column, application identifier-508 column, and parameter-509 column within contents 507. The information about the externally-inputted packets 500 can be stored in plural number, and this storage number is stored into the pre-determined inputs' total number 811.

<Determined-Output Management Table (FIG. 10)>

Figure 10:
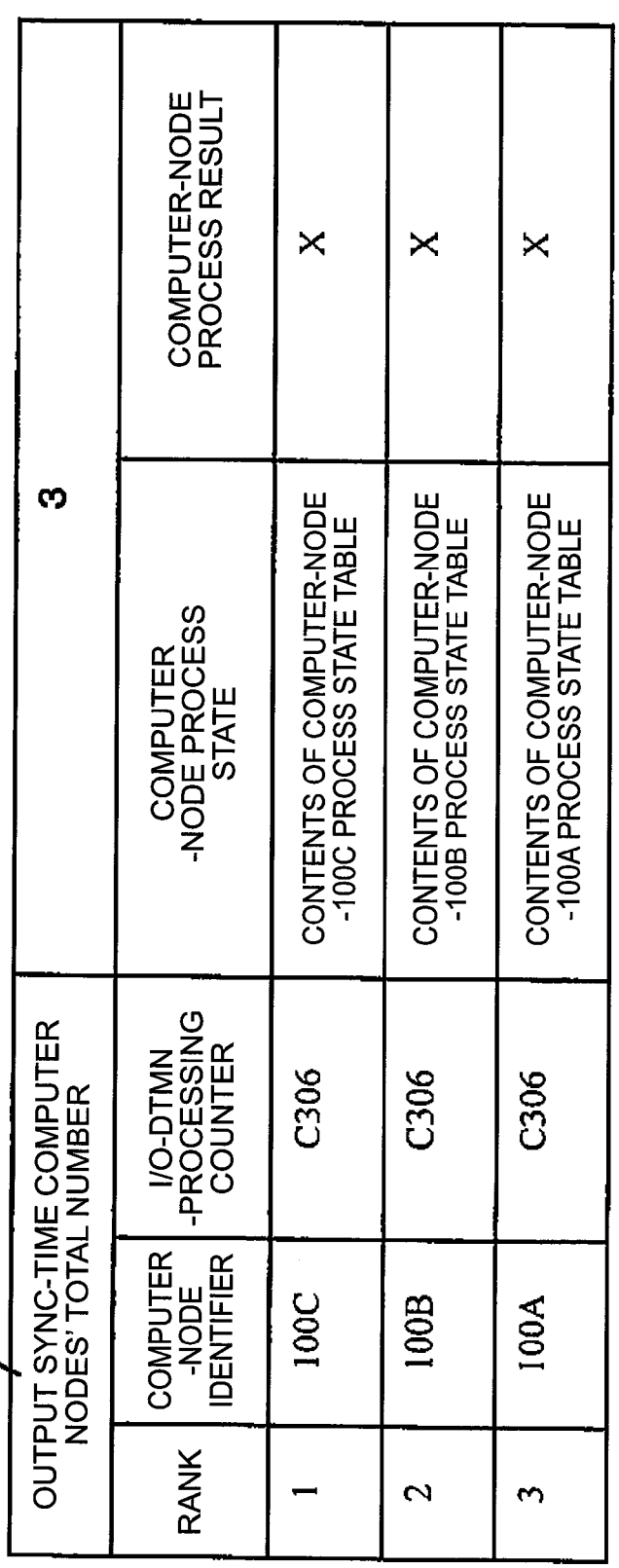
FIG. 10 This is a diagram for illustrating an example of the configuration of a determined-output management table.

FIG. 10 is a diagram for illustrating an example of the configuration of the determined-output management table 321. The determined-output management table 321 is a table for storing the information about a computer node 100 that has made a contribution to the output synchronization processing. The determined-output management table 321 is configured from the columns of output synchronization-time computer nodes' total number 321A, rank 321B, computer-node identifier 321C, input/output-determination-processing counter 321D, computer-node process state 321E (which are the same as the columns included within the inter-node communications packet 600), and computer-node process result 321F. The rank 321B means the priority rank at the time when a computer node 100 that becomes the "leader" role is selected from a plurality of computer nodes 100. The computer-node process result 321F stores therein the execution result of the applications 200.

The determined-output management table 321 is capable of storing the information about a plurality of computer nodes 100. The storage number is stored into the output synchronization-time computer nodes' total number 321A.

Hereinafter, referring to FIG. 11, the explanation will be given below concerning a processing for the synchronization system 1's capturing the externally-inputted packets 500 into the externally-inputted-packet management table 550, and a series of processings for the externally-inputted packets 500 captured therein. Of the series of processings for the captured externally-inputted packets 500, a processing of starting the selection of a processing target's externally-inputted packet 500 will be explained using FIG. 12. A processing of making the selection of the processing target's externally-inputted packet 500 will be explained using FIG. 13, FIG. 14, FIG. 15, and FIG. 16. A processing of starting up an application 200 for the selected processing target's externally-inputted packet 500 will be explained using FIG. 17. A processing of determining the execution result of the application 200 will be explained using FIG. 18, FIG. 19, FIG. 20, FIG. 21, FIG. 22, FIG. 23, and FIG. 24. Furthermore, referring to FIG. 25 and FIG. 26, the explanation will be given below regarding the re-synchronization detection processing and re-synchronization processing of the computer node 100. Incidentally, "step" will be abbreviated as "S" in the following explanation of each flowchart.

<Flowchart for the System-Software Processing (FIG. 11)>

Figure 11:
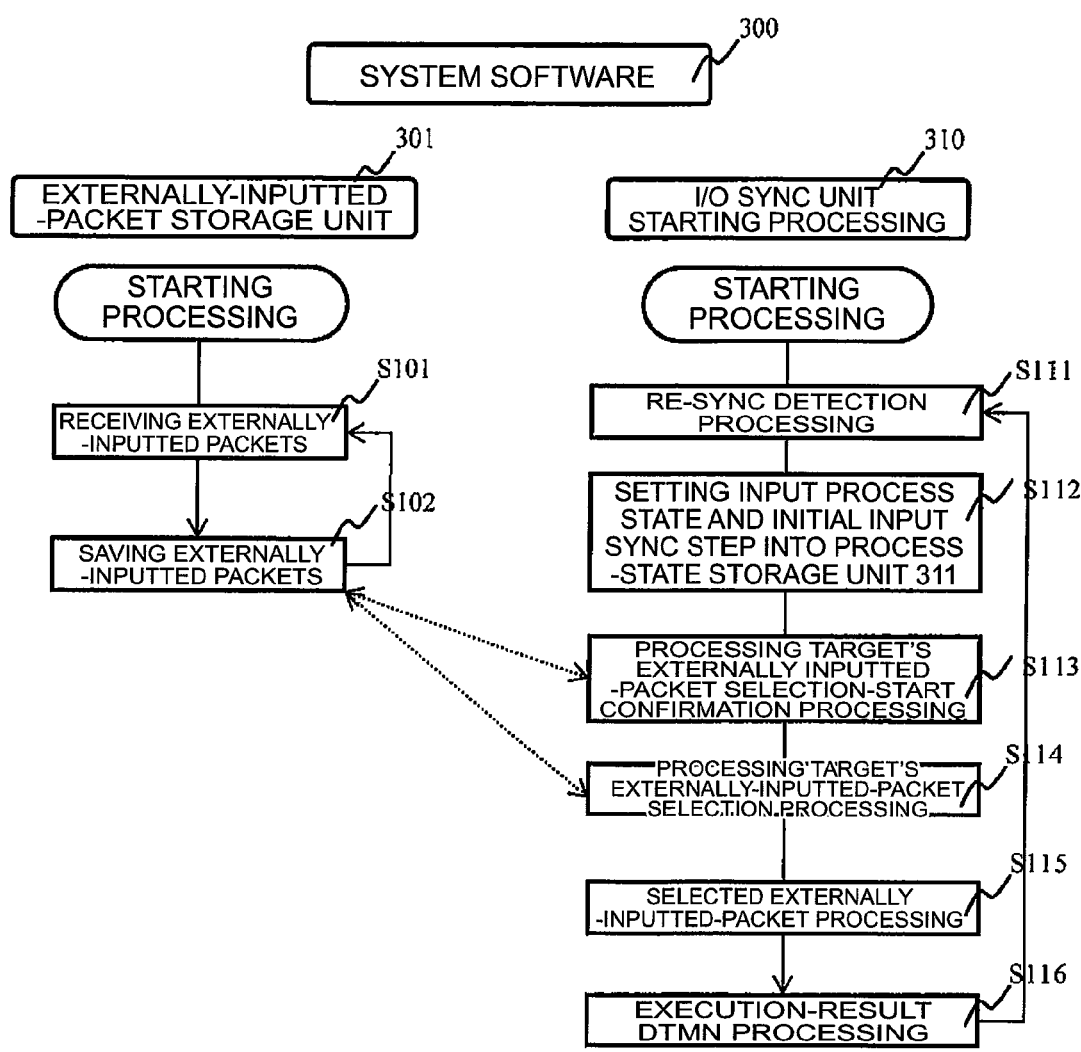
FIG. 11 This is a flowchart for illustrating an example of the system-software processing.

FIG. 11 is a flowchart for illustrating an example of the system-software processing. The system software 300 is basically separated into the externally-inputted-packet storage unit 301 and the input/output synchronization unit 310. The externally-inputted-packet storage unit 301 and the input/output synchronization unit 310 are started up by the operating system 400 as mutually different tasks, and thus operate independently of each other. FIG. 11 illustrates the flowchart for the processing that is executed by the externally-inputted-packet storage unit 301 and the input/output synchronization unit 310 each.

First, the externally-inputted-packet storage unit 301 detects the reception of the externally-inputted packets 500 via the external communications I/F 104 (S101).

Next, the externally-inputted-packet storage unit 301 stores the information about the received externally-inputted packets 500 into the externally-inputted-packet management table 550 (S102).

When the externally-inputted-packet save processing (: S102) is terminated, the externally-inputted-packet storage unit 301 transfers to the execution of the externally-inputted-packet reception processing (: S101) again, then repeating the above-described processing.

Meanwhile, first, the input/output synchronization unit 310 performs the detection of another computer node 100 that has made a re-synchronization request, and performs a synchronization processing regarding this computer node 100. The details of these processings will be described later in association with FIG. 25 and FIG. 26 (S111).

Next, the input/output synchronization unit 310 sets the "INPUT" value into the process-state identifier 701 of the computer-node process state table 700 of the process-state storage unit 311. Simultaneously, the unit 310 sets an initial value as the input synchronization step 710 into the additional information 702, and sets an initial value into Penalty 703 as well. The value given as the initial value of the input synchronization step 710 is, e.g., a value larger than "2". Meanwhile, the value given as the initial value of Penalty 703 is, e.g., "0" (S112).

Next, the input/output synchronization unit 310 performs a processing of judging whether or not it is possible to start the selection of an externally-inputted packet 500 that becomes the processing target. The details of this processing will be described later in association with FIG. 12 (S113).

Next, the input/output synchronization unit 310 performs a processing of making the selection of the externally-inputted packet 500 that becomes the processing target. The details of this processing will be described later in association with FIG. 13, FIG. 14, FIG. 15, and FIG. 16 (S114).

Next, the input/output synchronization unit 310 executes an application 200, thereby performing a processing of the externally-inputted packet 500 that is selected in the processing target's externally-inputted-packet selection processing S114. The details of this processing will be described later in association with FIG. 17 (S115).

Next, the input/output synchronization unit 310 shares, among the computer nodes 100, the processing result of the externally-inputted packet 500 processed by the application 200. Moreover, the unit 310 decides the "leader" role's computer node 100 for outputting the processing result to the terminal 2, and the "monitor" role's computer node 100 for supervising the output state. Furthermore, the "leader" role's computer node 100 outputs the processing result to the terminal 2. The details of these processings will be described later in association with FIG. 18, FIG. 19, FIG. 20, FIG. 21, FIG. 22, FIG. 23, and FIG. 24 (S116).

When the execution-result determination processing S116 is terminated, the input/output synchronization unit 310 executes the re-synchronization detection processing S111 again, then repeating the above-described processing.

<Flowchart for the Processing Target's Externally-Inputted-Packet Selection-Start Confirmation Processing (FIG. 12)>

Figure 12:
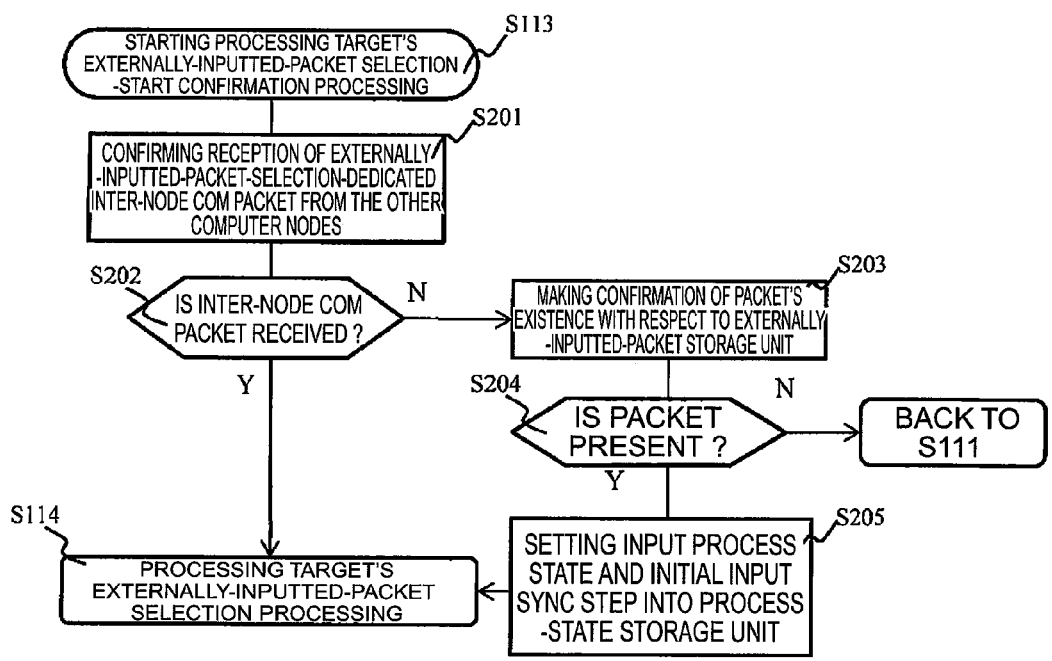
FIG. 12 This is a flowchart for illustrating an example of the processing target's externally-inputted-packet selection-start confirmation processing.

FIG. 12 is a flowchart for illustrating an example of the processing target's externally-inputted-packet selection-start confirmation processing S113 executed by the input/output synchronization unit 310.

Having started the processing target's externally-inputted-packet selection-start confirmation processing S113, the input/output synchronization unit 310 confirms whether or not the inter-node communications packet 600 for selecting the externally-inputted packet 500 that becomes the processing target has arrived at a self computer node 100 from another computer node 100 (S201 and S202). If the inter-node communications packet 600 has arrived thereat (: the result of S202 is "Y"), the input/output synchronization unit 310 executes S114. Meanwhile, if the inter-node communications packet 600 has not arrived thereat (: the result of S202 is "N"), the unit 310 executes S203.

At S203 and S204, the input/output synchronization unit 310 makes reference to the externally-inputted-packet management table 550, thereby making the confirmation of existence of the externally-inputted packet 500 that has arrived at the self computer node 100. If the confirmation of existence of the externally-inputted packet 500 can be made (: the result of S204 is "Y"), at S205, the input/output synchronization unit 310 sets the "INPUT" into the process-state identifier 701 of the computer-node process state table 700. Simultaneously, the unit 310 sets a value (e.g., 2) into the additional information 702 as the input synchronization step 710. After that, the unit 310 executes S114.

Meanwhile, if the confirmation of existence of the externally-inputted packet 500 cannot be made (: the result of S204 is "N"), this means that the externally-inputted packet 500 that becomes the processing target does not exist. Accordingly, the input/output synchronization unit 310 executes the re-synchronization detection processing S111, i.e., the initial execution processing.

The processing target's externally-inputted-packet selection processing S114 will be explained in a manner of being divided into FIG. 13, FIG. 14, FIG. 15, and FIG. 16. The starting portion of the processing target's externally-inputted-packet selection processing S114 will be explained using FIG. 13. The input-determined-packet transmission processing S400, which will be executed in a manner of following S114, will be explained using FIG. 14. The input process-state identicalization processing S500, which will be executed in a manner of following S400, will be explained using FIG. 15. The input majority-decision determination processing S600, which will be executed in a manner of following S500, will be explained using FIG. 16.

<Flowchart for the Processing Target's Externally-Inputted-Packet Selection Processing (FIG. 13)>

Figure 13:
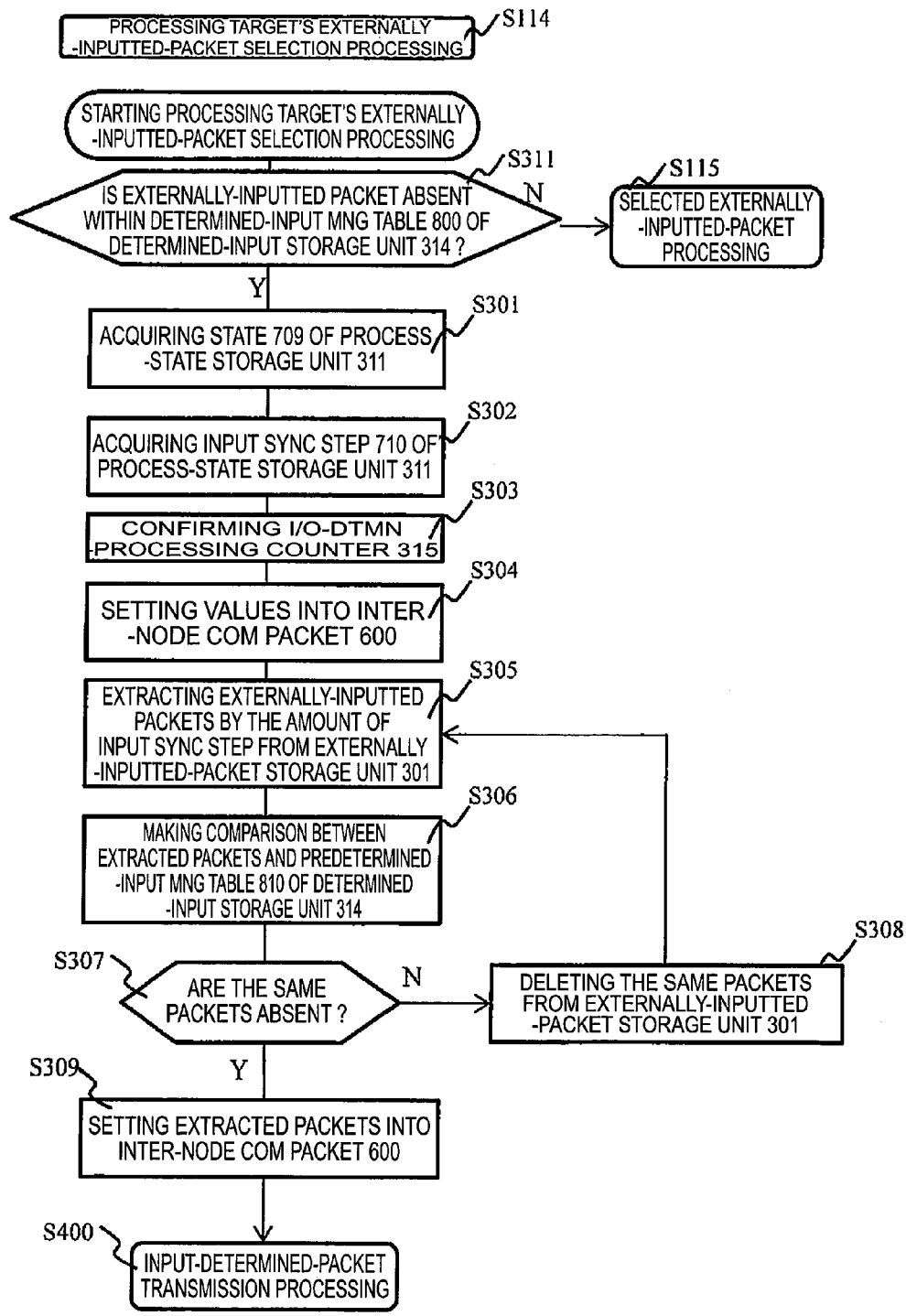
FIG. 13 This is a flowchart for illustrating an example of the processing target's externally-inputted-packet selection processing.

FIG. 13 is a flowchart for illustrating an example of the processing target's externally-inputted-packet selection processing S114 executed by the input/output synchronization unit 310.

Having started the processing target's externally-inputted-packet selection processing S114, the input/output synchronization unit 310, first, confirms whether or not information about an unprocessed externally-inputted packet 500 is registered in the determined-input management table 800 of the determined-input storage unit 314 (S311).

If, at S311, the information about the unprocessed externally-inputted packet 500 is stored in the determined-input management table 800 (: the result of S311 is "N"), the input/output synchronization unit 310 executes the selected externally-inputted-packet processing S115. This processing S115 is performed in order to process the information about the externally-inputted packet 500 with the highest priority.

Meanwhile, if the information about the unprocessed externally-inputted packet 500 is not stored in the determined-input management table 800 (: the result of S311 is "Y"), the input/output synchronization unit 310 starts up S301. This step S301 is started up in order that the unit 310 transitions to a processing of capturing information about a new externally-inputted packet 500 into the determined-input management table 800 of the determined-input storage unit 314.

At S301, the input/output synchronization unit 310 acquires the state value "INPUT" (S709) of a self computer node 100 from the process-state identifier 701 of the computer-node process state table 700 included in the process-state storage unit 311.

Next, the input/output synchronization unit 310 acquires the value of the input synchronization step 710 from the additional information 702 of the computer-node process state table 700 included in the process-state storage unit 311 (S302).

Next, the input/output synchronization unit 310 acquires the value of the input/output-determination-processing counter 315 (S303).

Next, the input/output synchronization unit 310 sets values into the inter-node communications packet 600. Concretely speaking, the unit 310 sets the identifier of the self computer node 100 into the computer-node identifier 601. The unit 310 sets the input/output-determination-processing counter 315 acquired at S303 into the input/output-determination-processing counter 602. The unit 310 sets, into the computer-node process state 603, the computer-node process-state information of the computer-node process state table 700 acquired at S301 and S302 (S304).

Next, from the externally-inputted-packet management table 550 of the externally-inputted-packet storage unit 301, the input/output synchronization unit 310 acquires information about the externally-inputted packets 500 by the amount of the input synchronization step 710 (S305).

At S306, the input/output synchronization unit 310 confirms the following situation: Namely, of the acquired information about the above-described externally-inputted packets 500, there exists none of information about externally-inputted packets 500 identical to the information about the externally-inputted packets 500 stored within the pre-determined-input management table 810 (S306 and S307).

If, at S307, the same information about the externally-inputted packets 500 as the acquired information about the externally-inputted packets 500 exist within the pre-determined-input management table 810 (: the result of S307 is "N"), the input/output synchronization unit 310 deletes the same information about the externally-inputted packets 500 from the externally-inputted-packet management table 550 (S308). Moreover, the unit 310 extracts, from the externally-inputted-packet management table 550, information about externally-inputted packets 500 whose number is the same as the number of the externally-inputted packets 500 deleted (S305).

Meanwhile, if at S307, the same information about the externally-inputted packets 500 as the acquired information about the externally-inputted packets 500 do not exist within the pre-determined-input management table 810 (: the result of S307 is "Y"), the input/output synchronization unit 310 executes S309.

At S309, the input/output synchronization unit 310 sets the acquired information about the externally-inputted packets 500 into the computer-node process state's individual detailed information 604 of the inter-node communications packet 600.

Having completed the creation of the inter-node communications packet 600 up to the present step, the input/output synchronization unit 310 executes the input-determined-packet transmission processing S400.

<Flowchart for the Input-Determined-Packet Transmission Processing (FIG. 14)>

Figure 14:
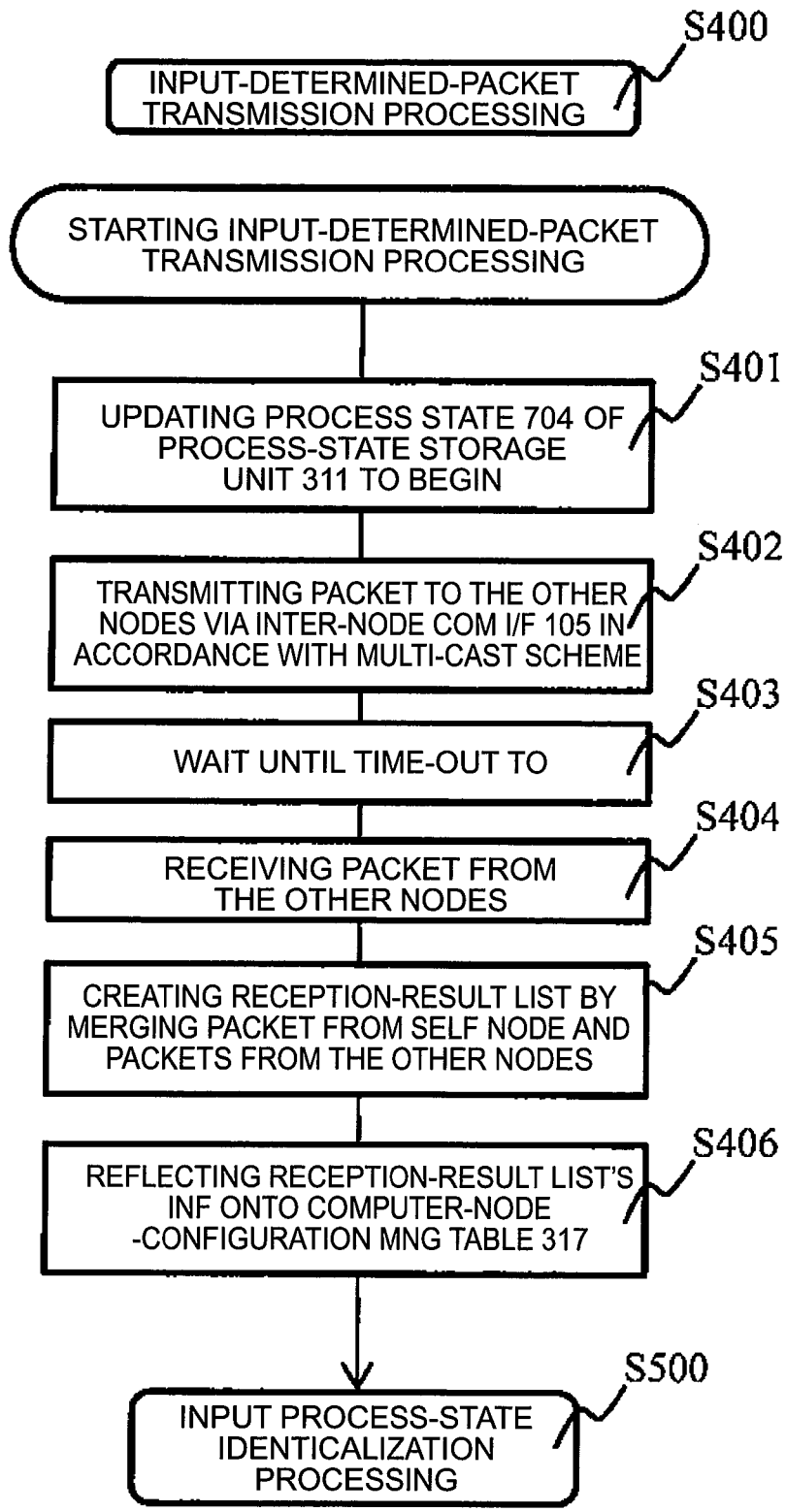
FIG. 14 This is a flowchart for illustrating an example of the input-determined-packet transmission processing.

FIG. 14 is a flowchart for illustrating an example of the input-determined-packet transmission processing S400, which is a partial processing of the processing target's externally-inputted-packet selection processing S114 executed by the input/output synchronization unit 310.

Having started the input-determined-packet transmission processing S400, the input/output synchronization unit 310, first, updates, to "BEGIN", the value of the computer-node process state 704 of the computer-node process state table 700 included in the process-state storage unit 311 (, and simultaneously, the unit 310 also updates the value of the computer-node process state 603 of the inter-node communications packet 600 which has copied the state of the self computer node 100) (S401).

Next, the input/output synchronization unit 310 transmits the created inter-node communications packet 600 to the other computer nodes 100 via the inter-node communications I/F 105 in accordance with the multi-cast scheme (S402).

Next, the input/output synchronization unit 310 performs Wait until a time-out point-in-time in order to wait for an inter-node communications packet 600 to arrive thereat from the other computer nodes 100 (S403).

Next, the input/output synchronization unit 310 receives the inter-node communications packet 600 transmitted from the other computer nodes 100 (S404).

Next, the input/output synchronization unit 310 connects, to each other, the inter-node communications packet-600 information created at the self computer node 100, and the inter-node communications packet-600 information from another computer node 100 received at S404. By performing this merging processing, the unit 310 creates a "reception-result list". The "reception-result list" possesses basically the same column information as that of the inter-node communications packet 600 (S405). In this way, the connection processing is applied to the results of the respective computer nodes 100. As a consequence, even if a communications-incapable computer node exists due to a failure of a partial internal-communications path, the information about all of the respective computer nodes become sharable via the remaining communications-capable communications paths.

Next, the input/output synchronization unit 310 copies, of the reception-result list created at S405, the column information of the computer-node identifier 601, the input/output-determination-processing counter 602, and the computer-node process state 603 into the same column of the computer-node-configuration management table 317. At this time, the unit 310 updates the input synchronization-time computer nodes' total number 317A (S406).

Having completed the input-determined-packet transmission processing S400 up to the present step, the input/output synchronization unit 310 executes the input process-state identicalization processing S500.

<Flowchart for the Input Process-State Identicalization Processing (FIG. 15)>

Figure 15:
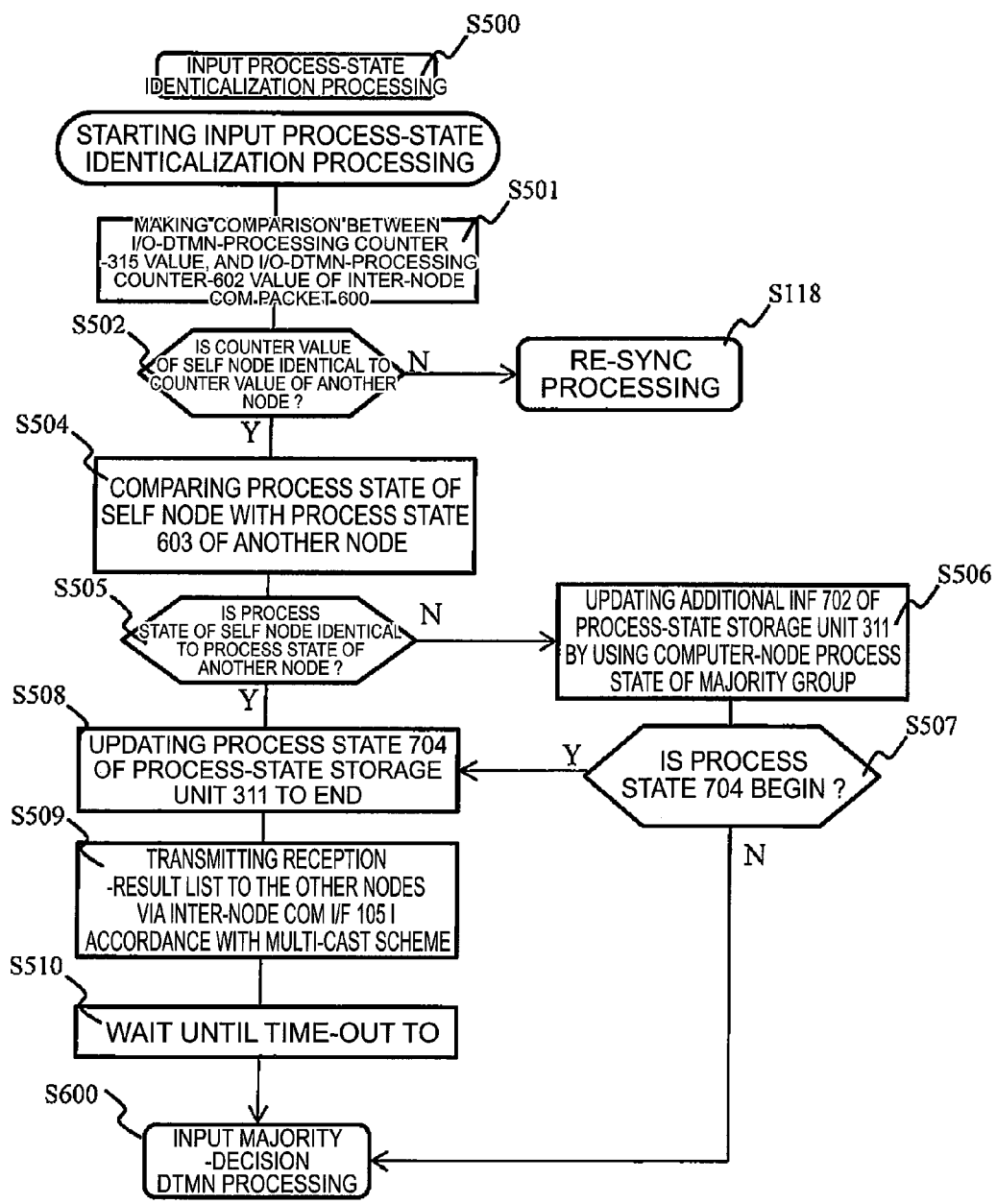
FIG. 15 This is a flowchart for illustrating an example of the input process-state identicalization processing.

FIG. 15 is a flowchart for illustrating an example of the input process-state identicalization processing S500, which is a partial processing of the processing target's externally-inputted-packet selection processing S114 executed by the input/output synchronization unit 310.

The processing performed in the input process-state identicalization processing S500 is the following processing: Namely, the process states of the respective computer nodes 100 in the "input synchronization" processing are caused to identicalize to each other among these respective computer nodes 100. The synchronization system 1 makes the majority-decision judgment on calculation results of the respective computer nodes 100, thereby ensuring reliability of the output information to each terminal 2. The respective computer nodes 100, however, are mutually-independent computers, and accordingly they operate in their mutually-different computer-node states. The carrying-out of the majority-decision judgment on the calculation results requires the calculation results of the plurality of computer nodes 100. In order to maximize the number of the computer nodes 100 that will participate in the majority-decision judgment on the calculation results, the synchronization is once established among the computer nodes 100 at an input stage of the calculation processing. The policy of the input process-state identicalization processing S500 is as follows: Namely, a computer node 100 whose processing period is obviously different is excluded. However, a slight delay in its computer-node process state is amended. This amendment of the slight delay makes it possible to maximize the number of the computer nodes 100 that will participate in the calculation processing, and the majority-decision judgment on the calculation results.

Having started the input process-state identicalization processing S500, the input/output synchronization unit 310, first, makes the comparison between the input/output-determination-processing counter 315, and the input/output-determination-processing counter 602 of the inter-node communications packet 600 received at S404 from the other computer nodes 100 (S501). By making this comparison, the input/output synchronization unit 310 makes the judgment as to whether or not the value of the input/output-determination-processing counter 315 of the self computer node 100 and that of the counter 315 of another computer node 100 identical to each other (S502). The self computer node 100 sometimes performs the transmission/reception of the inter-node communications packet 600 with a plurality of other computer nodes 100. Accordingly, the unit 310 receives a plurality of inter-node communications packets 600 in some cases. The "comparison" at S501 and the "judgment" at S502 mean the following "majority-decision judgment": Namely, in this "majority-decision judgment", the self computer node 100 and the other computer nodes 100 are classified based on the value of the input/output-determination-processing counter 315, and the one or plurality of values of the one or plurality of received input/output-determination-processing counters 602. By making this classification, the unit 310 determines into which of the majority group and the minority group the self computer node 100 is classified (S501 and S502).

Incidentally, when three or more groups are created as a result of the classification in this "majority-decision judgment", the self computer node may also be judged to be classified into "the majority group", if the self computer node is classified into a group to which the largest number of computer nodes belong. This is also basically the same in various "majority-decision judgments" that will be executed in the following processings.

If the self computer node 100 is classified into the minority group (: the result of S502 is "N"), the processing period of the self computer node 100 differs from that of the computer nodes 100 of the majority group. Accordingly, the input/output synchronization unit 310 executes the re-synchronization processing S118.

Meanwhile, if the self computer node 100 is classified into the majority group (: the result of S502 is "Y"), the processing periods are identical to each other. Consequently, the input/output synchronization unit 310 executes S504 that follows.

Next, the input/output synchronization unit 310 makes the comparison as to whether or not the computer-node process state of the self computer node 100 is identical to the computer-node process state of the other computer nodes 100. The "comparison" here also means the "majority-decision judgment". The comparison between these computer-node process states is made as follows: Namely, the comparison is made between the computer-node process state 603 (whose configuration columns are the same as those of the computer-node process state table 700) of the inter-node communications packet 600 received from the other computer nodes 100, and the values (i.e., the process-state identifier 701, the additional information 702, and the computer-node process state 704) of the computer-node process state table 700 of the self computer node 100 (S504 and S505).

If, at S505, the self computer node 100 is classified into the minority group (: the result of S505 is "N"), the computer-node process state of the self computer node 100 is not identical to the computer-node process states of the computer nodes 100 of the majority group. Accordingly, the input/output synchronization unit 310 executes S506. At S506, in order to cause the computer-node process state of the self computer node 100 to be identical to the computer-node process states of the majority group, the unit 310 updates the computer-node process state table 700 (process-state identifier 701, additional information 702, and computer-node process state 704) by using the value (i.e., computer-node process state 603) of the computer-node process state of the majority group. Also, the unit 310 sets a value (e.g., "1") into the Penalty 703 of the computer-node process state table 700.

Next, if the value of the process state 704 of the computer-node process state table 700 of the self computer node 100 is "BEGIN" (: the result of S507 is "Y"), the input/output synchronization unit 310 executes S508. Meanwhile, if the value of the process state 704 is "END" (: the result of S507 is "N"), the unit 310 terminates the input process-state identicalization processing S500, then executing the input majority-decision determination processing S600 (S507 and S508).

Meanwhile, if, at S505, the self computer node 100 is classified into the majority group (: the result of S505 is "Y"), the input/output synchronization unit 310 executes S508.

At S508, the input/output synchronization unit 310 updates, to "END", the process state 704 of the computer-node process state table 700 of the self computer node 100. As a result of this update, the respective computer nodes 100 fall into the following state: Namely, in this state, the respective computer nodes 100 complete the sharing of the information (i.e., "reception-result list") about the externally-inputted packets 500 that are acquired as the processing candidates by the input/output synchronization units 310 of the respective computer nodes 100 (S508).

Next, the input/output synchronization unit 310 transmits the values of the computer-node process state table 700 set into the inter-node communications packet 600, and the "reception-result list" to the other computer nodes 100 via the inter-node communications I/F 105 in accordance with the multi-cast scheme (S509).

Next, the input/output synchronization unit 310 performs Wait until a time-out point-in-time in order to wait for the inter-node communications packet 600 to arrive thereat from the other computer nodes 100 (S510).

Having completed the input process-state identicalization processing S500 at the point-in-time when Wait is terminated, the input/output synchronization unit 310 executes the input majority-decision determination processing S600 next thereto.

<Flowchart for the Input Majority-Decision Determination Processing (FIG. 16)>

Figure 16:
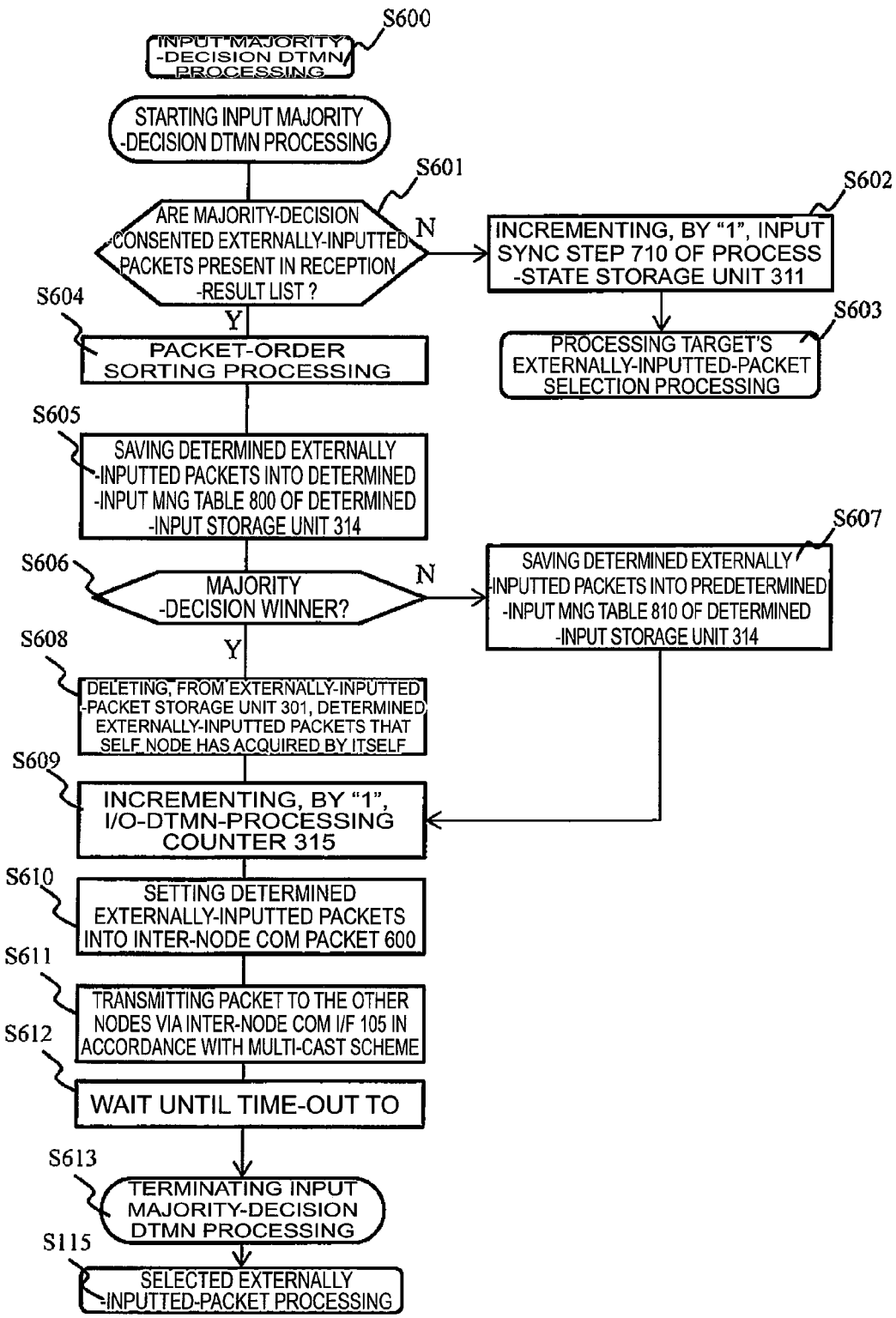
FIG. 16 This is a flowchart for illustrating an example of the input majority-decision determination processing.

FIG. 16 is a flowchart for illustrating an example of the input majority-decision determination processing S600, which is a partial processing of the processing target's externally-inputted-packet selection processing S114 executed by the input/output synchronization unit 310. In the input majority-decision determination processing S600, the externally-inputted packets 500 that become the processing targets of the applications 200 are determined.

Having started the input majority-decision determination processing S600, the input/output synchronization unit 310, first, makes reference to the "reception-result list". By performing this operation, the unit 310 confirms the presence or absence of externally-inputted packets 500 (which, hereinafter, will be referred to as "majority-decision-consented externally-inputted packets") that are acquired in common to computer nodes 100 whose number is larger than the half (S601). Here, "larger-than-the-half" may refers to the number that is larger than the half of the number of the computer nodes 100 whose information is registered into the computer-node-configuration management table at the present point-in-time. Otherwise, "larger-than-the-half" may refer to the number that is larger than the half of the number of the computer nodes 100 existing within the synchronization system 1.

If the majority-decision-consented externally-inputted packets do not exist (: the result of S601 is "N"), the input/output synchronization unit 310 executes S602. By executing S602, the unit 310 increments, by "1", the value of the additional information 702 (i.e., input synchronization step 710) of the computer-node process state table 700 of the process-state storage unit 311. In this way, the unit 310 transfers the execution to the start position (i.e., S300) of the processing target's externally-inputted-packet selection processing S114.

Meanwhile, if the majority-decision-consented externally-inputted packets exist (: the result of S601 is "Y"), the unit 310 executes the next processing S604.

Next, the unit 310 performs a sorting of the order of externally-inputted packets 500 selected at S601. The order-sorted externally-inputted packets 500 will be referred to as "determined externally-inputted packets". The order-sorting is performed based on the sequence number 502 of each externally-inputted packet 500 (S604).

Next, the unit 310 saves the information about the externally-inputted packets 500, whose order is sorted at S604, into the determined-input management table 800 of the determined-input storage unit 314, then updating the determined inputs' total number 801 (S605).

Next, the input/output synchronization unit 310 makes the majority-decision judgment as to whether or not, of the information about the respective externally-inputted packets 500 saved into the determined-input management table 800 at S605, the self computer node 100 has acquired the same information as the information about the externally-inputted packets 500 acquired at S305 in FIG. 13 by the computer nodes 100 whose number is larger than the half (S606).

If the self computer node 100 has not acquired the same information (: the result of S606 is "N"), at S607, the unit 310 sets the information about the externally-inputted packets 500 into the pre-determined-input management table 810 of the determined-input storage unit 314, then updating the pre-determined inputs' total number 811. Subsequently, the unit 310 starts up S609. The information about the externally-inputted packets 500 are the processing targets of the applications 200, but are not information that the self computer node 100 has acquired by itself via the external network 3. Accordingly, there exists a possibility that the self computer node 100 will acquire via the external network 3 the information about the externally-inputted packets 500 that have arrived late with a delayed calculation period. In order to avoid the resultant multiplexed processing of one and the same externally-inputted packet 500, the information about the externally-inputted packet 500 is set into the pre-determined-input management table 810.

Meanwhile, If the self computer node 100 has acquired the same information (: the result of S606 is "Y"), the unit 310 starts up S608. By starting up S608, the unit 310 deletes, of the "determined externally-inputted packets", the information about the externally-inputted packets 500 that the self computer node 100 has acquired by itself via the external network 3. Here, this deletion is performed from the externally-inputted-packet management table 550 of the externally-inputted-packet storage unit 301. Subsequently, the unit 310 starts up S609.

At S609, the unit 310 increments, by "1", the input/output-determination-processing counter 315.

Next, the unit 310 sets the determined externally-inputted packets into the computer-node process state's individual detailed information 604 of (S610).

Next, the unit 310 transmits the inter-node communications packet 600 created at S610 to the other computer nodes 100 via the inter-node communications I/F 105 in accordance with the multi-cast scheme (S611).

Next, the unit 310 performs Wait until a time-out point-in-time in order to wait for the inter-node communications packet 600 to arrive thereat from the other computer nodes 100 (S612).

Having completed the input majority-decision determination processing S600 at the point-in-time when Wait is terminated, the input/output synchronization unit 310 executes the selected externally-inputted-packet processing S115 next thereto.

<Flowchart for the Selected Externally-Inputted-Packet Processing (FIG. 17)>

Figure 17:
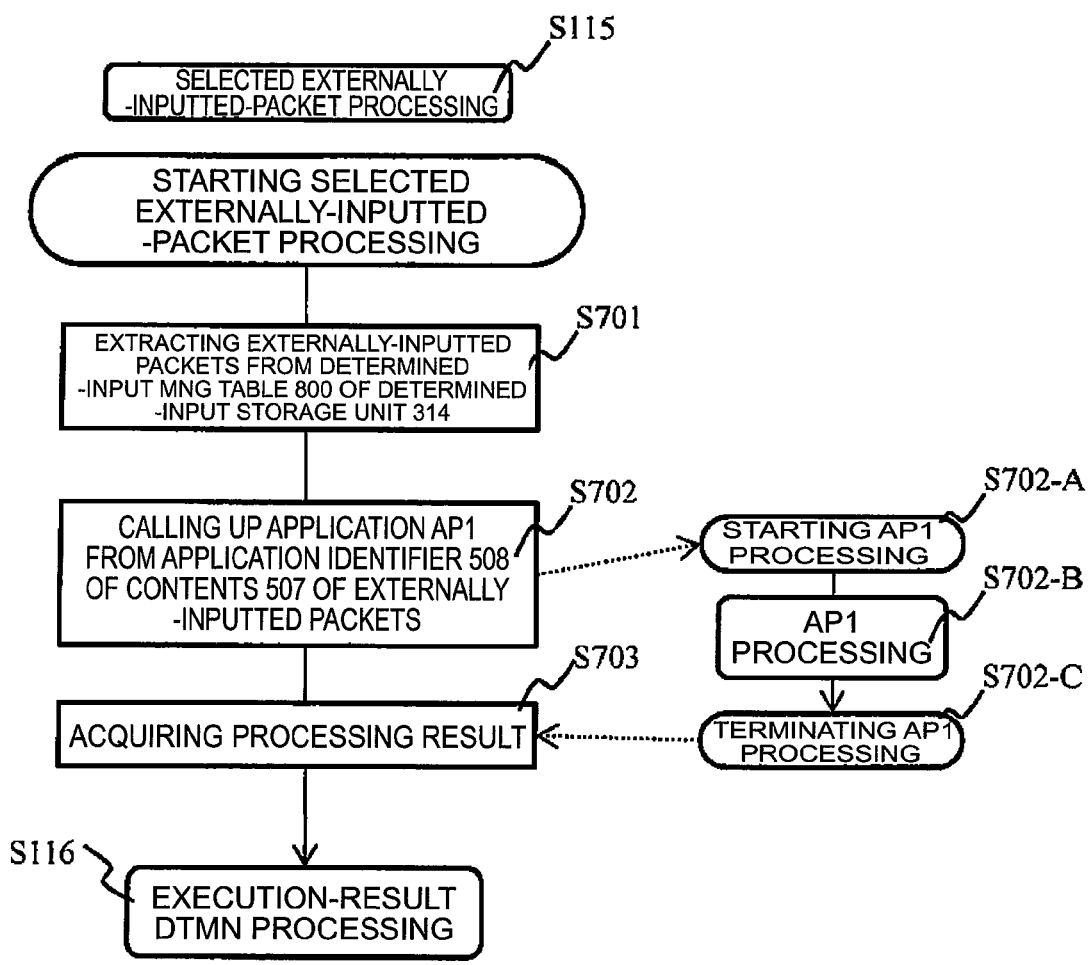
FIG. 17 This is a flowchart for illustrating an example of the selected externally-inputted-packet processing.

FIG. 17 is a flowchart for illustrating an example of the selected externally-inputted-packet processing S115, which is a partial processing of the processing target's externally-inputted-packet selection processing S114 executed by the input/output synchronization unit 310. In the selected externally-inputted-packet processing S115, an application 200 is started up, and the "determined externally-inputted packets" are subjected to a processing that is based on the application 200.

Having started the selected externally-inputted-packet processing S115, the input/output synchronization unit 310, first, extracts the information about the externally-inputted packets 500 from the determined-input management table 800 of the determined-input storage unit 314 (S701).

From the application identifier 508 of the contents 507 of the information about the externally-inputted packets 500 acquired at S701, the input/output synchronization unit 310 determines an application 200 that should execute the processing. Moreover, the unit 310 adds the parameter 509 thereto, then starting up a start processing (: S702-A) of starting the application 200. After the application 200 is started up, the selected externally-inputted-packet processing S115 waits for the application-200-based processing to be terminated (S702).

The application 200 started up at S702 acquires the additional parameter 509, then starting the processing (: S702-A). Furthermore, the application 200 executes the application-200-based processing (: S702-B). At the time of the processing's termination, the application 200 outputs a processing result to the selected externally-inputted-packet processing S115 (: S702-C).

After the application-200-based processing is terminated, the selected externally-inputted-packet processing S115 acquires the processing result (S703).

Having completed the selected externally-inputted-packet processing S115 in accompaniment with the start-up of the application 200 in response to the information about the externally-inputted packets 500, and the acquisition of the processing result, the input/output synchronization unit 310 executes the execution-result determination processing S116 next thereto.

In the present specification, the execution-result determination processing S116 will be explained in a manner of being divided into FIG. 18, FIG. 19, FIG. 20, FIG. 21, FIG. 22, FIG. 23, and FIG. 24. The starting portion of the execution-result determination processing S116 will be explained using FIG. 18. The output process-state identicalization processing S900, which will be executed in a manner of following S116, will be explained using FIG. 19. The output majority-decision determination processing S1000, which will be executed in a manner of following S900, will be explained using FIG. 20. The leader selection processing S1100, which will be executed in a manner of following S1000, will be explained using FIG. 21. The leader process-state identicalization processing S1200, which will be executed in a manner of following S1100, will be explained using FIG. 22. The voter processing S1300, which will be executed in a manner of following S1200, will be explained using FIG. 23. The output abnormality processing S1400, which will be executed in a manner of following S1300, will be explained using FIG. 24.

<Flowchart for the Execution-Result Determination Processing (FIG. 18)>

Figure 18:
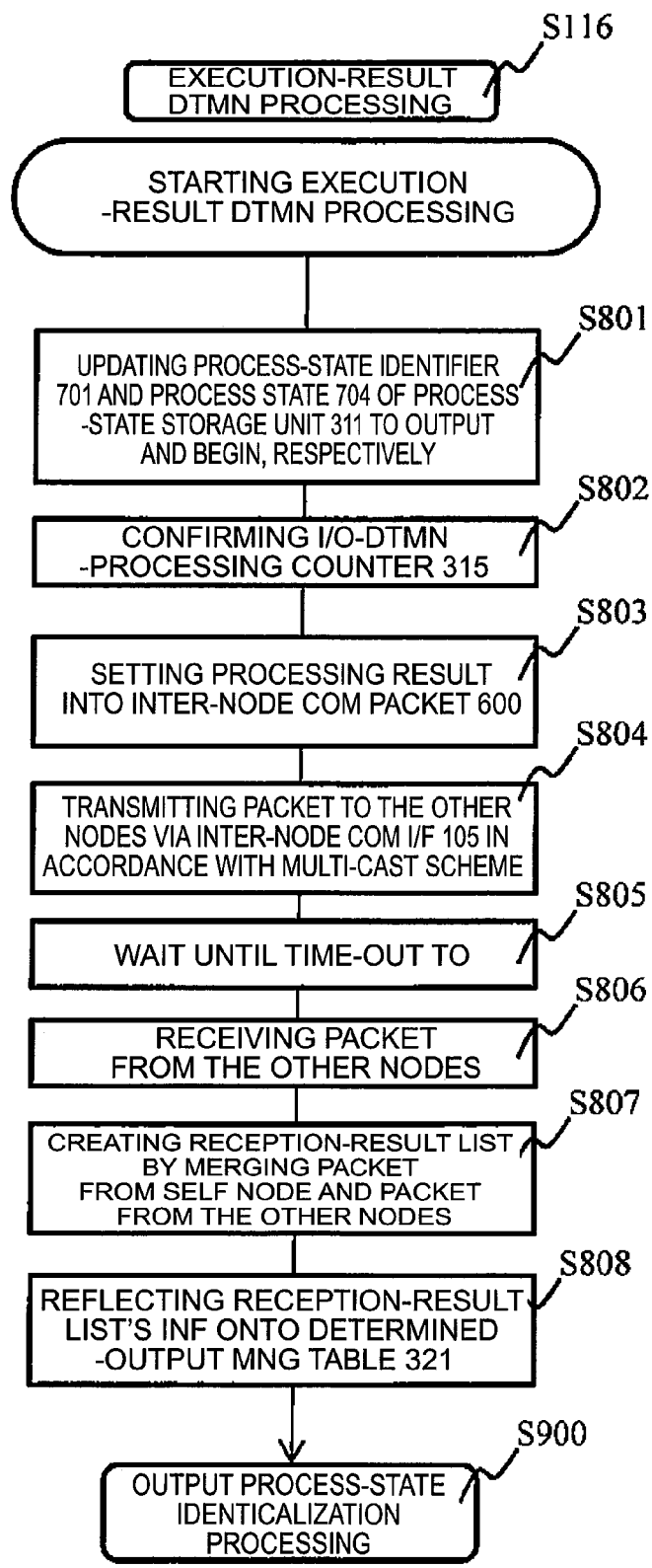
FIG. 18 This is a flowchart for illustrating an example of the execution-result determination processing.

FIG. 18 is a flowchart for illustrating an example of the execution-result determination processing S116 executed by the input/output synchronization unit 310.

Having started the execution-result determination processing S116, the input/output synchronization unit 310, first, updates the process-state identifier 701, the additional information 702, and the process state 704 of the computer-node process state table 700 of the process-state storage unit 311 to "OUTPUT", "OUTPUT", and "BEGIN", respectively (S801).

Next, the input/output synchronization unit 310 confirms the value of the input/output-determination-processing counter 315 (S802).

Next, the input/output synchronization unit 310 sets the processing result of the application 200 acquired at S703 into the computer-node process state's individual detailed information 604 of the inter-node communications packet 600. At this time, the unit 310 sets, into the computer-node process state 603, the values of the computer-node process state table 700 updated at S801. Also, the unit 310 sets, into the input/output-determination-processing counter 602, the value of the input/output-determination-processing counter 315 acquired at S802 (S803).

Next, the input/output synchronization unit 310 transmits the inter-node communications packet 600 created at S803 to the other computer nodes 100 via the inter-node communications I/F 105 in accordance with the multi-cast scheme. This transmission of the packet 600 allows the processing result of the application 200 to be shared between the self computer node 100 and the other computer nodes 100 (S804).

Next, the input/output synchronization unit 310 performs Wait until a time-out point-in-time in order to wait for an inter-node communications packet 600 to arrive thereat from the other computer nodes 100 (S805).

Next, at S806, the input/output synchronization unit 310 acquires the inter-node communications packet 600 that has arrived thereat from the other computer nodes 100. Moreover, at S807, the unit 310 creates a "reception-result list" by merging each other the inter-node communications packets 600 of the self computer node 100 and of the other computer nodes 100.

Furthermore, the input/output synchronization unit 310 sets, into the computer-node-configuration management table 317, the column information of the computer-node identifier 601, the input/output-determination-processing counter 602, and the computer-node process state 603 registered in the reception-result list (whose configuration columns are the same as those of the inter-node communications packet 600). At this time, however, the unit 310 does not update the value of the input synchronization-time computer nodes' total number 317A (S808).

Having completed the execution-result determination processing S116 at the point-in-time when the exchange of the processing result of the application 200 is performed between the computer nodes 100, the input/output synchronization unit 310 executes the output process-state identicalization processing S900 next thereto.

<Flowchart for the Output Process-State Identicalization Processing (FIG. 19)>

Figure 19:
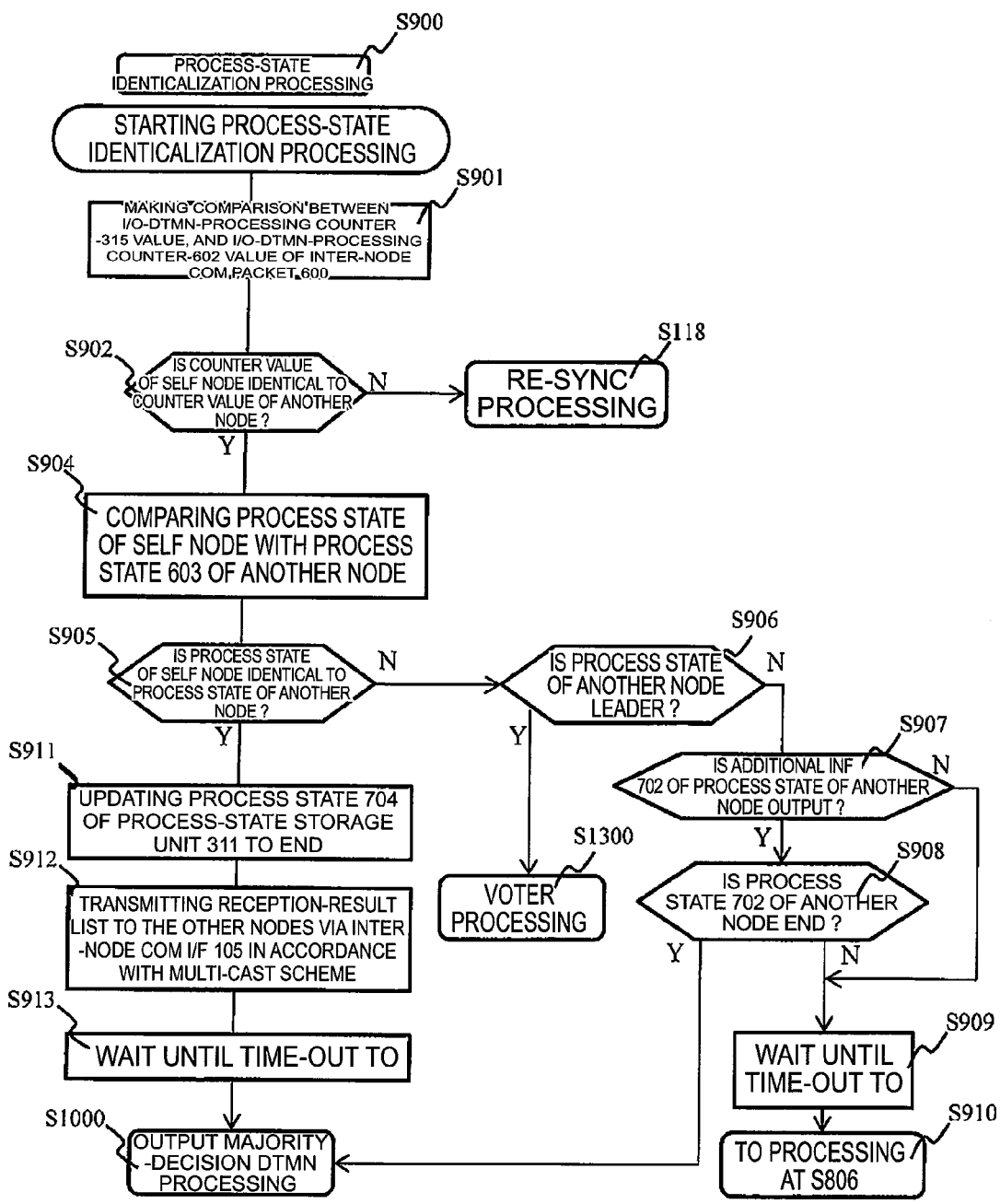
FIG. 19 This is a flowchart for illustrating an example of the output process-state identicalization processing.

FIG. 19 is a flowchart for illustrating an example of the output process-state identicalization processing S900, which is a partial processing of the execution-result determination processing S116 executed by the input/output synchronization unit 310.

The processing performed in the output process-state identicalization processing S900 is the following processing: Namely, the process states of the respective computer nodes 100 in the "output synchronization" processing are caused to be identical to each other among these respective computer nodes 100. The synchronization system 1 makes the majority-decision judgment on calculation results of the respective computer nodes 100, thereby ensuring reliability of the output information to each terminal 2. The respective computer nodes 100, however, are mutually-independent computers, and accordingly they operate in their mutually-different computer-node states. The policy of the output process-state identicalization processing S900 is as follows: Namely, a computer node 100 whose processing period is obviously different is excluded. However, a slight delay in its computer-node process state is amended. This amendment of the slight delay makes it possible to maximize the number of the computer nodes 100 that will participate in the majority-decision judgment on the calculation results.

Having started the output process-state identicalization processing S900, the input/output synchronization unit 310, first, makes the comparison between the input/output-determination-processing counter 315, and the input/output-determination-processing counter 602 of the inter-node communications packet 600 received at S806 from the other computer nodes 100 (S901). By making this comparison, the input/output synchronization unit 310 makes the judgment as to whether or not the value of the input/output-determination-processing counter 315 of the self computer node 100 and that of the counter 315 of another computer node 100 is identical to each other (S902). The self computer node 100 sometimes performs the transmission/reception of the inter-node communications packet 600 with a plurality of other computer nodes 100. Accordingly, the unit 310 receives a plurality of inter-node communications packets 600 in some cases. The "comparison" at S901 and the "judgment" at S902 mean the following "majority-decision judgment": Namely, in this "majority-decision judgment", the self computer node 100 and another computer node 100 are classified based on the value of the input/output-determination-processing counter 315, and the plurality of values of the plurality of input/output-determination-processing counters 602. By making this classification, the unit 310 determines into which of the majority group and the minority group the self computer node 100 is classified (S901 and S902).

If the self computer node 100 is classified into the minority group (: the result of S902 is "N"), the processing period of the self computer node 100 differs from that of the computer nodes 100 of the majority group. Accordingly, the input/output synchronization unit 310 executes the re-synchronization processing S118.

Meanwhile, if the self computer node 100 is classified into the majority group (: the result of S902 is "Y"), the processing periods is identical to each other. Consequently, the input/output synchronization unit 310 executes S904 that follows.

Next, the input/output synchronization unit 310 makes the comparison as to whether or not the computer-node process state of the self computer node 100 is identical to the computer-node process state of another computer node 100. The "comparison" here also means the "majority-decision judgment". The comparison between these computer-node process states is made as follows: Namely, the comparison is made between the computer-node process state 603 (whose configuration columns are the same as those of the computer-node process state table 700) of the inter-node communications packet 600 received from the other computer nodes 100, and the values (i.e., the process-state identifier 701, the additional information 702, and the computer-node process state 704) of the computer-node process state table 700 of the self computer node 100 (S904 and S905).

If, at S905, the self computer node 100 is classified into the minority group (: the result of S905 is "N"), the computer-node process state of the self computer node 100 is not identical to the computer-node process states of the computer nodes 100 of the majority group. Accordingly, the input/output synchronization unit 310 executes S906.

At S906, the input/output synchronization unit 310 makes a judgment as to whether or not the computer-node process states of the computer nodes 100 of the majority group stores "LEADER" therein. Here, this judgment is made by making reference to the additional information 702 of the computer-node process state 603 (whose configuration columns are the same as those of the computer-node process state table 700) of the inter-node communications packet 600 received from the other computer nodes 100. If the computer-node process states of the computer nodes 100 of the majority group stores "LEADER" therein (: the result of S906 is "Y"), it is already implemented to pre-determine the computer node 100 of a candidate for outputting the processing result to the terminal 2 (, which is performed in a one-step-advanced processing within the "output synchronization" processing). Accordingly, the input/output synchronization unit 310 starts up the voter processing S1300 in order to permit the self computer node 100 to operate as an output-supervising role. Meanwhile, if the computer-node process states of the computer nodes 100 of the majority group does not store "LEADER" therein (: the result of S906 is "N"), the input/output synchronization unit 310 starts up S907. Also, regardless of the value of the additional information 702 of the computer nodes 100 of the majority group, the input/output synchronization unit 310 sets a value (e.g., "1") into the Penalty 703 of the computer-node process state table 700 of the self computer node 10.

In the judgment at S906, a case is possible where each of the computer-node process states of the computer nodes 100 of the majority group is "VOTER". At S906, however, only "LEADER" is selected and defined as the detection target. The reason for this definition is as follows: Namely, If each of the computer-node process states of the computer nodes 100 of the majority group is "VOTER", each of these computer nodes 100 of the majority group is in a process state for performing the result output to the terminal 2 (, which is performed in a two-step-advanced processing as compared with the self computer node's computer-node process state "OUTPUT" within the "output synchronization" processing). Then, it is confirmed that each of the computer-node process states of the computer nodes 100 of the majority group is "VOTER". After that, the computer-node process state of the self computer node 100 is corrected to "VOTER", thereby switching the self computer node 100 to a "monitor", i.e., the output-supervising role. Even if this switching is made, there is a possibility that the "monitor" may overlook the result output to the terminal 2. For this reason, only "LEADER" is selected and defined as the detection target in the judgment at S906. Namely, at the "output synchronization" processing stage, the correction for the two-stage synchronization shift from "OUTPUT" to "VOTER" is not performed.

At S907 and S908, the comparison is made among the computer-node process states of the majority group. Then, if the additional information 702 is "OUTPUT" (: the result of S907 is "Y"), and further, if the process state 704 is "END" (: the result of S908 is "Y"), a processing of causing the processing results of the applications 200 to be identical to each other is completed among the computer nodes 100. Consequently, the input/output synchronization unit 310 terminates the output process-state identicalization processing S900, and starts up the output majority-decision determination processing S1000.

Meanwhile, if the additional information 702 is not "OUTPUT" (: the result of S907 is "N"); otherwise, if the additional information 702 is "OUTPUT" (: the result of S907 is "Y"), but if the process state 704 is not "END" (the result of S908 is "N"), the input/output synchronization unit 310 performs Wait until a time-out point-in-time (S909). After that, the unit 310 re-executes the output process-state identicalization processing S900 from the reception processing at S806 where the processing result of the application 200 is received from the other computer nodes 100.

Meanwhile, if, at S905, the self computer node 100 is classified into the majority group (: the result of S905 is "Y"), the input/output synchronization unit 310 executes S911 next thereto.

At S911, the input/output synchronization unit 310 updates, to "END", the process state 704 of the computer-node process state table 700 of the self computer node 100. As a result of this update, each computer node 100 falls into the following state: Namely, in this state, each computer node 100 has completed the sharing of the processing results of the applications 200 of the respective computer nodes 100.

Next, the input/output synchronization unit 310 transmits, to the other computer nodes 100, the values of the computer-node process state table 700 set into the inter-node communications packet 600 via the inter-node communications I/F 105, in accordance with the multi-cast scheme (S912).

Next, the input/output synchronization unit 310 performs Wait until a time-out point-in-time in order to wait for the inter-node communications packet 600 to arrive thereat from the other computer nodes 100 (S913).

Having completed the output process-state identicalization processing S900 at the point-in-time when Wait is terminated, the input/output synchronization unit 310 executes the output majority-decision determination processing S1000 next thereto.

<Flowchart for the Output Majority-Decision Determination Processing (FIG. 20)>

Figure 20:
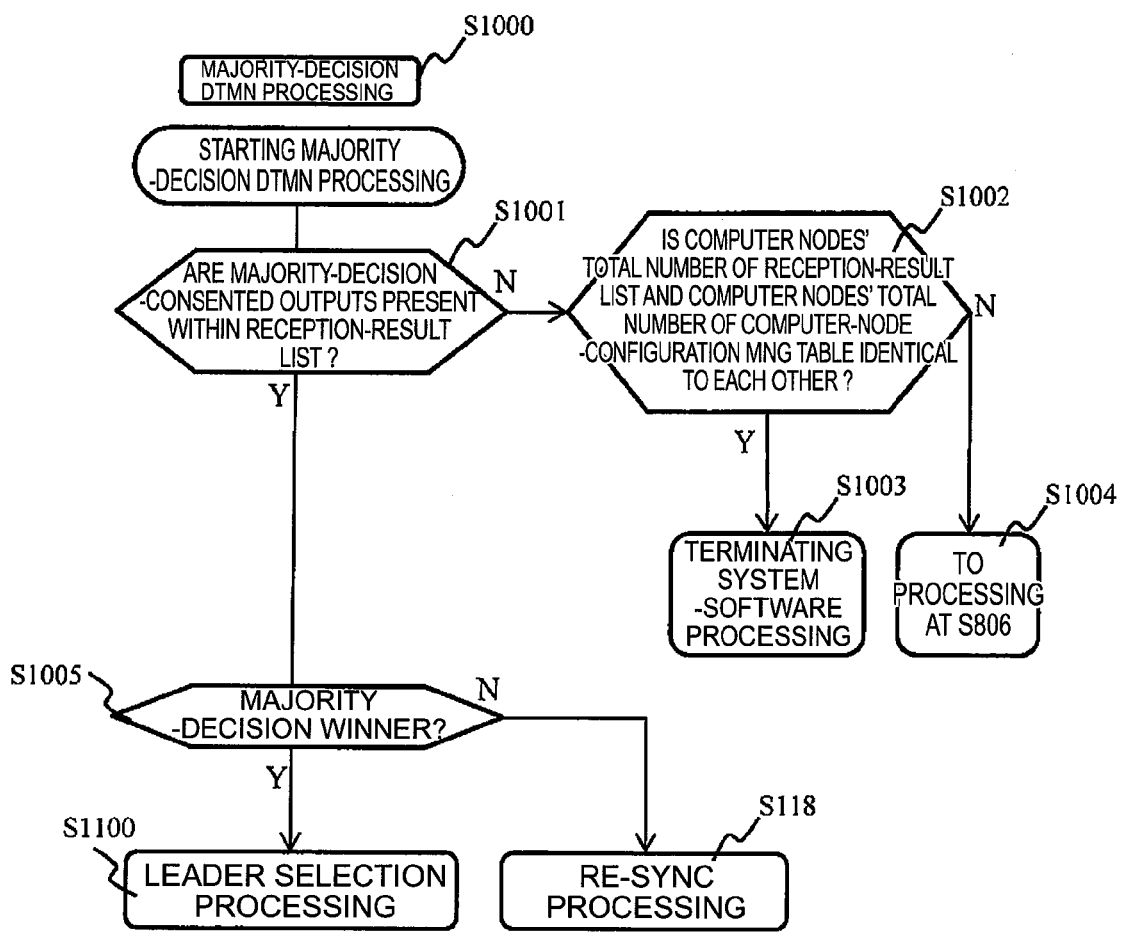
FIG. 20 This is a flowchart for illustrating an example of the output majority-decision determination processing.

FIG. 20 is a flowchart for illustrating an example of the output majority-decision determination processing S1000, which is a partial processing of the execution-result determination processing S116 executed by the input/output synchronization unit 310. The processing performed in the output majority-decision determination processing S1000 is the majority-decision judgment on the processing results of the applications 200 calculated by the respective computer nodes 100.

Having started the output majority-decision determination processing S1000, the input/output synchronization unit 310, first, makes reference to the "reception-result list", thereby making reference to the processing results of the applications 200 calculated by the respective computer nodes 100. By performing this operation, the unit 310 judges whether or not processing results (which, hereinafter, will be referred to as "majority-decision-consented outputs") exist within the processing results of the applications 200 calculated by the respective computer nodes 100. Here, the majority-decision-consented outputs exist in common to computer nodes 100 whose number is larger than the half (S1001). Here, "larger-than-the-half" may refers to the number that is larger than the half of the number of the computer nodes 100 which are registered into the computer-node-configuration management table 317 at the present point-in-time. Otherwise, "larger-than-the-half" may refers to the number that is larger than the half of the number of the computer nodes 100 existing within the synchronization system 1.

If the majority-decision-consented outputs do not exist (: the result of S1001 is "N"), it means that the majority-decision judgment on the processing results of the applications 200 is impossible. Accordingly, the input/output synchronization unit 310 starts up S1002.

At S1002, the unit 310 makes the comparison between the total number of the computer nodes 100 within the "reception-result list", and the input synchronization-time computer nodes' total number 317A of the computer-node-configuration management table 317. If the total numbers are identical to each other (: the result of S1002 is "Y"), it means that the processing results of the applications 200 calculated by the respective computer nodes 100 have been mutually completely different from each other. Accordingly, the input/output synchronization unit 310 starts up S1003, thereby terminating the infrastructure-software processing by the infrastructure software 300. Meanwhile, if the total numbers is not identical to each other (: the result of S1002 is "N"), there exists a computer node 100 that has not yet received the processing results of the applications 200. Consequently, the input/output synchronization unit 310 re-starts the output process-state identicalization processing S900 from the reception processing at S806 where the processing result of the application 200 is received from the other computer nodes 100.

Meanwhile, if the majority-decision-consented outputs exist (: the result of S1001 is "Y"), the input/output synchronization unit 310 starts up S1005. By performing this operation, the unit 310 judges whether or not the processing results of the applications 200 calculated by the self computer node 100 belong to the majority group. If the self computer node 100 belongs to the majority group (: the result of S1005 is "Y"), the input/output synchronization unit 310 completes the output majority-decision determination processing S1000, and executes the leader selection processing S1100 next thereto. Meanwhile, if the self computer node 100 belongs to the minority group (: the result of S1005 is "N"), it means that the self computer node 100 has derived the processing results that differ from the processing results derived by the computer nodes 100 of the majority group. Accordingly, the self computer node 100 can become neither the "leader" for performing the result output to the terminal 2, nor the "monitor" for performing the supervision of the result output. Consequently, the input/output synchronization unit 310 deviates from the processing in the present period, then starting up the re-synchronization processing S118 for the next period.

<Flowchart for the Leader Selection Processing (FIG. 21)>

Figure 21:
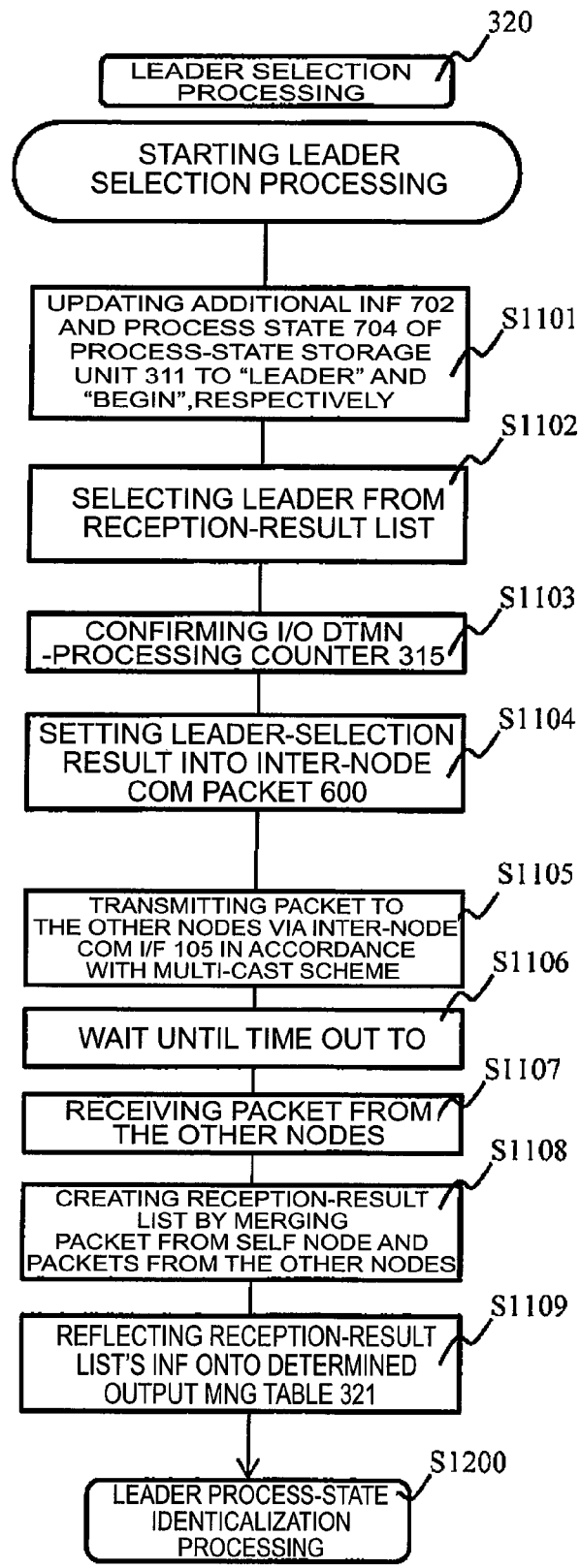
FIG. 21 This is a flowchart for illustrating an example of the leader selection processing.

FIG. 21 is a flowchart for illustrating an example of the leader selection processing S1100, which is a partial processing of the execution-result determination processing S116 executed by the input/output synchronization unit 310. The processing performed in the leader selection processing S1100 is the selection of computer nodes 100 that become candidates for the "leader" for performing the result output to the terminal 2.

Having started the leader selection processing S1100, the input/output synchronization unit 310, first, updates the additional information 702 and the process state 704 of the computer-node process state table 700 of the process-state storage unit 311 to "LEADER" and "BEGIN", respectively (S1101).

Next, the input/output synchronization unit 310 selects, from the "reception-result list", computer nodes 100 that become candidates for the "leader". Moreover, the unit 310 determines the priority rank, thereby creating a "leader-selection result". An example of the selection and rank determination method is as follows: Namely, each of the candidates for the "leader is determined under a condition that the value of the Penalty 703 of the computer-node process state table 700 is equal to zero. Furthermore, the candidates for the "leader are determined in accordance with the descending order of the values of the computer-node identifiers 601 (S1102).

Next, the input/output synchronization unit 310 acquires the value of the input/output-determination-processing counter 315, then setting this value into the input/output-determination-processing counter 602 of the inter-node communications packet 600 (S1103). Also, the unit 310 sets the "leader-selection result" at S1102 into the computer-node process state's individual detailed information 604 of the inter-node communications packet 600 (S1104).

Next, the input/output synchronization unit 310 transmits the inter-node communications packet 600 created at S1104 to the other computer nodes 100 via the inter-node communications I/F 105 in accordance with the multi-cast scheme (S1105).

Next, the input/output synchronization unit 310 performs Wait until a time-out point-in-time in order to wait for an inter-node communications packet 600 to arrive thereat from the other computer nodes 100 (S1106).

Next, at S1107, the input/output synchronization unit 310 acquires the inter-node communications packet 600 that has arrived thereat from the other computer nodes 100. Subsequently, at S1108, the unit 310 creates a "reception-result list" by merging each other the inter-node communications packets 600 of the self computer node 100 and of the other computer nodes 100. The "reception-result list" includes the "leader-selection result" determined by the self computer node 100 and the other computer nodes 100.

Next, at S1109, the input/output synchronization unit 310 reflects the contents of the "reception-result list" onto the computer-node-configuration management table 317. At this point-in-time, the input/output synchronization unit 310 completes the leader selection processing S1100, and executes the leader process-state identicalization processing S1200 next thereto.

<Flowchart for the Leader Process-State Identicalization Processing (FIG. 22)>

Figure 22:
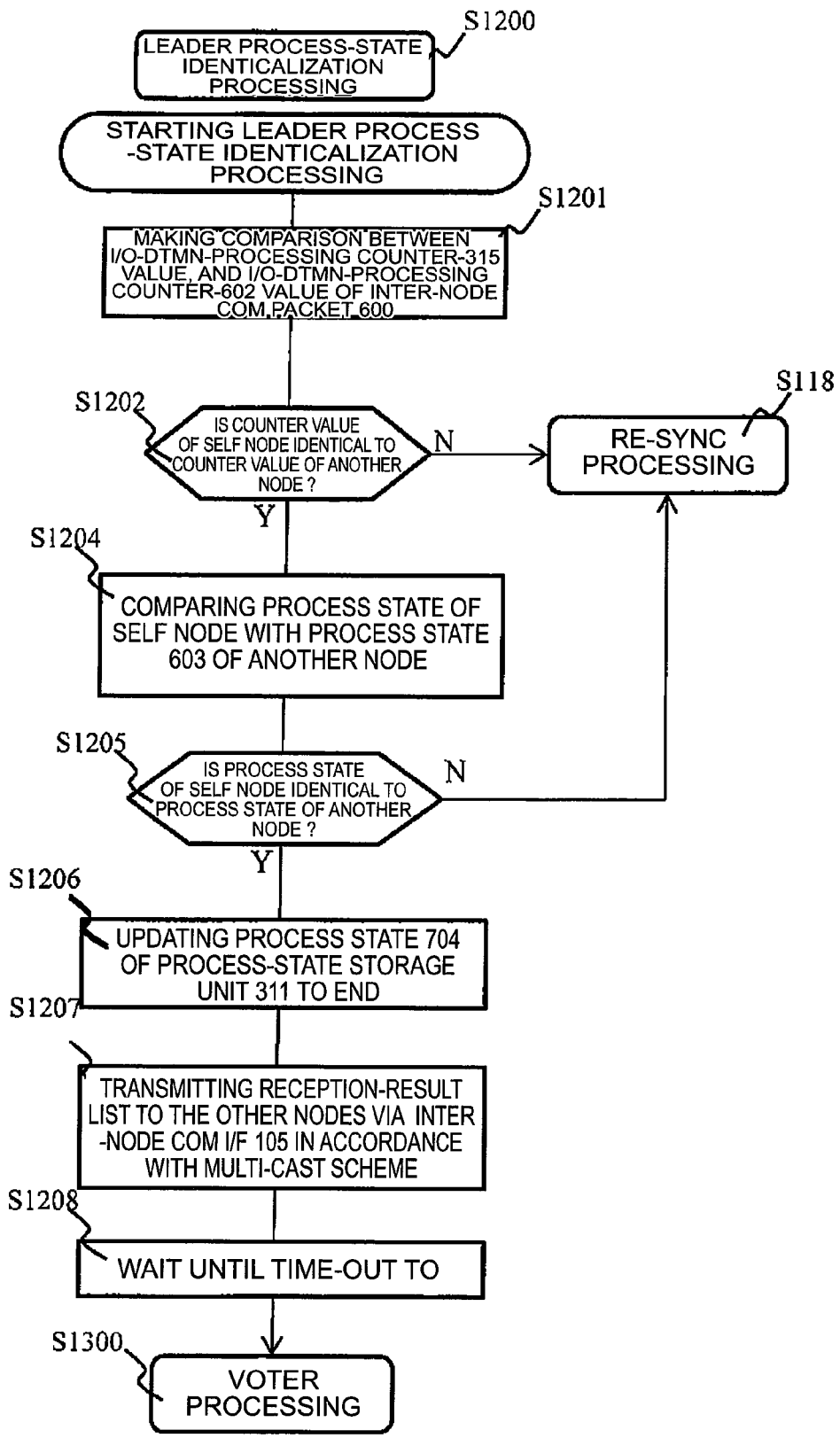
FIG. 22 This is a flowchart for illustrating an example of the leader process-state identicalization processing.

FIG. 22 is a flowchart for illustrating an example of the leader process-state identicalization processing S1200, which is a partial processing of the execution-result determination processing S116 executed by the input/output synchronization unit 310. The processing performed in the leader process-state identicalization processing S1200 is the following processing: Namely, the completed states of the leader selection processing are caused to be identical to each other among the computer nodes 100.

Having started the leader process-state identicalization processing S1200, the input/output synchronization unit 310, first, makes the comparison between the input/output-determination-processing counter 315, and the input/output-determination-processing counter 602 of the inter-node communications packet 600 received at S1107 from the other computer nodes 100 (S1201). By making this comparison, the input/output synchronization unit 310 makes the judgment as to whether or not the value of the input/output-determination-processing counter 315 of the self computer node 100 and that of the counter 315 of another computer node 100 is identical to each other (S1202). In some cases, the unit 310 receives a plurality of inter-node communications packets 600. Accordingly, at S1201 and S1202, the "majority-decision judgment" is made (S1201 and S1202).

If the self computer node 100 is classified into the minority group (: the result of S1202 is "N"), the processing period of the self computer node 100 differs from that of the computer nodes 100 of the majority group. Accordingly, the input/output synchronization unit 310 executes the re-synchronization processing S118.

Meanwhile, if the self computer node 100 is classified into the majority group (: the result of S1202 is "Y"), the processing periods are identical to each other. Consequently, the input/output synchronization unit 310 executes S1204 that follows.

Next, the input/output synchronization unit 310 makes the comparison as to whether or not the computer-node process state of the self computer node 100 is identical to the computer-node process state of another computer node 100. The "comparison" here also means the "majority-decision judgment". The comparison between these computer-node process states is made as follows: Namely, the comparison is made between the computer-node process state 603 (whose configuration columns are the same as those of the computer-node process state table 700) of the inter-node communications packet 600 received from the other computer nodes 100, and the values (i.e., the process-state identifier 701, the additional information 702, and the computer-node process state 704) of the computer-node process state table 700 of the self computer node 100 (S1204 and S1205).

If, at S1205, the self computer node 100 is classified into the minority group (: the result of S1205 is "N"), the self computer node 100 cannot transition into the following state: Namely, in this state, the self computer node 100 is capable of outputting the processing results of the applications 200 to each terminal 2 in cooperation with the other computer nodes 100. Consequently, the input/output synchronization unit 310 deviates from the processing period, then executing the re-synchronization processing S118.

Meanwhile, if, at S1205, the self computer node 100 is classified into the majority group (: the result of S1205 is "Y"), the input/output synchronization unit 310 executes S1206 next thereto.

Next, the input/output synchronization unit 310 updates, to "END", the process state 704 of the computer-node process state table 700 of the self computer node 100. As a result of this update, each computer node 100 falls into the following state: Namely, in this state, the input/output synchronization unit 310 of each computer node 100 has completed the sharing of the "leader-selection result" of the respective computer nodes 100 (S1206).

Next, the input/output synchronization unit 310 transmits the inter-node communications packet 600 to the other computer nodes 100 via the inter-node communications OF 105, in accordance with the multi-cast scheme. Here, the values of the computer-node process state table 700 and the "reception-result list" are set into the inter-node communications packet 600 (S1207).

Next, the input/output synchronization unit 310 performs Wait until a time-out point-in-time in order to wait for the inter-node communications packet 600 to arrive thereat from the other computer nodes 100 (S1208).

Having completed the leader process-state identicalization processing S1200 at the point-in-time when Wait is terminated, the input/output synchronization unit 310 executes the voter processing S1300 next thereto.

<Flowchart for the Voter Processing (FIG. 23)>

Figure 23:
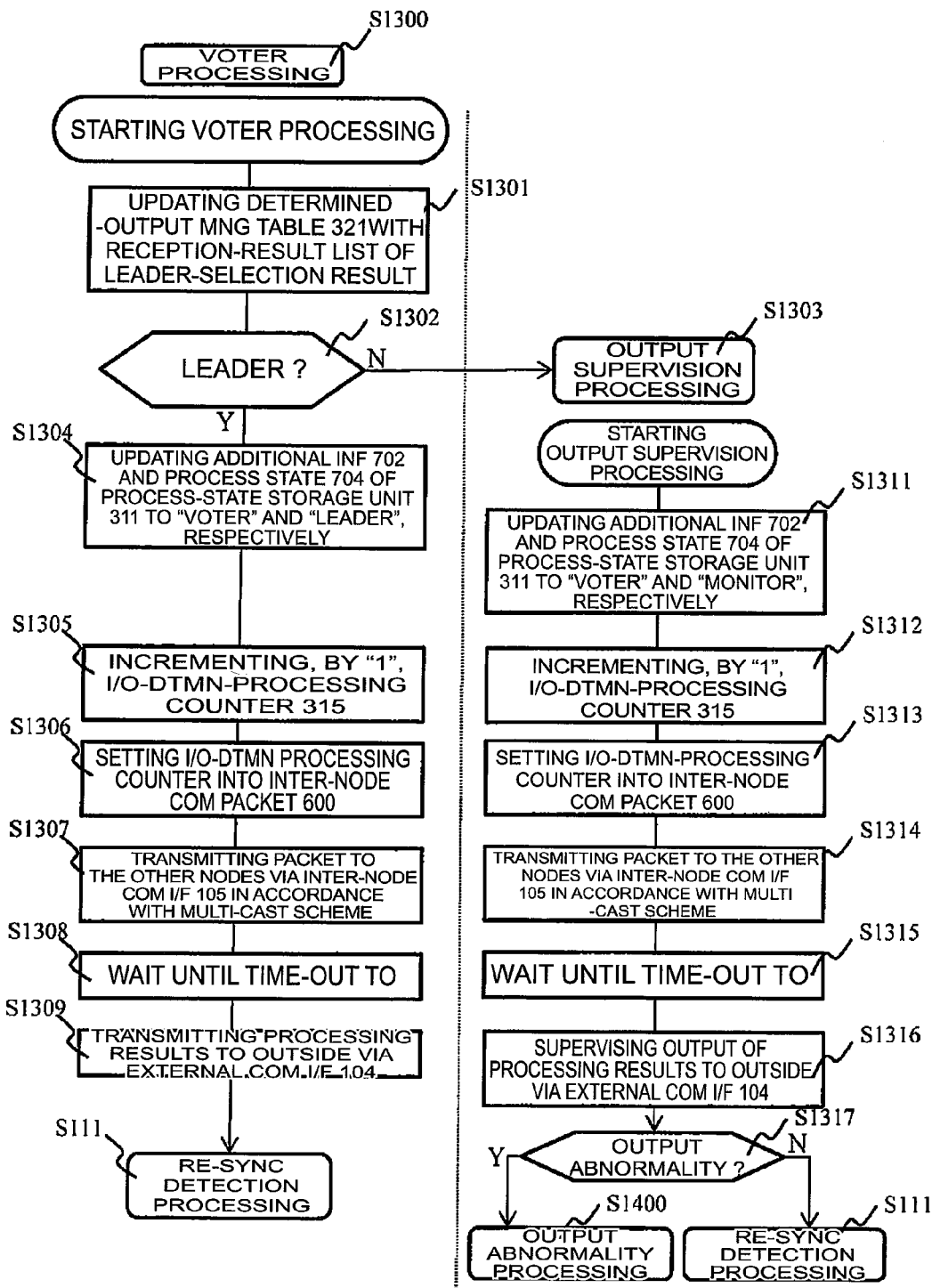
FIG. 23 This is a flowchart for illustrating an example of the voter processing.

FIG. 23 is a flowchart for illustrating an example of the voter processing S1300, which is a partial processing of the execution-result determination processing S116 executed by the input/output synchronization unit 310.

The processing performed in the voter processing S1300 is the following processing: Namely, the input/output synchronization unit 310 determines the "leader" role's computer node 100 and the "monitor" role's computer nodes 100 in accordance with the "leader-selection result" determined in the leader selection processing S1100. The "leader" role's computer node 100 outputs, to the terminal 2, the "majority-decision-consented outputs" acquired in the output majority-decision determination processing S1000. Meanwhile, the "monitor" role's computer nodes 100 supervise this output state of the "majority-decision-consented outputs". If an abnormality is recognized in this output state, the input/output synchronization unit 310 determines a new "leader" role's computer node 100 from the "monitor" role's computer nodes 100. In this way, the unit 310 re-executes the output of the "majority-decision-consented outputs" to the terminal 2 (: the output abnormality processing S1400). The details of the output abnormality processing S1400 will be described later in association with FIG. 24.

Having started the voter processing S1300, the input/output synchronization unit 310, first, updates the values of the configuration columns of the determined-output management table 321, using the contents of the "reception-result list" of the "leader-selection result" received at S1207. Here, these values of the configuration columns are the output synchronization-time computer nodes' total number 321A, rank 321B, computer-node identifier 321C, input/output-determination-processing counter 321D, and computer-node process state 321E (S1301).

Next, the input/output synchronization unit 310 judges whether or not the self computer node 100 is the "leader", judging from the rank 321B and the computer-node identifier 321C of the determined-output management table 321 (S1302).

If the self computer node 100 is judged to be the "leader" (: the result of S1302 is "Y"), the input/output synchronization unit 310 executes S1304 in order to allow the node 100 to operate as the "leader". Meanwhile, if the self computer node 100 is not judged to be the "leader" (: the result of S1302 is "N"), the unit 310 executes S1303 in order to allow the node 100 to operate as the "monitor".

The "leader" computer node 100 updates the additional information 702 and the process state 704 of the computer-node process state table 700 of the process-state storage unit 311 to "VOTER" and "LEADER", respectively. In this way, the "leader" computer node 100 starts the "leader" operations (S1304). Moreover, the node 100 increments, by "1", the value of the input/output-determination-processing counter 315 (S1305).

Next, the unit 310 sets the value of the input/output-determination-processing counter 315, which is updated at S1305, into the input/output-determination-processing counter 602 of the inter-node communications packet 600. Also, the unit 310 sets the values of the computer-node process state table 700, which are updated at S1304, into the computer-node process state 603 (S1306).

Next, the unit 310 transmits the inter-node communications packet 600 to the other computer nodes 100 via the inter-node communications I/F 105 in accordance with the multi-cast scheme. In this way, the unit 310 informs another computer node 100 that the self computer node 100 is the "leader" (S1307). Furthermore, the unit 310 performs Wait until a time-out point-in-time in order to wait for an inter-node communications packet 600 to arrive thereat from the other computer nodes 100 (S1308).

After Wait is terminated, the unit 310 transmits the processing results of the applications 200 to the terminal 2 via the external communications I/F 104 in accordance with the multi-cast scheme. This multi-cast-scheme-based transmission allows the processing results of the applications 200 to arrive at the external communication I/F 104 of each of the "monitor" computer nodes 100 as well (S1309).

The "leader" computer node 100 transmits the processing results to the terminal 2, thereby terminating the "leader" operations. Having completed the voter processing S1300 at the present point-in-time, the unit 310 executes the re-synchronization detection processing S111 next thereto.

Each of the "monitor" computer nodes 100 updates the additional information 702 and the process state 704 of the computer-node process state table 700 of the process-state storage unit 311 to "VOTER" and "MONITOR", respectively. In this way, each "monitor" computer node 100 starts the "monitor" operations (S1311). Moreover, each node 100 increments, by "1", the value of the input/output-determination-processing counter 315 (S1312).

Next, the unit 310 sets the value of the input/output-determination-processing counter 315, which is updated at S1312, into the input/output-determination-processing counter 602 of the inter-node communications packet 600. Also, the unit 310 sets the values of the computer-node process state table 700, which are updated at S1311, into the computer-node process state 603 (S1313).

Next, the unit 310 transmits the inter-node communications packet 600 to the other computer nodes 100 via the inter-node communications I/F 105 in accordance with the multi-cast scheme. In this way, the unit 310 informs another computer node 100 that the self computer node 100 is the "monitor" (S1314). Furthermore, the unit 310 performs Wait until a time-out point-in-time in order to wait for an inter-node communications packet 600 to arrive thereat from the other computer nodes 100 (S1315).

After Wait is terminated, the unit 310 supervises the transmission state of the applications 200's processing results, which is performed by the "leader" computer node 100, via the external communication I/F 104 of each "monitor" computer node 100. In this way, the unit 310 judges whether or not an abnormality has occurred in the transmission state of the applications 200's processing results (S1316 and S1317).

If the abnormality can be confirmed in the transmission of the processing results by the "leader" computer node 100 (: the result of S1317 is "Y"), the unit 310 starts up the output abnormality processing S1400, thereby retrying the transmission of the applications 200's processing results to the terminal 2.

Meanwhile, if the abnormality cannot be confirmed in the transmission of the processing results by the "leader" computer node 100 (: the result of S1317 is "N"), the unit 310 terminates the "monitor" operations. Having completed the voter processing S1300 at the present point-in-time, the unit 310 executes the re-synchronization detection processing S111 next thereto.

<Flowchart for the Output Abnormality Processing (FIG. 24)>

Figure 24:
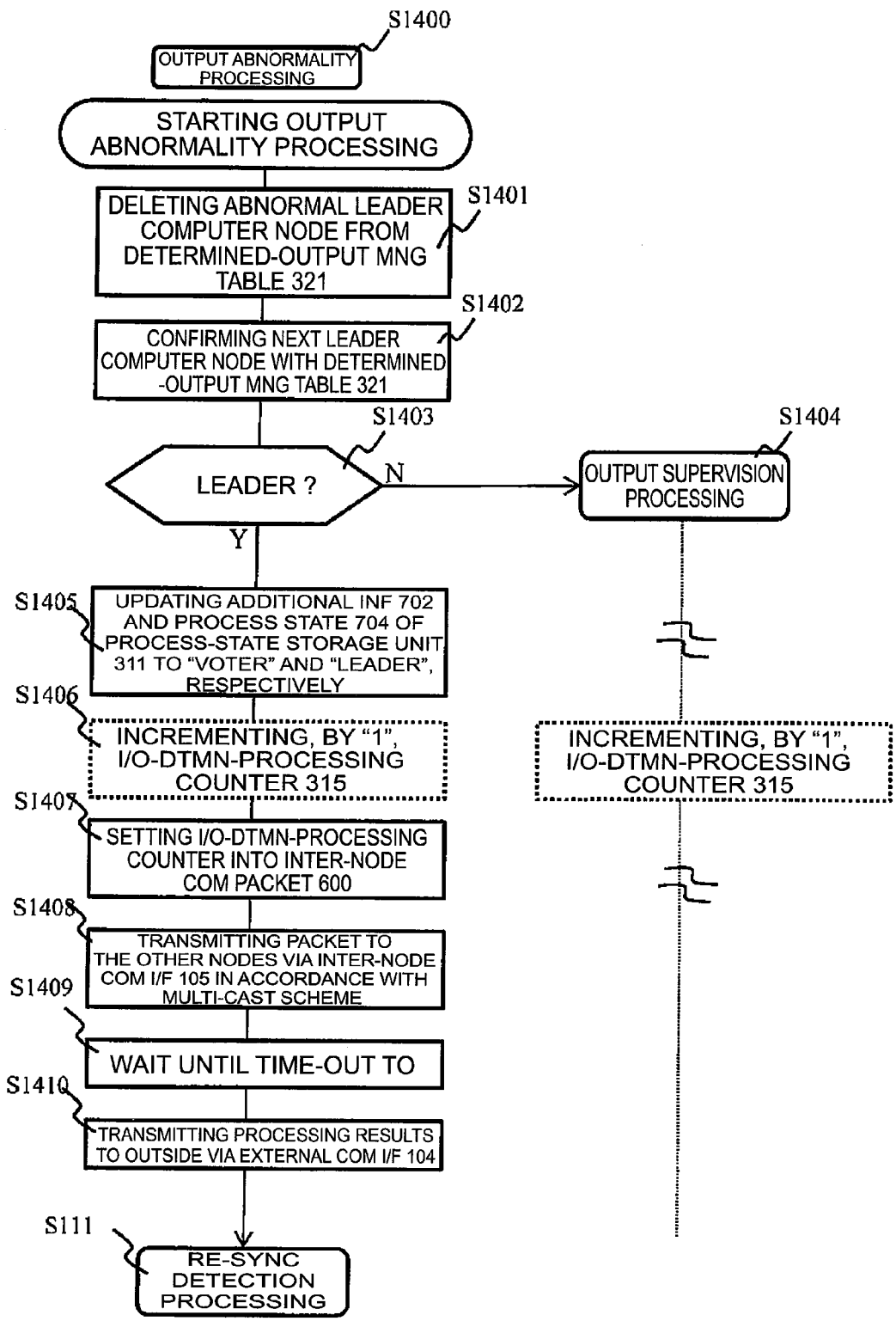
FIG. 24 This is a flowchart for illustrating an example of the output abnormality processing.

FIG. 24 is a flowchart for illustrating an example of the output abnormality processing S1400, which is a partial processing of the execution-result determination processing S116 executed by the input/output synchronization unit 310. The output abnormality processing S1400 is started up, when, at S1316 of the voter processing S1300, an abnormality is recognized in the transmission of the applications 200's processing results to the terminal 2.

The output abnormality processing S1400 is a retry processing of the voter processing S1300. Accordingly, basically the same processings as those of the voter processing S1300 are executed in the output abnormality processing S1400. However, since the processing S1400 is the retry processing, the value of the input/output-determination-processing counter 315 is not changed in both the "leader" computer node 100 and each "monitor" computer node 100.

Having started the output abnormality processing S1400, the input/output synchronization unit 310, first, deletes the information about the "leader" computer node 100 (i.e., the computer node 100 that is judged to be the "leader" in the voter processing S1300) from the determined-output management table 321 (S1401).

Next, the input/output synchronization unit 310 judges whether or not the self computer node 100 is the next "leader", judging from the values of the rank 321B and the computer-node identifier 321C of the determined-output management table 321 updated (S1402 and S1403).

If the self computer node 100 is judged to be the "leader" (: the result of S1403 is "Y"), the input/output synchronization unit 310 executes S1405 in order to allow the node 100 to operate as the "leader". Meanwhile, if the self computer node 100 is not judged to be the "leader" (: the result of S1403 is "N"), the unit 310 executes S1404 in order to allow the node 100 to operate as the "monitor".

The operations as the "leader" computer node 100 (i.e., the processings from S1405 to S1410, and the start-up of the re-synchronization detection processing S111) are basically the same as the "leader" operations in the voter processing S1300 (i.e., the processings from S1304 to S1309, and the start-up of the re-synchronization detection processing S111). Only S1406 and S1305, however, are different from each other. Namely, the value of the input/output-determination-processing counter 315 is not changed in the output abnormality processing S1400 (the dot-line frame of S1406 means that S1406 is not executed).

The operations as each "monitor" computer node 100 (i.e., the processings from S1404 and thereinafter) are basically the same as the "monitor" operations in the voter processing S1300 (i.e., the processings from S1303 to S1317, and the start-up of the output abnormality processing S1400 or the re-synchronization detection processing S111). Only S1411 and S1312, however, are different from each other. Namely, the value of the input/output-determination-processing counter 315 is not changed in the output abnormality processing S1400 (the dot-line frame of S1411 means that S1411 is not executed).

<Flowchart for the Re-Synchronization Detection Processing and the Re-Synchronization Processing (FIG. 25)>

Figure 25:
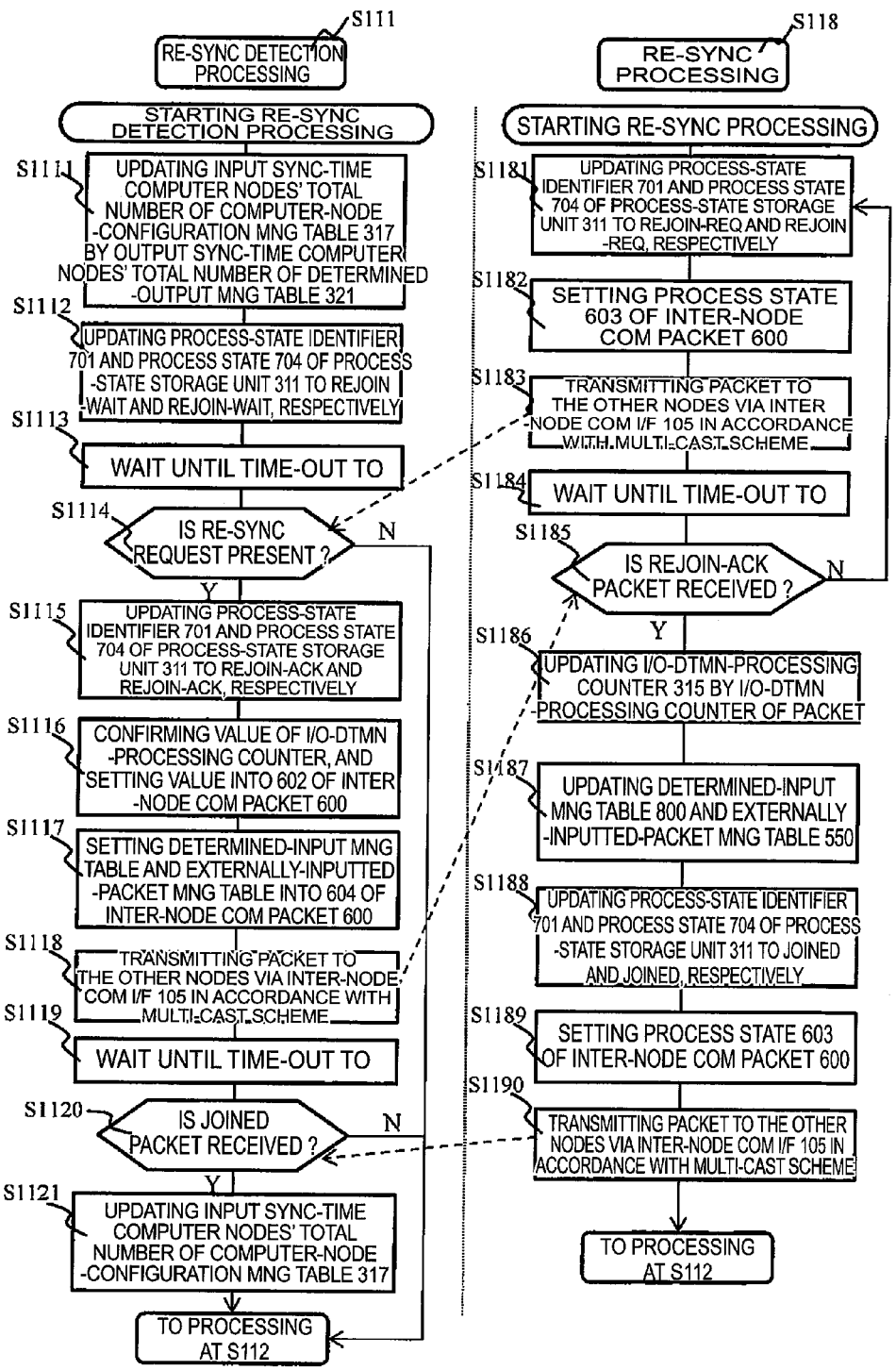
FIG. 25 This is a flowchart for illustrating an example of the re-synchronization detection processing and re-synchronization processing.

FIG. 25 is a flowchart for illustrating an example of the re-synchronization detection processing S111 and the re-synchronization processing S118. The re-synchronization detection processing S111 is as follows: Namely, in this processing, the input/output synchronization unit 310 of each computer node 100 that exists inside a system which is in a cooperated operation as the synchronization system detects a computer node 100 that requests the participation of the computer node 100 into the cooperated-operation system, and accepts this participation. The re-synchronization processing S118 is as follows: Namely, in this processing, the input/output synchronization unit 310 of a computer node 100 that exists outside a system which is in a cooperated operation as the synchronization system requests the participation of the computer node 100 into the cooperated-operation system, and accomplishes this participation. Requesting the participation of a computer node into a cooperated-operation system is referred to as "a re-synchronization request".

Each of the re-synchronization detection processing S111 and the re-synchronization processing S118 develops the processings in a steps-synchronized manner by performing the transmission/reception of the following inter-node communications packets: An inter-node communications packet of REJOIN-REQ (whose details will be described in FIG. 26), an inter-node communications packet of REJOIN-ACK (whose details will be described in FIG. 26), and inter-node communications packet of JOINED (whose details will be described in FIG. 26).

The "inter-node communications packet of REJOIN-REQ" illustrated in FIG. 26 as an example is an example of the inter-node communications packet 600 that is transmitted by a computer node 100 that makes a re-synchronization request. "REJOIN-REQ" is set into the process-state identifier 701 and the computer-node process state 704 of the computer-node process state table 700 whose computer-node process state is the computer-node process state 603. The input/output-determination-processing counter-602 value remains its initial value (e.g., "0"). The input/output-determination-processing counter-315 value is not set.

The "inter-node communications packet of REJOIN-ACK" illustrated in FIG. 26 as an example is an example of the inter-node communications packet 600 that is returned to the request side by a computer node 100 that has received the re-synchronization request. "REJOIN-ACK" is set into the process-state identifier 701 and the computer-node process state 704 of the computer-node process state table 700 whose computer-node process state is the computer-node process state 603. Also, the input/output-determination-processing counter-315 value stored by the computer node 100 that has received the re-synchronization request is set into the input/output-determination-processing counter 602. Also, the determined-input management table-800 information and the externally-inputted-packet management table-550 information of the externally-inputted-packet storage unit 301 are set into the computer-node process state's individual detailed information 604.

The "inter-node communications packet of JOINED" illustrated in FIG. 26 as an example is the following example of the inter-node communications packet 600: Namely, the computer node 100 that has received the "inter-node communications packet of REJOIN-ACK" transmits this example to the other computer nodes 100 in order to inform the other computer nodes 100 that the computer node 100 has accomplished its participation into a system which is in a cooperated operation as the synchronization system. "JOINED" is set into the process-state identifier 701 and the computer-node process state 704 of the computer-node process state table 700 whose computer-node process state is the computer-node process state 603.

Returning to FIG. 25, the details of the re-synchronization detection processing S111 will be described below.

Having started the re-synchronization detection processing S111, the input/output synchronization unit 310, first, updates the input synchronization-time computer nodes' total number 317A of the computer-node-configuration management table 317 by the output synchronization-time computer nodes' total number 321A of the determined-output management table 321 (S1111).

Next, the input/output synchronization unit 310 sets the process-state identifier 701 and the process state 704 of the computer-node process state table 700 of the process-state storage unit 311 to "REJOIN-WAIT" and "REJOIN-WAIT", respectively. As a result of this setting, the computer node 100 falls into a process state for receiving the re-synchronization request (S1112).

Next, the input/output synchronization unit 310 performs Wait until a time-out point-in-time in order to wait for the "inter-node communications packet of REJOIN-REQ" to arrive thereat. Here, the "inter-node communications packet of REJOIN-REQ" is the re-synchronization request from another computer node 100, and is transmitted by S1183 of the re-synchronization processing S118 (S1113).

If the re-synchronization request is not detected (: the result of S1114 is "N"), the input/output synchronization unit 310 terminates the re-synchronization detection processing S111, then starting up S112 in order to start the input synchronization processing. Meanwhile, if the re-synchronization request is detected (: the result of S1114 is "Y"), the input/output synchronization unit 310 starts up S1115 in order to make a response to the re-synchronization request.

At S1115, the input/output synchronization unit 310 sets the process-state identifier 701 and the process state 704 of the computer-node process state table 700 of the process-state storage unit 311 to "REJOIN-ACK" and "REJOIN-ACK", respectively. As a result of this setting, the computer node 100 transitions into a computer-node process state for making the response to the re-synchronization request.

Next, in order to create the "inter-node communications packet of REJOIN-ACK", the input/output synchronization unit 310 sets the input/output-determination-processing counter-315 value into the input/output-determination-processing counter 602 of the inter-node communications packet 600. Also, the unit 310 sets the computer-node process state table-700 information into the computer-node process state 603 (S1116). Also, the unit 310 sets the determined-input management table-800 information and the externally-inputted-packet management table-550 information of the externally-inputted-packet storage unit 301 into the computer-node process state's individual detailed information 604 (S1117).

Next, the input/output synchronization unit 310 transmits the created "inter-node communications packet of REJOIN-ACK" via the inter-node communications I/F 105 in accordance with the multi-cast scheme. The unit 310 expects that the "inter-node communications packet of REJOIN-ACK" will be received at S1185 of the re-synchronization processing S118, whose processing is underway by the computer node 100 that has made the re-synchronization request (S1118).

Next, the input/output synchronization unit 310 performs Wait until a time-out point-in-time, expecting that the "inter-node communications packet of JOINED" will arrive thereat from S11810 of the re-synchronization processing S118 of the computer node 100 that has made the re-synchronization request (S1119).

If the "inter-node communications packet of JOINED" is not received (: the result of S1120 is "N"), the input/output synchronization unit 310 judges that the re-synchronization processing S118 of the computer node 100 that has made the re-synchronization request has failed. Accordingly, the input/output synchronization unit 310 terminates the re-synchronization detection processing S111, then starting up S112 in order to start the input synchronization processing.

Meanwhile, if the "inter-node communications packet of JOINED" is received (: the result of S1120 is "Y"), at S1121, the input/output synchronization unit 310 updates the input synchronization-time computer nodes' total number 317A of the computer-node-configuration management table 317. After that, the input/output synchronization unit 310 terminates the re-synchronization detection processing S111, then starting up S112 in order to start the input synchronization processing.

The details of the re-synchronization processing S118 will be described below.

The input/output synchronization unit 310 of the computer node 100 that makes the re-synchronization request, first, sets the process-state identifier 701 and the process state 704 of the computer-node process state table 700 of the process-state storage unit 311 to "REJOIN-REQ" and "REJOIN-REQ", respectively. As a result of this setting, the computer node 100 falls into a process state for making the re-synchronization request (S1181).

Next, in order to create the "inter-node communications packet of REJOIN-REQ", the input/output synchronization unit 310 sets the computer-node process state table-700 information into the computer-node process state 603 of the inter-node communications packet 600 (S1182).

Next, the input/output synchronization unit 310 transmits the created "inter-node communications packet of REJOIN-REQ" via the inter-node communications I/F 105 in accordance with the multi-cast scheme. The unit 310 expects that the "inter-node communications packet of REJOIN-REQ" will be received at S1114 of the re-synchronization detection processing S111. Here, the processing S111 is being executed by the computer node 100 that exists inside the system which is in the cooperated operation (S1183).

Next, the input/output synchronization unit 310 performs Wait until a time-out point-in-time, expecting that the "inter-node communications packet of REJOIN-ACK" in response to the re-synchronization request will be returned thereto (S1184).

If the "inter-node communications packet of REJOIN-ACK" is not received (: the result of S1185 is "N"), the input/output synchronization unit 310 starts up S1181 in order to retry the re-synchronization request. Meanwhile, if "inter-node communications packet of REJOIN-ACK" is received (: the result of S1185 is "Y"), the input/output synchronization unit 310 starts up S1186.

At S1186, the input/output synchronization unit 310 sets the input/output-determination-processing counter-602 value of the "inter-node communications packet of REJOIN-ACK" into the input/output-determination-processing counter 315. In this way, the unit 310 causes the processing period of the self computer node 100 to be identical to that of another computer node 100 (S1186).

Next, the input/output synchronization unit 310 acquires the determined-input management table-800 information set into the computer-node process state's individual detailed information 604 of the "inter-node communications packet of REJOIN-ACK". Moreover, the unit 310 sets the acquired table-800 information into the determined-input management table 800 of the determined-input storage unit 314 of the self computer node 100. Similarly, the unit 310 acquires the externally-inputted-packet management table-550 information, then setting the acquired table-550 information into the externally-inputted-packet management table 550 of the externally-inputted-packet storage unit 301 (S1187).

Next, the input/output synchronization unit 310 updates the process-state identifier 701 and the process state 704 of the computer-node process state table 700 of the process-state storage unit 311 to "JOINED" and "JOINED", respectively. As a result of this setting, the self computer node 100 transitions into a computer-node process state where the re-synchronization is completed (S1188).

Next, in order to create the "inter-node communications packet of JOINED", the input/output synchronization unit 310 sets the computer-node process state table-700 information into the computer-node process state 603 of the inter-node communications packet 600 (S1189).

Next, the input/output synchronization unit 310 transmits the created "inter-node communications packet of JOINED" via the inter-node communications I/F 105 in accordance with the multi-cast scheme. The unit 310 expects that the "inter-node communications packet of JOINED" will be received at S1120 of the re-synchronization detection processing S111. Here, the processing S111 is being executed by the computer node 100 that has returned the "inter-node communications packet of REJOIN-ACK" (S1190).

After having transmitted the "inter-node communications packet of JOINED", the input/output synchronization unit 310 terminates the re-synchronization processing S118, then starting up S112 in order to start the input synchronization processing.

<Embodiments where Cases are Assumed>

In the following explanation the explanation given so far will be supplemented by applying assumed cases to the processing target's externally-inputted-packet selection processing S114 (i.e., the series of processings up to the input majority-decision determination processing S600) and the execution-result determination processing S116 (i.e., the series of processings up to the output abnormality processing S1400). Concretely speaking, the supplementary explanation will be given below concerning changes that accompany lapses of the computer-node process states in the respective table states stored within each computer node 100, and the information contents of the inter-node communications packet 600 transmitted/received between the respective computer nodes 100.

It is assumed that the synchronization system 1 in the supplementary explanation is configured from the three units of computer node 100A, computer node 100B, and computer node 100C. This configuration, however, is merely one example.

The supplementary explanation will be given to the processing target's externally-inputted-packet selection processing S114 (i.e., the series of processings up to the input majority-decision determination processing S600) by applying two cases thereto. Also, the supplementary explanation will be given to the execution-result determination processing S116 (i.e., the series of processings up to the output abnormality processing S1400) by applying one case thereto.

In the first supplementary explanation of the processing target's externally-inputted-packet selection processing S114, the assumption is made concerning an example of the following case (which, hereinafter, will be referred to as "a case A"): Namely, in this case A, the arrival of the externally-inputted packets 500 from a terminal 2 exhibits a delay (which, hereinafter, will be referred to as "an external delay") only for the computer node 100B. As a result, the "majority-decision-consented externally-inputted packets" cannot be determined in the first-time extraction of the externally-inputted packets-500 information. Eventually, the "majority-decision-consented externally-inputted packets" can be determined in the second-time extraction of the externally-inputted packets-500 information. Then, the processings that follow the second-time extraction will be executed.

In the second supplementary explanation of the processing target's externally-inputted-packet selection processing S114, in addition to the occurrence of the external delay occurring to the computer node 100B, the assumption is made concerning an example of the following case (which, hereinafter, will be referred to as "a case B"): Namely, in this case B, the processing start trigger of the computer node 100C exhibits a delay (which, hereinafter, will be referred to as "an internal delay") as compared with the other computer nodes 100A and 100B. As a result, the computer node 100C does not participate in the determination processing of determining the "majority-decision-consented externally-inputted packets" in the first-time extraction of the externally-inputted packets-500 information. Simultaneously, the "majority-decision-consented externally-inputted packets" cannot be determined in the computer nodes 100A and 100B, either. Eventually, the "majority-decision-consented externally-inputted packets" can be determined in the second-time extraction of the externally-inputted packets-500 information. Then, the processings that follow the second-time extraction will be executed.

In the supplementary explanation of the execution-result determination processing S116, the assumption is made concerning an example of the following case (which, hereinafter, will be referred to as "a case C"): Namely, in this case C, the processing start trigger of the computer node 100C exhibits a delay. As a result, the computer node 100C participates halfway in the sharing processing (i.e., the computer-node process state is "OUTPUT") of causing the processing results of the applications 200 to be shared among the computer nodes 100A, 100B, and 100C. Then, the processings at S116 to S1400 will be executed.

<Processing Target's Externally-Inputted-Packet Selection Processing at External-Delay Occurrence Time (Case A)>

The supplementary explanation in the case A will be given below, using FIG. 27, FIG. 28, FIG. 29, FIG. 30, FIG. 31, FIG. 32, and FIG. 33.

FIG. 27 illustrates an example of the processing sequence of each of the computer nodes 100A, 100B, and 100C. Time T1 corresponds to an execution time of S300 to S602 of the processing target's externally-inputted-packet selection processing, and time T2 corresponds to an execution time of S300 to S509 in the next processing period, and time T3 corresponds to an execution time of S601 to S611 that are executed based on the processing result in the time T2. Also, transmission 901 corresponds to S402, and TO 902 corresponds to S403, and list creation 903 corresponds to S404 to S508, and TO 904 corresponds to S509. Also, transmission 905 corresponds to S402, and TO 906 corresponds to S403, and list creation 907 corresponds to S404 to S508, and TO 908 corresponds to S509. Majority decision 909 corresponds to S601, and state update 910 corresponds to S604 to S609, and transmission 911 corresponds to S611.

FIG. 28 illustrates the on-each-time-basis contents of the externally-inputted-packet management table, the computer-node process state table, and the input/output-determination-processing counter of each computer node. Column 912 denotes the state of the computer node 100A. SEQ 915 of the configuration column denotes the sequence number 502 of the externally-inputted-packet management table 550. WS 916 denotes the input synchronization step 710 of the computer-node process state table 700, and ST 917 denotes the process state 704 of the computer-node process state table 700. CNT 918 denotes the input/output-determination-processing counter 315. Column 913 denotes the state of the computer node 100B, and column 914 denotes the state of the computer node 100C. The configuration columns are basically the same as the information of the computer node 100A.

Row 920 denotes the state in the time T1, and row 921 denotes the state in the time T2, and row 922 denotes the state in the time T3.

FIG. 29 illustrates the on-each-time-basis contents of the inter-node communications packet 600 of each computer node for the "transmission" illustrated in FIG. 27. Row 940 denotes the contents of the inter-node communications packet 600 for the transmission 901 in the time T1. Row 943 of the configuration row denotes the "transmission" contents of the computer node 100A, and row 944 denotes the "transmission" contents of the computer node 100B, and row 945 denotes the "transmission" contents of the computer node 100C. Row 941 denotes the contents of the inter-node communications packet 600 for the transmission 905 in the time T2. Row 942 denotes the contents of the inter-node communications packet 600 for the transmission 911 in the time T3. The configuration row is basically the same as the row 940.

FIG. 30 illustrates the on-each-time-basis contents of the inter-node communications packet 600 of each computer node for the "list creation" illustrated in FIG. 27. Row 960 denotes the contents of the inter-node communications packet 600 for the list creation 903 in the time T1. This row 960 indicates the "reception-result list" that is created by connecting to each other the inter-node communications packets 600 transmitted/received in the "transmission" processing. Row 962 of the configuration row denotes the "transmission" contents of the computer node 100A, and row 963 denotes the "transmission" contents of the computer node 100B, and row 964 denotes the "transmission" contents of the computer node 100C. Row 961 denotes the contents of the inter-node communications packet 600 for the list creation 907 in the time T2. The configuration row is basically the same as the row 960.

FIG. 31 illustrates the on-each-time-basis contents of the computer-node-configuration management table 317 of an arbitrary computer node. The on-each-time-basis contents are the same in each of the computer nodes 100A, 100B, and 100C. Row 980 denotes the states of the computer-node identifier-601 column, the input/output-determination-processing counter-602 column, and the computer-node process state-603 column of the computer-node-configuration management table 317 in the time T1. Row 981 denotes the storage information of the computer-node-configuration management table 317 in the time T2. Row 982 denotes the storage information of the computer-node-configuration management table 317 in the time T3.

FIG. 32 illustrates the contents of the determined-input management table 800 of each computer node. FIG. 33 illustrates the contents of the pre-determined-input management table 810 of the computer node 100B.

Next, in accordance with the processing sequence illustrated in FIG. 27, the explanation will be given below concerning a change in the process state of each of the computer nodes 100A, 100B, and 100C.

In the time T1, each of the computer nodes 100A, 100B, and 100C starts the processings in the state of the row 920 in FIG. 28. The computer node 100A stores therein values of "2" as the WS 924, "BEGIN" as the ST 925, and "C010" as the CNT 926. Each of the computer nodes 100B and 100C also stores the same values therein. However, the information about the externally-inputted packets 500 saved into the externally-inputted-packet management tables 550 are different from each other. Concretely speaking, the computer node 100A has received the externally-inputted packets 500 whose sequence numbers are "2A-1" and "2B-1". Accordingly, the computer node 100A has registered the information about these externally-inputted packets 500 into the externally-inputted-packet management table 550 (: frame 930). In contrast thereto, none of the externally-inputted packets 500 has arrived at the computer node 100B yet. Consequently, the computer node 100B has registered none of the information about the externally-inputted packets 500 into the externally-inputted-packet management table 550 (: frame 931). Meanwhile, the computer node 100C has received only the externally-inputted packet 500 whose sequence number is "2C-1". Accordingly, the computer node 100C has registered the information about only this externally-inputted packet 500 into the externally-inputted-packet management table 550 (: frame 932). Incidentally, the state where none of the information about the externally-inputted packets 500 is registered into the externally-inputted-packet management table 550 is denoted by "0".

In the transmission 901, each of the computer nodes 100A, 100B, and 100C sets the externally-inputted packet- 500 information, which each computer node itself has acquired (i.e., received) from the external network 3, into the computer-node process state's individual detailed information 604 of the inter-node communications packet 600. Subsequently, each computer node sends out this inter-node communications packet 600. The contents of this inter-node communications packet 600 sent out are described in the time T1 illustrated in FIG. 29 (: row 940). Concretely speaking, the computer node 100A acquires the information about the two externally-inputted packets 500 (i.e., the externally-inputted packets 500 whose sequence numbers are "2A-1" and "2B-1") in accordance with the value of the WS 924. Subsequently, the computer node 100A sets the information about these two externally-inputted packets 500 into the inter-node communications packet 600 (: row 943). Each of the computer nodes 100B and 100C also tries to acquire the information about the two externally-inputted packets 500. However, the computer node 100B has received none of the externally-inputted packets 500. Consequently, the computer node 100B sets, into the inter-node communications packet 600, two "0s" for indicating the absence of the information about the externally-inputted packets 500 (: row 944). Meanwhile, the computer node 100C sets, into the inter-node communications packet 600, the information about the one externally-inputted packet 500 (i.e., the externally-inputted packet 500 whose sequence number is "2C-1") which the computer node 100C could acquire, and another piece of information, i.e., "0" (: row 945).

In the list creation 903, each of the computer nodes 100A, 100B, and 100C creates the "reception-result list" by connecting to each other the inter-node communications packets 600 transmitted/received in the transmission 901. Moreover, each computer node transmits/receives the "reception-result list" among the respective computer nodes 100A, 100B, and 100C. This transmission/reception operation causes the inter-computer-node-stored "reception-result list" contents to be identical to each other. The contents of the inter-node communications packets 600 transmitted/received are described in the time T1 illustrated in FIG. 30 (: row 960).

At S601 executed within the time T1, the judgment is made regarding the presence or absence of the "majority-decision-consented externally-inputted packets". In the frame 965, however, there exists none of the "majority-decision-consented externally-inputted packets". Accordingly, each of the computer nodes 100A, 100B, and 100C changes, to "3", the value of the WS 924 of the input synchronization step 710 of the computer-node process state table 700. Subsequently, each computer node starts up S300 of the next period (i.e., the time T2). The state of the computer-node-configuration management table 317 at this time is described in the time T1 illustrated in FIG. 31 (: row 980).

The state of each of the computer nodes 100A, 100B, and 100C at a start point-in-time of the time T2 is described in the time T2 illustrated in FIG. 28 (: row 921). The value of the WS 924 of the computer node 100A is changed to "3" by the execution of S602 in the time T1. This is basically the same in the computer nodes 100B and 100C as well. During the execution of the processing in the time T1, the new externally-inputted packets 500 arrive at the respective computer nodes. As a result, at the time-T2 start point-in-time, the information about the externally-inputted packet 500 whose sequence number is "2C-1" is newly added to the externally-inputted-packet management table 550 of the computer node 100A (: frame 933). The information about the externally-inputted packet 500 whose sequence number is "2B-1" is added to the externally-inputted-packet management table 550 of the computer node 100B (: frame 934). The information about the externally-inputted packet 500 whose sequence number is "2B-1" is added to the externally-inputted-packet management table 550 of the computer node 100C (: frame 935).

In the transmission 905, each of the computer nodes 100A, 100B, and 100C tries to acquire the information about the three externally-inputted packets 500. Moreover, each computer node sets the acquired information about the three externally-inputted packets 500 into the inter-node communications packet 600, then sending out the inter-node communications packet 600. The contents of this inter-node communications packet 600 sent out are described in the time T2 illustrated in FIG. 29 (: row 941). The change in the value of the input synchronization step 710 is reflected onto the additional information 702 of the computer-node process state 603 (: frame 936). The information about the three units of externally-inputted packets 500 are set into the computer-node process state's individual detailed information 604 (: frame 937).

Also, the state of the computer-node-configuration management table 317 at this time is described in the time T2 illustrated in FIG. 31 (: row 981). The value of the additional information 702 is changed to "3" (: frame 983).

In the list creation 907, each of the computer nodes 100A, 100B, and 100C creates the "reception-result list" on the basis of the contents of the inter-node communications packets 600 transmitted/received in the transmission 905. Moreover, each computer node transmits/receives the "reception-result list" among the computer nodes 100A, 100B, and 100C. This operation causes the "reception-result list" contents to be identical to each other. The contents of the inter-node communications packets 600 transmitted/received at this time are described in the time T2 illustrated in FIG. 30 (: row 961). In the judgment on the presence or absence of the "majority-decision-consented externally-inputted packets" at S601, the externally-inputted packets 500 whose sequence numbers are "2B-1" and "2C-1" are judged to be the "majority-decision-consented externally-inputted packets" in the time T2 (: frame 966). Since the "majority-decision-consented externally-inputted packets" are successfully confirmed, each computer node transfers to the processing in the time T3.

In the majority decision 909 in the time T3, the externally-inputted packets 500 whose sequence numbers are "2B-1" and "2C-1" are selected as the "majority-decision-consented externally-inputted packets".

In the state update 910, each computer node updates the determined-input management table 800 and the input/output-determination-processing counter 315 on the basis of the "majority-decision-consented externally-inputted packets". Each of the computer nodes 100A, 100B, and 100C sets, into the determined-input management table 800, the information about the externally-inputted packets 500 whose sequence numbers are "2B-1" and "2C-1". The contents of the determined-input management table 800 at this time are described in FIG. 32. Also, simultaneously, each computer node deletes, from the externally-inputted-packet management table 550, the information about the externally-inputted packets 500 whose sequence numbers are "2B-1" and "2C-1". At this time, the computer node 100B has not received by itself, of the "majority-decision-consented externally-inputted packets", the externally-inputted packet 500 whose sequence number is "2B-1" via the external network 3. Accordingly, the computer node 100B sets, into the pre-determined-input management table 810, the information about the externally-inputted packet 500 whose sequence number is "2B-1". The contents of the pre-determined-input management table 810 at this time are described in FIG. 33. Also, each of the computer nodes 100A, 100B, and 100C updates the value of the input/output-determination-processing counter 315 to "C011". This update is reflected onto the computer-node-configuration management table 317 (: frame 984 in FIG. 31). The state update 910 changes the state of each of the computer nodes 100A, 100B, and 100C in a manner as is described in the time T3 illustrated in FIG. 28 (: row 922).

In the transmission 911, each of the computer nodes 100A, 100B, and 100C transmits/receives the information about the externally-inputted packet 500 that has been determined by each computer node, and that becomes the processing target of the application 200. This transmission/reception operation causes the information about the externally-inputted packet 500 to be shared among the respective computer nodes 100A, 100B, and 100C. The contents of the inter-node communications packets 600 transmitted/received at this time are described in the time T3 illustrated in FIG. 29 (: row 942).

<Execution Example of Internal-Delay Occurrence in Processing Target's Externally-Inputted-Packet Selection Processing (Case B)>

The explanation will be given below, using FIG. 34, FIG. 35, FIG. 36, FIG. 37, FIG. 38, FIG. 39, FIG. 40, and FIG. 41.

Figure 34:
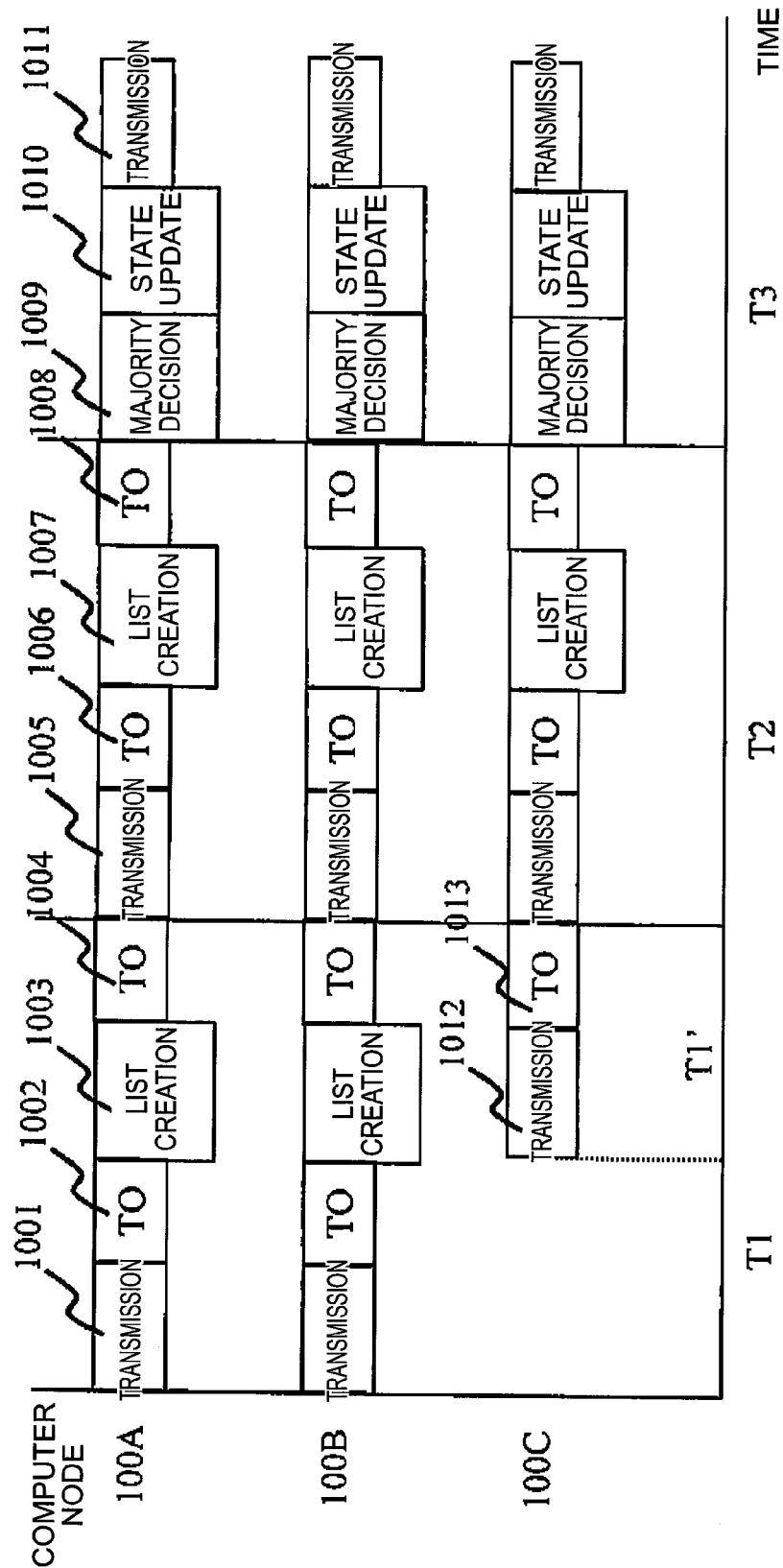
FIG. 34 This is a diagram for illustrating an example of the processing sequence of each computer node in a case B.

FIG. 34 illustrates the processing sequence of each of the computer nodes 100A, 100B, and 100C in an execution example of the internal-delay occurrence in the processing target's externally-inputted-packet selection processing. Time T1 corresponds to an execution time of S300 to S602 of the processing target's externally-inputted-packet selection processing of the computer nodes 100A and 100B. Time T1' corresponds to an execution time of S300 to S602 of the processing target's externally-inputted-packet selection processing of the computer node 100C. Time T2 corresponds to an execution time of S300 to S509 in the next processing period, and time T3 corresponds to an execution time of S601 to S611 that are executed based on the processing result in the time T2. Also, transmission 1001 and transmission 1002 correspond to S402, and TO 1002 and TO 1003 correspond to S403, and list creation 1003 corresponds to S404 to S508, and TO 1004 corresponds to S509. Also, transmission 1005 corresponds to S402, and TO 1006 corresponds to S403, and list creation 1007 corresponds to S404 to S508, and TO 1008 corresponds to S509. Majority decision 1009 corresponds to S601, and state update 1010 corresponds to S604 to S609, and transmission 1011 corresponds to S611.

FIG. 35 illustrates the on-each-time-basis contents of the externally-inputted-packet management table, the computer-node process state table, and the input/output-determination-processing counter of each computer node in the case B. The configuration of each column and row is basically the same as in FIG. 28.

FIG. 36 illustrates the on-each-time-basis contents of the inter-node communications packet 600 in the case B. Here, the inter-node communications packet 600 is transmitted/received among the respective computer nodes for exchanging the contents of the externally-inputted packet 500 received by each computer node. The column configuration and the row configuration of row 1042 and row 1043 are basically the same as in FIG. 29. Only the row configuration in the time T1 and the time T1', however, is different therefrom. Row 1040 denotes the inter-node communications packet-600 contents of the computer nodes 100A and 100B for the transmission 1001 in the time T1. Row 1041 denotes the inter-node communications packet-600 contents of the computer node 100C for the transmission 1012 in the time T1'.

FIG. 37 illustrates the on-each-time-basis contents of the inter-node communications packet 600 in the case B. Here, the inter-node communications packet 600 is transmitted/received among the respective computer nodes for exchanging the list created by each computer node. The column configuration and the row configuration of row 1061 are basically the same as in FIG. 30. The row configuration of row 1060, however, is different therefrom. The row 1060 denotes the inter-node communications packet-600 contents of the computer nodes 100A and 100B for the list creation 1003 in the time T1. Empty row of row 1064 means that the computer node 100C is not performing the inter-node communications.

FIG. 38 illustrates the on-each-time-basis contents of the computer-node-configuration management table 317 of the computer nodes 100A and 100B in the case B. The column configuration and the row configuration of row 1081 and row 1082 are basically the same as in FIG. 31. The row configuration of row 1080, however, is different therefrom. The row 1080 denotes the contents of the computer-node-configuration management table 317 in the time T1. The row 1080 indicates that only the information of the computer nodes 100A and 100B can be stored within the computer-node-configuration management table 317. Empty row of row 1085 means that the computer node 100C does not store information within the table 317.

FIG. 39 illustrates the on-each-time-basis contents of the computer-node-configuration management table 317 of the computer node 100C in the case B. The column configuration and the row configuration of row 1091 and row 1092 are basically the same as in FIG. 31. The row configuration of row 1090, however, is different therefrom. The row 1090 denotes the contents of the computer-node-configuration management table 317 in the time T1'. The row 1090 indicates that only the information of the computer node 100C can be stored within the computer-node-configuration management table 317. Empty rows of row 1093 and row 1094 mean that the computer nodes 100A and 100B do not store information within the table 317.

FIG. 40 illustrates the contents of the determined-input management table 800 of each computer node in the case B. FIG. 41 illustrates the contents of the pre-determined-input management table 810 of the computer node 100B in the case B.

Next, in accordance with the processing sequence illustrated in FIG. 34, the explanation will be given below concerning a change in the process state of each of the computer nodes 100A, 100B, and 100C.

In the time T1, each of the computer nodes 100A, 100B, and 100C starts the processings in the state of the row 1020 in FIG. 28. The computer node 100A stores therein the values of "2" as the WS 1025, "BEGIN" as the ST 1026, and "C010" as the CNT 1027. Each of the computer nodes 100B and 100C also stores the same values therein. However, the information about the externally-inputted packets 500 saved into the externally-inputted-packet management tables 550 are different from each other. Concretely speaking, the computer node 100A stores therein the information about the externally-inputted packets 500 whose sequence numbers are "2A-1" and "2B-1" (: frame 1031). The computer node 100B stores therein only the information about the externally-inputted packet 500 whose sequence number is "2C-1"

(: frame 1032). The state where none of the information about the externally-inputted packets 500 is registered into the externally-inputted-packet management table 550 is denoted by "0". The computer node 100C stores therein none of the externally-inputted packets 500 (: frame 1033).

In the transmission 1001, each of the computer nodes 100A and 100B sets the acquired externally-inputted packet-500 information into the computer-node process state's individual detailed information 604 of the inter-node communications packet 600. Subsequently, each computer node sends out this inter-node communications packet 600. Incidentally, the externally-inputted packet 500, which will become the start-up trigger, has not yet arrived at the computer node 100C in the time T1. Accordingly, the computer node 100C does not perform the transmission 1001. The state of this inter-node communications packet 600 sent out is described in the time T1 illustrated in FIG. 36 (: row 1040). Concretely speaking, the computer node 100A acquires the information about the two externally-inputted packets 500 (i.e., the information about the externally-inputted packets 500 whose sequence numbers are "2A-1" and "2B-1") in accordance with the value of the WS 1025. Subsequently, the computer node 100A sets the information about these two externally-inputted packets 500 into the inter-node communications packet 600 (: row 1044). The computer node 100B also tries to acquire the information about the two externally-inputted packets 500. The computer node 100B, however, can acquire the only one externally-inputted packet 500. Consequently, the computer node 100B sets the information about the one externally-inputted packet 500 (i.e., the information about the externally-inputted packet 500 whose sequence number is "2C-1") which the computer node 100B could acquire, and another piece of information, i.e., "0" (: row 1045).

When it becomes the time T1', the computer node 100C receives the externally-inputted packet 500. As a result, the computer node 100C performs the transmission 1002, using the sequence number of this externally-inputted packet 500. The contents of the inter-node communications packet 600 sent out are described in the time T1' illustrated in FIG. 36 (: row 1046).

While the computer node 100C is performing the transmission 1002, each of the computer nodes 100A and 100B creates the "reception-result list", then transmitting/receiving the "reception-result list" among the respective computer nodes (: list creation 1003). The contents of the inter-node communications packet 600 transmitted/received in this list creation 1003 are described in the time T1 illustrated in FIG. 37 (: row 1060). The "reception-result list" does not include therein the information about the externally-inputted packet 500 that the computer node 100C has acquired (: row 1064).

In the TO 1004, each of the computer nodes 100A and 100B acquires the "reception-result list" that both of them have transmitted in the transmission 1012. Moreover, at S601, each node makes the judgment on the presence or absence of the "majority-decision-consented externally-inputted packets". In the frame 1065, however, there exists none of the "majority-decision-consented externally-inputted packets". Accordingly, at S602, each of the computer nodes 100A and 100B changes, to "3", the value of the input synchronization step 710 of the computer-node process state table 700. Subsequently, each computer node starts up S300 within the time T2.

Meanwhile, the computer node 100C executes the TO 1013, expecting that the computer node 100C will receive the inter-node communications packet 600 that is transmitted from each of the computer nodes 100A and 100B in the transmission 1012. Instead, however, the computer node 100C receives the "reception-result list" that is transmitted therefrom in the list creation 1003. Moreover, at S504 and S505, the computer node 100C detects the non-identical status between the computer-node process states. Furthermore, at S506, the computer node 100C updates, to "1", the value of the Penalty 703 of the computer-node process state table 700. None of the "majority-decision-consented externally-inputted packets" exists within the "reception-result list" that the computer node 100C has received from each of the computer nodes 100A and 100B. Consequently, at S602, the computer node 100C changes, to "3", the value of the input synchronization step 710 of the computer-node process state table 700. Subsequently, the computer node 100C starts up S300 within the time T2.

FIG. 38 illustrates the contents of the computer-node-configuration management table 317 of the computer nodes 100A and 100B in the time T1 (: row 1080). The computer nodes 100A and 100B do not store the information of the computer node 100C within the computer-node-configuration management table 317 (: empty row of row 1085). Also, FIG. 39 illustrates the state of the computer-node-configuration management table 317 of the computer node 100C in the time T1' (: row 1090). The computer node 100C does not store the information of the computer nodes 100A and 100B within the computer-node-configuration management table 317 (: empty rows of row 1093 and row 1094).

The state of each of the computer nodes 100A, 100B, and 100C at the start point-in-time of the time T2 is described in the time T2 illustrated in FIG. 35 (: row 1029). The value of the WS 1023 of the computer node 100A is changed to "3" by the execution of S602 in the time T1. This is basically the same in the computer nodes 100B and 100C as well. The information about the new externally-inputted packet 500 (i.e., the information about externally-inputted packet 500 whose sequence number is "2A-1"), which arrives at the computer node 100C during the processing in the time T1', is stored into the computer node 100C (: frame 1034).

In the transmission 1005, each of the computer nodes 100A, 100B, and 100C tries to acquire the information about the three externally-inputted packets 500. Moreover, each computer node sets the acquired information about the three externally-inputted packets 500 into the inter-node communications packet 600, then sending out the inter-node communications packet 600. The state of this inter-node communications packet 600 sent out is described in the time T2 illustrated in FIG. 36 (: row 1042). The value "1" of the Penalty 703, which is updated at S506 in the time T1', is stored into the inter-node communications packet 600 sent out by the computer node 100C (: frame 1047).

In the list creation 1007, each of the computer nodes 100A, 100B, and 100C creates the "reception-result list" from the inter-node communications packets 600 transmitted/received in the transmission 1005. Moreover, each computer node causes the "reception-result list" contents to be identical to each other among the respective computer nodes 100A, 100B, and 100C. The contents of the inter-node communications packets 600 transmitted/received at this time are described in the time T2 illustrated in FIG. 37 (: row 1061). In the judgment on the presence or absence of the "majority-decision-consented externally-inputted packets" at S601, the externally-inputted packet 500 whose sequence number is "2A-1" is judged to be the "majority-decision-consented externally-inputted packet" in the time T2 (: frame 1065 and frame 1066). Since the "majority-decisionconsented externally-inputted packets" are successfully confirmed, each computer node transfers to the processing in the time T3.

FIG. 38 illustrates the state of the computer-node-configuration management table 317 of the computer nodes 100A and 100B in the time T2 (: row 1081). The computer nodes 100A and 100B reflect the information of the computer node 100C synchronized therewith onto the computer-node-configuration management table 317 (: row 1086). Also, FIG. 39 illustrates the state of the computer-node-configuration management table 317 of the computer node 100C (: row 1091). The computer node 100C newly stores the information of the computer nodes 100A and 100B into the computer-node-configuration management table 317 (: row 1096 and row 1097).

In the majority decision 909 in the time T3, the externally-inputted packet 500 whose sequence number is "2A-1" is selected as the "majority-decision-consented externally-inputted packet". In the state update 910, each computer node updates the determined-input management table 800 and the input/output-determination-processing counter 315 on the basis of Each of the computer nodes 100A, 100B, and 100C sets, into the determined-input management table 800, the information about the externally-inputted packet 500 whose sequence number is "2A-1". The contents of the determined-input management table 800 at this time are described in FIG. 40. Also, simultaneously, each computer node deletes, from the externally-inputted-packet management table 550, the information about the externally-inputted packet 500 whose sequence number is "2A-1".

At this time, the computer node 100B has not received by itself the externally-inputted packet 500 whose sequence number is "2A-1", and which has become the "majority-decision-consented externally-inputted packet". Accordingly, the computer node 100B sets, into the pre-determined-input management table 810, the information about the externally-inputted packet 500 whose sequence number is "2A-1". The contents of the pre-determined-input management table 810 at this time are described in FIG. 41. Also, each of the computer nodes 100A, 100B, and 100C updates the value of the input/output-determination-processing counter 315 to "C011". This update is reflected onto the computer-node-configuration management table 317 (: frame 1087 in FIG. 38, and frame 1098 in FIG. 39). The state update 910 changes the state of each of the computer nodes 100A, 100B, and 100C in a manner as is described in the time T3 illustrated in FIG. 35 (: row 1030).

In the transmission 911, each of the computer nodes 100A, 100B, and 100C transmits/receives the information about the externally-inputted packet 500 that has been determined by each computer node, and that becomes the processing target of the application 200. This transmission/reception operation causes the information about the externally-inputted packet 500 to be shared among the respective computer nodes 100A, 100B, and 100C. The contents of the inter-node communications packets 600 transmitted/received at this time are described in the time T3 illustrated in FIG. 36 (: row 1043).

<Execution-Result Determination Processing (Case C)>

The explanation will be given below, using FIG. 42, FIG. 43, FIG. 44, FIG. 45, FIG. 46, FIG. 47, FIG. 48, and FIG. 49.

Figure 42:
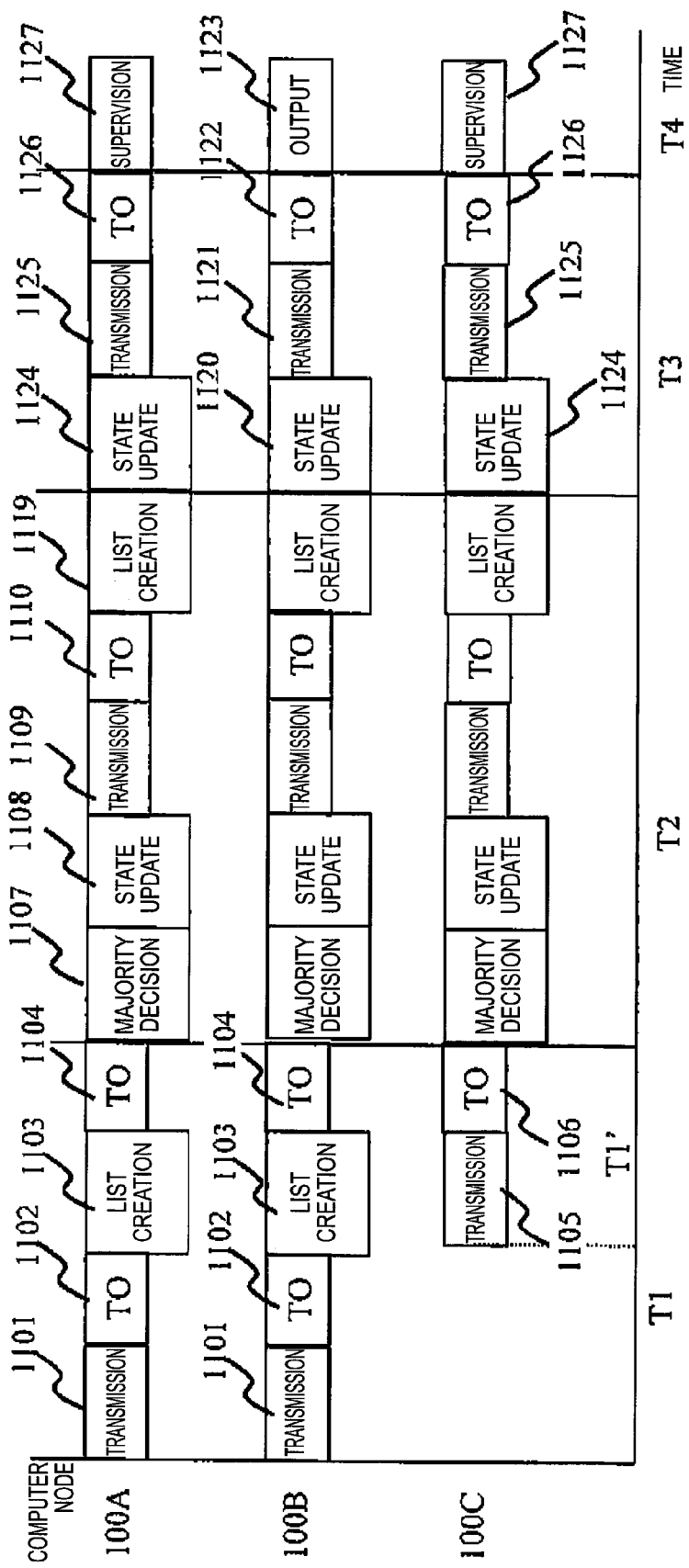
FIG. 42 This is a diagram for illustrating an example of the processing sequence of each computer node in a case C.

FIG. 42 illustrates the processing sequence of each computer node.

Time T1 corresponds to S801 to S913 of the execution-result determination processing of the computer nodes 100A and 100B. Time T1' corresponds to S801 to S913 of the execution-result determination processing of the computer node 100C. Time T2 corresponds to S1001 to S1208. In the computer node 100B, time T3 corresponds to S1301 to S1308, and time T4 corresponds to processings at S1309 or thereinafter. In the computer nodes 100A and 100C, time T3 corresponds to S1301 to S1315, and time T4 corresponds to S1316, and processings at S1317 or thereinafter. Also, transmission 1101 and transmission 1005 correspond to S804, and TO 1102 and TO 1106 correspond to S805, and list creation 1103 corresponds to S806 to S912, and TO 1104 corresponds to S913. Majority decision 1107 corresponds to S1001 to S1105, and state update 1108 corresponds to S1101 to S1104, and transmission 1109 corresponds to S1105, and TO 1110 corresponds to S1106, and list creation 1119 corresponds to S1107 to S1208. State update 1120 corresponds to S1301 to S1305, and transmission 1121 corresponds to S1306 and S1307, and TO 1122 corresponds to S1308, and output 1123 corresponds to S1309. State update 1124 corresponds to S1301 to S1312, and transmission 1125 corresponds to S1313 and S1314, and TO 1126 corresponds to S1315, and supervision 1127 corresponds to S1316, and processings at S1317 or thereinafter.

FIG. 43 illustrates the contents of the inter-node communications packet 600 that is transmitted/received in the transmission 1101 in the time T1 and the transmission 1105 in the time T1'. The calculation result of the application 200, which is executed in each of the computer nodes 100A, 100B, and 100C, is stored into the computer-node process state's individual detailed information 604. Row 1131 denotes the contents of the inter-node communications packet 600 transmitted/received in the transmission 1101 in the time T1. Concretely speaking, row 1133 of the configuration row denotes the transmission contents of the computer node 100A, and row 1134 denotes the transmission contents of the computer node 100B. Empty row of row 1135, however, means that the computer node 100C has not performed the transmission in the time T1. Row 1132 denotes the contents of the inter-node communications packet 600 transmitted/received in the transmission 1105 in the time T1'. Concretely speaking, row 1138 of the configuration row denotes the transmission contents of the computer node 100C. Empty rows of row 1136 and 1137, however, mean that each of the computer nodes 100A and 100B is not performing the transmission.

FIG. 44 illustrates the contents of the inter-node communications packet 600 transmitted/received among the respective computer nodes 100A, 100B, and 100C in the transmission 1109 in the time T2. The "leader-selection result", which is determined by each of the computer nodes 100A, 100B, and 100C, is stored into the computer-node process state's individual detailed information 604. Row 1140 denotes the contents of the inter-node communications packet 600 transmitted/received in the transmission 1109 in the time T2. Concretely speaking, row 1141 of the configuration row denotes the transmission contents of the computer node 100A, and row 1142 denotes the transmission contents of the computer node 100B, and row 1143 denotes the transmission contents of the computer node 100C.

FIG. 45 illustrates the contents of the inter-node communications packet 600 transmitted/received in the transmission 1121 and the transmission 1125 in the time T3.

Row 1150 denotes the contents of the inter-node communications packet 600 transmitted/received in the transmission 1121 and the transmission 1125 in the time T3. Concretely speaking, row 1151 of the configuration row denotes the transmission contents of the computer node 100A, and row 1152 denotes the transmission contents of the computer node 100B, and row 1153 denotes the transmission contents of the computer node 100C.

FIG. 46 illustrates the contents of the inter-node communications packet 600 transmitted/received between the computer nodes 100A and 100B in the list creation 1103 in the time T1. Row 1160 denotes the contents of the inter-node communications packet 600 transmitted/received between the computer nodes 100A and 100B in the list creation 1103 in the time T1. This row 1160 indicates the "reception-result list" that is created by connecting to each other the inter-node communications packets 600 transmitted/received in the "transmission" processing. Row 1161 of the configuration row denotes the "transmission" contents of the computer node 100A, and row 1162 denotes the "transmission" contents of the computer node 100B. Empty row of row 1163, however, means that the "reception-result list" does not include the inter-node communications packet 600 received from the computer node 100C. This is because each of the computer nodes 100A and 100B has not received the inter-node communications packet 600 from the computer node 100C.

FIG. 47 illustrates the contents of the inter-node communications packet 600 transmitted/received among the respective computer nodes 100A, 100B, and 100C in the list creation 1119 in the time T2. Row 1170 denotes the contents of the inter-node communications packet 600 transmitted/received among the respective computer nodes 100A, 100B, and 100C in the list creation 1119. This row 1170 indicates the "reception-result list" that is created by connecting to each other the inter-node communications packets 600 transmitted/received in the "transmission" processing. Row 1171 of the configuration row denotes the transmission contents of the computer node 100A, and row 1172 denotes the transmission contents of the computer node 100B, and row 1173 denotes the transmission contents of the computer node 100C.

FIG. 48 illustrates the on-each-time-basis contents of the computer-node-configuration management table 317 of an arbitrary computer node. The on-each-time-basis contents are the same in each of the computer nodes 100A, 100B, and 100C. Row 1180 denotes the states of the computer-node identifier-601 column, the input/output-determination-processing counter-602 column, and the computer-node process state-603 column of the computer-node-configuration management table 317 in the time T1. Row 1181 denotes the storage information of the computer-node-configuration management table 317 in the time T2. Row 1182 denotes the storage information of the computer-node-configuration management table 317 in the time T3. The input synchronization-time computer nodes' total number 317A, which is the value (: "3" within FIG. 48) set at the completion time of the input synchronization processing, is not changed during the output synchronization processing.

FIG. 49 illustrates the contents of the determined-input management table of each computer node in the execution example of the execution-result determination processing.

Next, in accordance with the processing sequence illustrated in FIG. 42, the explanation will be given below concerning a change in the process state of each of the computer nodes 100A, 100B, and 100C.

In the transmission 1101, each of the computer nodes 100A and 100B sets the calculation result "x" of the application 200 into the computer-node process state's individual detailed information 604 of the inter-node communications packet 600. Here, the calculation result "x" is acquired in the selected externally-inputted-packet processing S115. Subsequently, each computer node sends out this inter-node communications packet 600. The contents of this inter-node communications packet 600 sent out are described in the time T1 illustrated in FIG. 43 (: row 1131). The start of the execution-result determination processing is delayed in the computer node 100C. Accordingly, the computer node 100C has not performed the transmission in the time T1 (: empty row of row 1135).

In the list creation 1103, each of the computer nodes 100A and 100B creates the "reception-result list" by connecting to each other the inter-node communications packets 600 transmitted/received in the transmission 1101. Subsequently, each computer node transmits the "reception-result list" to each of the computer nodes 100A, 100B, and 100C. The contents of the connected inter-node communications packet 600 sent out are described in FIG. 46. The "reception-result list" includes the information received from the computer nodes 100A and 100B (: row 1161 and row 1162), but does not include the information received from the computer node 100C (: empty row of row 1163).

In the TO 1104, each of the computer nodes 100A and 100B acquires the "reception-result lists" of both of the computer nodes. After that, each computer node starts the processing of the majority decision 1107.

Meanwhile, the computer node 100C starts the execution-result determination processing at the time T1'. Then, in the transmission 1105, the computer node 100C sets the calculation result "x" of the application 200 into the computer-node process state's individual detailed information 604 of the inter-node communications packet 600. Subsequently, the computer node 100C sends out this inter-node communications packet 600. The contents of this inter-node communications packet 600 sent out in the time T1' are described in the time T1' illustrated in FIG. 43 (: row 1132). The computer node that is performing the transmission in the time T1' is the computer node 100C alone (: row 1138). Each of the computer nodes 100A and 100B is not performing the transmission (: empty rows of row 1137 and row 1138).

In the TO 1106, the computer node 100C expects that the computer node 100C will receive the calculation result of the application 200 of each of the computer nodes 100A and 100B from each of these computer nodes. Instead, however, the computer node 100C receives the "reception-result list" that is transmitted in the list creation 1103. Moreover, at S904 and S905, the computer node 100C detects the non-identical status between the computer-node process states. Furthermore, at S906, the computer node 100C updates, to "1", the value of the Penalty 703 of the computer-node process state table 700. In addition, the computer node 100C creates azz "reception-result list" by adding the calculation result of the application 200 of the computer node 100C itself to the "reception-result list" that the computer node 100C has received. After that, the computer node 100C starts the processing of the majority decision 1107.

In the majority decision 1107, each of the computer nodes 100A and 100B makes the majority-decision judgment on the calculation results of the applications 200 on the basis of the "reception-result list" that each of the computer nodes 100A and 100B has shared in the list creation 1103. Meanwhile, the computer node 100C makes the majority-decision judgment on the basis of the "reception-result list" that the computer node 100C has created and acquired in the TO 1106. In the present embodiment, the calculation results of the applications 200 of the computer nodes 100A, 100B, and 100C are the same calculation results "x". Consequently, all of the computer nodes included within the "reception-result lists" are judged to be of the "majority group".

In the state update 1108, the input/output synchronization unit 310 selects computer nodes 100, which become candidates for the leader, from all of the computer nodes included within the "reception-result lists". Furthermore, the unit 310 performs the ranking for the leader selection. The "reception-result list" that the computer nodes 100A and 100B store includes "computer nodes 100A, 100B". Accordingly, at S1102, the unit 310 selects the "computer nodes 100A, 100B". Moreover, the unit 310 ranks the "computer node 100B" to be the first rank, and the "computer node 100A" to be the second rank (in the present embodiment, the ranking is performed in accordance with the descending order of the values of the computer-node identifiers). Meanwhile, the "reception-result list" that the computer node 100C stores includes "computer nodes 100A, 100B, 100C". Accordingly, the unit 310 selects the "computer nodes 100A, 100B, 100C". Moreover, the unit 310 ranks the "computer node 100B" to be the first rank, the "computer node 100A" to be the second rank, and the "computer node 100C" to be the third rank. Although the "computer node 100C" is equipped with the largest value of the computer-node identifiers, "1" is set into the Penalty 703. Consequently, the "computer node 100C" is ranked to be the third rank, i.e., the lowest rank.

In the transmission 1109, each of the computer nodes 100A, 100B, and 100C sets the "leader-selection result" in the state update 1108 into the computer-node process state's individual detailed information 604 of the inter-node communications packet 600. Subsequently, each computer node transmits this inter-node communications packet 600. The contents of this inter-node communications packet 600 transmitted are described in FIG. 44. Each of the computer nodes 100A and 100B transmits this packet 600 without determining the leader-selection rank of the computer node 100C (: frame 1144 and frame 1145). Meanwhile, the computer node 100C transmits this packet 600 after adding the leader-selection rank of itself to this packet 600 (: frame 1146).

In the list creation 1119, the computer nodes 100A and 100B create a "reception-result list", and share it therebetween. This "reception-result list" is created by comparing and connecting the leader-selection ranks that are exchanged among the computer nodes 100A, 100B, and 100C. The contents of the inter-node communications packet 600, into which this "reception-result list" is set, and which is transmitted/received in the list creation 1119, are described in FIG. 47. The leader-selection rank of the computer node 100C is complemented and reflected onto this "reception-result list" that the computer nodes 100A and 100B have created (: frame 1174 and frame 1175).

At the time T3 or thereinafter, the computer nodes 100A, 100B, and 100C are separated into a "leader" and "monitors" on the basis of the leader-selection ranks. Accordingly, the respective computer nodes after that perform mutually different processings. The computer node 100B becomes the "leader", and the computer nodes 100A and 100C become the "monitors".

In the state update 1120, the computer node 100B judges itself to be the "leader" in accordance with the leader-selection ranks. Consequently, the node 100B sets "LEADER" into the process state 704 of the computer-node process state table 700, then changing the value of the input/output-determination-processing counter 315. The node 100B judges the computer nodes 100A and 100C to be the "monitors".

Meanwhile, in the state update 1124, the computer nodes 100A and 100C judge themselves to be the "monitors" in accordance with the leader-selection ranks. Consequently, each of the nodes 100A and 100C sets "MONITOR" into the process state 704 of the computer-node process state table 700, then changing the value of the input/output-determination-processing counter 315. Each of the nodes 100A and 100C judges the computer node 100B to be the "leader".

In the state update 1120 and the state update 1124, the information about the self computer node and the other computer nodes, and the "leader/monitor" judgment results are reflected onto the computer-node-configuration management table 317 and the determined-output management table 321. The contents of the computer-node-configuration management table 317 in the time T3 are described in the time T3 illustrated in FIG. 48 (: row 1182). The contents of the determined-output management table 321 are described in FIG. 49.

In the transmission 1121 and the transmission 1125, each of the computer nodes 100A, 100B, and 100C transmits the computer-node process state of itself. The contents of the inter-node communications packet 600 transmitted in the transmission 1121 and the transmission 1125 are described in FIG. 45. The information notified are the updated input/output-determination-processing counter-602 value (: frame 1154) of each of the computer nodes 100A, 100B, and 100C, and the process state 704 (: frame 1155) for indicating the "leader/monitor".

In the output 1123, the computer node 100B, i.e., the "leader", executes S1309, thereby transmitting the signal, i.e., the calculation result of the application 200, to the outside.

In the supervision 1127, the computer nodes 100A and 100C, i.e., the "monitors", execute S1316 and S1317, thereby performing the supervision of the signal send-out in the output 1123. By performing this supervision, the computer nodes 100A and 100C make the judgment on the normality/abnormality of the outside output of the computer node 100B, i.e., the "leader". Then, based on the judgment result, the computer nodes execute the re-synchronization detection processing S111 or the output abnormality processing S1400.

Embodiment 2

Next, as another embodiment, the explanation will be given below concerning the following case: Namely, a new computer node is added to an already-existing majority-decision synchronization system whose operation is underway.

Figure 50:
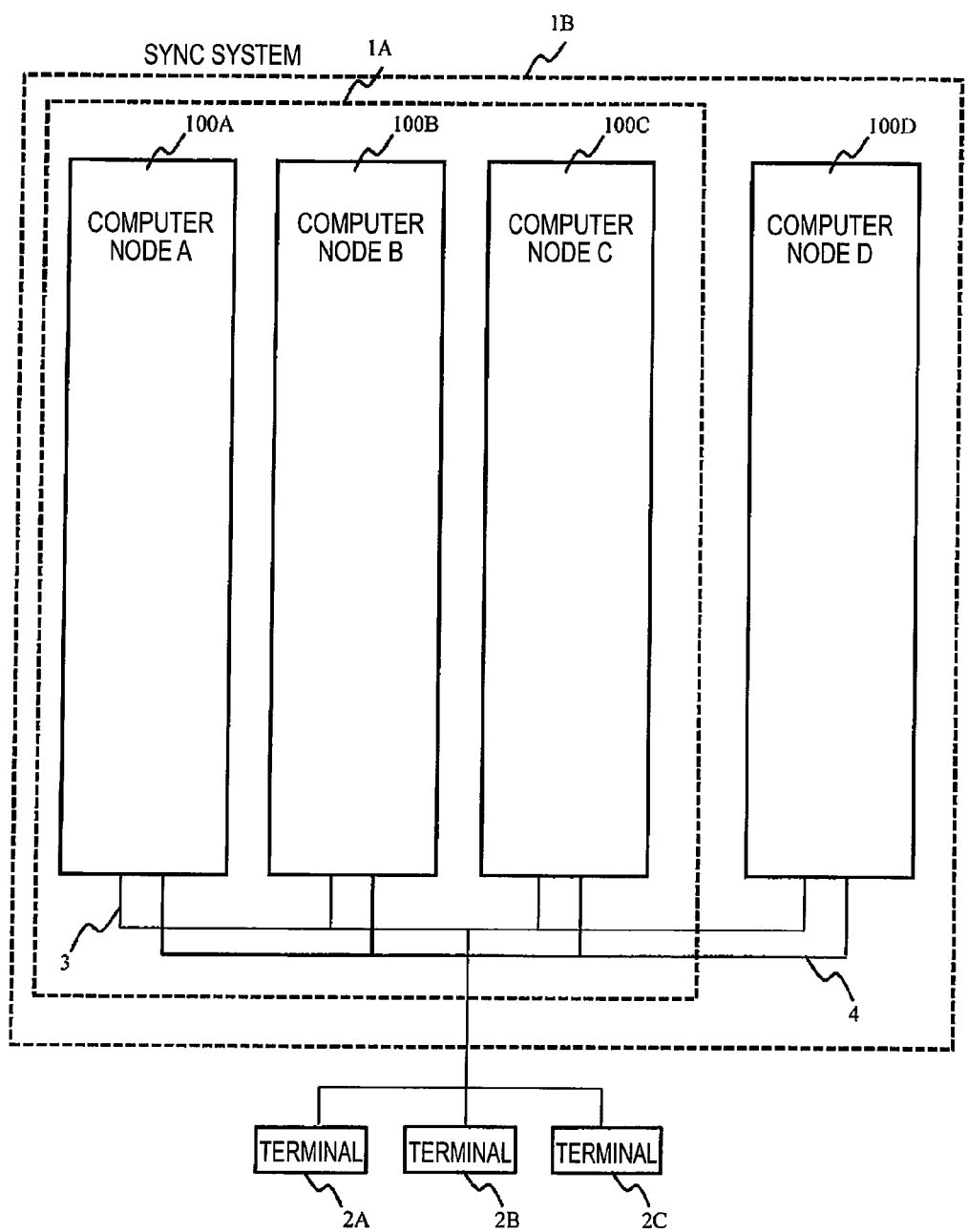
FIG. 50 This is a diagram for illustrating an example of the entire configuration of the majority-decision synchronization system in a case where a novel computer node is added thereto.

FIG. 50 illustrates another embodiment of the present invention, which is an example of the entire configuration of the majority-decision synchronization system in a case where a novel computer node is added thereto. A synchronization system 1A is an already-existing majority-decision synchronization system which is configured from the computer nodes 100A, 100B, and 100C, and whose operation is underway. A computer node 100D is a computer node that is to be newly added to the synchronization system 1A. The computer node 100D possesses basically the same hardware and software configurations as those of the computer node 100A in FIG. 1. The external network 3 establishes the connection between the computer nodes 100A, 100B, 100C, and 100D, and the terminals 2A, 2B, and 2C. The internal network 4 establishes the connection among the computer nodes 100A, 100B, 100C, and 100D. A synchronization system 1B is a majority-decision synchronization system after the computer node 100D is added thereto, i.e., the majority-decision synchronization system configured from the computer nodes 100A, 100B, 100C, and 100D.

Next, the explanation will be given below regarding an operation at the time when the computer node 100D is added to the synchronization system 1A. Incidentally, this operation explanation is started from the state where the connection of the computer node 100D to the external network 3 and the internal network 4 is completed. Namely, the connection steps of connecting the computer node 100D thereto are omitted.

In the computer node 100D, the input/output synchronization unit 310 of the infrastructure software 300 starts the operation. Then, the input/output synchronization unit 310 in the computer node 100D executes the re-synchronization processing S118. Accordingly, at S1183, the unit 310 transmits the "inter-node communications packet of REJOIN-REQ" in accordance with the multi-cast scheme to the computer nodes 100A, 100B, and 100C that are connected to the internal network 4. Moreover, at S1184, the unit 310 performs Wait until the time-out, expecting that the "inter-node communications packet of REJOIN-ACK" will arrive thereat.

At S1114 of the re-synchronization detection processing S111, each of the computer nodes 100A, 100B, and 100C detects the "inter-node communications packet of REJOIN-REQ" transmitted from the computer node 100D. Furthermore, at S1118, each of the computer nodes transmits the "inter-node communications packet of REJOIN-ACK" in accordance with the multi-cast scheme to the other computer nodes including the computer node 100D. In addition, each of the computer nodes performs Wait until the time-out, expecting that the "inter-node communications packet of JOINED" from the computer node 100D will arrive thereat.

Having received the "inter-node communications packet of REJOIN-ACK" from each of the computer nodes 100A, 100B, and 100C, the computer node 100D, at S11810, transmits the "inter-node communications packet of REJOIN-REQ" in accordance with the multi-cast scheme to each of the computer nodes 100A, 100B, and 100C. Subsequently, the computer node 100D starts up S112 in order to start the input synchronization processing.

Having confirmed the reception of the "inter-node communications packet of REJOIN-REQ" from the computer node 100D, each of the computer nodes 100A, 100B, and 100C starts up S112 in order to start the input synchronization processing.

Hereinafter, the majority-decision synchronization system, which is the system to which the computer node 100D is added (i.e., the synchronization system 1B), will process the externally-inputted packets 500 transmitted from the terminals 2A, 2B, and 2C.

REFERENCE SIGNS LIST

1: synchronization system
2A, 2B, 2C: terminals
100A, 100B, 100C: computer nodes
101: memory
102: processor
103: storage device
104: external communications I/F
105: inter-node communications I/F
200: application
300: infrastructure software
301: externally-inputted-packet storage unit
310: input/output synchronization unit
400: operating system
500: externally-inputted packet
600: inter-node communications packet

The invention claimed is:

1. A computer system comprising:
a plurality of computer nodes, each of said computer nodes comprising:
a processor connected to a memory storing instructions that cause the processor to execute:
an external communications unit for receiving a processing request;
an application unit for executing processing in accordance with said processing request;
a synchronization unit for controlling synchronization of said processing between each said computer node and other computer nodes, said processing being executed by said application unit of each said computer node; and
an inter-node communications unit for transmitting inter-node communications packets to said other nodes and receiving said inter-node communications packets from said other computer nodes,
wherein:
said inter-node communications unit of each said computer node attaches identification information as transmission-source identification information and process-state information for indicating progress of processing executed by said application unit of said computer node to each of said inter-node communications packets,
said inter-node communications unit of each said computer node receiving plural inter-node communications packets from said other computer nodes via said inter-node communications unit, said identification information and said process-state information for indicating progress of processing executed by said application unit of said other computer nodes being attached to said inter-node communications packets,
said synchronization unit of each said computer node comparing said process-state information of said computer node to said process-state information of said other computer nodes of said inter-node communications packets, and determining a majority group as said computer nodes which have matching said processing state information,
said synchronization unit of each said computer node attaches said identification information to said processing request,
said synchronization unit of each said computer node then transmitting said processing request to said other computer nodes via said inter-node communications unit, said identification information being attached to said processing request that is received by said external communications unit,
said synchronization unit of each said computer node then receiving plural processing requests from said other computer nodes via said inter-node communications unit, said identification information of said other computer nodes being attached to said processing requests,
said synchronization unit of each said computer node of said majority group then selecting one of the processing requests from among said plural processing requests received from said other computer nodes by said inter-node communications unit and said processing request received by said external communications unit in accordance with a first predetermined judgment criterion, said application unit of each of said computer nodes of said majority group then executing said selected one of the processing requests, said first predetermined judgment criterion is whether or not more than half of said computer nodes of said majority group have respectively received said processing requests via said respective external communications unit, said identification information of said processing requests being attached to each said processing request, said synchronization unit of each said computer node of said majority group transmits an execution result to said other computer nodes via said inter-node communications unit, said execution result being acquired by executing said selected processing request with said application unit, said synchronization unit of each said computer node then receiving execution results from said computer nodes of said majority group via said inter-node communications unit, said synchronization unit of each said computer node of said majority group then selecting an output result in accordance with a second predetermined judgment criterion, said selection of said output result being made from among said execution results received from said computer nodes of said majority group by said inter-node communications unit, and said execution result acquired by said application unit, said second predetermined judgment criterion being based on the number of said computer nodes of said majority group that have acquired a same said execution result, said second predetermined judgment criterion is whether or not more than half of the computer nodes of said majority group have received said same execution result from each said application unit of said computer nodes of said majority group, said synchronization unit of each said computer node of said majority group then electing a leader computer-node candidate, if said synchronization unit of each said computer node of said majority group has received said selected output result as said execution result from said application unit, said election of said leader computer-node candidate being made from among said computer nodes and said respective computer node of said majority group, each of which has transmitted said selected output result as said execution result of said application unit, said synchronization unit of each said computer node then transmitting said identification information of said leader computer-node candidate to said other computer nodes of said majority group via said inter-node communications unit, said synchronization unit of each said computer node of said majority group then receiving said identification information of said leader computer-node candidate from said other computer nodes of said majority group via said inter-node communications unit, said leader computer-node candidate being selected by said other computer nodes of said majority group, said synchronization unit of each said computer node of said majority group then making a judgment as to whether or not said leader computer-node candidate selected by said respective computer node should be selected as a leader computer node of said majority group, said judgment on said election of said leader computer node being made depending on the number of said computer nodes that have been selected, as said leader computer-node candidates, said computer nodes being identified by the same said identification information, and said leader computer node outputting said output result selected in accordance with said second predetermined judgment criterion in response to said selected one of the processing requests from among said plural processing requests, wherein said synchronization unit of each said computer node supervises said output result of said leader computer node, if said leader computer-node candidate selected by said respective computer node is selected as said leader computer node, and if said respective computer node is not selected as said leader computer node, said output result being outputted by another computer node that is selected as said leader computer node, if said output result outputted by said leader computer node is different from said output result selected in accordance with said second predetermined judgment criterion, said majority group then elects another leader computer node, and said output result selected in accordance with said second predetermined judgment criterion being outputted by said other leader computer node, and said election of the other leader computer node being among each of said other computer nodes of said majority group which has selected the same output result in accordance with said second predetermined judgment criterion.

2. The computer system according to claim 1, wherein if a delay in progress of said processing by said synchronization unit of said respective computer node is larger than a predetermined criterion, said synchronization unit then transmits a re-synchronization request to said other computer nodes without selecting one of the processing requests from among said plural processing requests, and said re-synchronization request is made for establishing synchronization between said respective computer node and said other computer nodes.

3. The computer system according to claim 2, wherein said synchronization unit of each said computer node manages said computer nodes that have established synchronization as said majority group, said synchronization unit of each said computer node of said majority group transmitting said process-state information to said synchronization unit of said computer node which transmitted the synchronization request, and said synchronization unit of each said computer node updates said majority group, if said majority group receives a response from said synchronization unit of said computer node, which transmitted the synchronization request, which includes an execution result of said selected one of said processing requests which matches said output result selected in accordance with said second predetermined judgment criterion.

4. The computer system according to claim 2, wherein the node which transmitted the re-synchronization request due to the delay is penalized when the execution results are received from the other nodes.

5. The computer system according to claim 4, wherein the node which has been penalized is excluded from the leader computer-node candidates.

6. The computer system according to claim 1, wherein:
said synchronization unit of each said computer node further attaching said process-state information to said execution result of said application unit,
said synchronization unit of each said computer node then transmitting said execution result to said other computer nodes via said inter-node communications unit,
said synchronization unit of each said computer node then receiving execution results from said other computer nodes via said inter-node communications unit, said process-state information of said other computer nodes being attached to said execution results,
said synchronization unit of each said computer node then making a comparison between said process-state information of said respective computer node, and said process-state information received from said other computer nodes, and,
if a delay in said progress of said processing by said synchronization unit of said respective computer node is larger than a predetermined criterion,
said synchronization unit of each said computer node then transmitting a re-synchronization request to said other computer nodes without executing said processing for selecting said output result, and
said re-synchronization request being made for establishing synchronization between said respective computer node and said other said computer nodes.

7. The computer system according to claim 6, wherein
said synchronization unit of each said computer node manages the number of said computer nodes that have established said synchronization with said respective computer node,
said synchronization unit of each said computer node transmitting said process-state information to another computer node, if said synchronization unit receives a re-synchronization request from another computer node, and
said synchronization unit of each said computer node updating said number of said computer nodes, if said synchronization unit receives a response to said process-state information from another computer node.

8. The computer system according to claim 6, wherein
said synchronization unit of each said computer node makes said comparison between said process-state information of said respective computer node, and said process-state information of said other computer nodes received from said other computer nodes, and,
if said delay in said processing by said synchronization unit of said respective computer node falls within said predetermined criterion,
said synchronization unit of each said computer node executes said processing for selecting said output result.

9. The computer system according to claim 1, wherein
said synchronization unit of each said computer node manages said computer nodes that have established synchronization with said respective computer node as said majority group,
said synchronization unit of each said computer node transmits process-state information to another said computer node, if said synchronization unit receives a synchronization request from another said computer node,
said synchronization request is made for establishing said synchronization with said respective computer node, and
said synchronization unit of each said computer node updates said majority group, if said synchronization unit receives a response to said process-state information from another said computer node.

* * * * *